INVENTORS
M. D. ADAMS
C. W. JOHNSON
E. J. CHOJNOWSKI
A. M. EISNER
J. ELICH
H. GLICK
BY M.R. Marsh
ATTORNEY Oct. 9, 1962 M. D. ADAMS ET AL 3,057,956

TELEGRAPH SWITCHING SYSTEM

Filed Sept. 13, 1960 63 Sheets-Sheet 8

Oct. 9, 1962 M. D. ADAMS ET AL 3,057,956

TELEGRAPH SWITCHING SYSTEM

Filed Sept. 13, 1960 63 Sheets-Sheet 9

Oct. 9, 1962 M. D. ADAMS ET AL 3,057,956

TELEGRAPH SWITCHING SYSTEM

Filed Sept. 13, 1960 63 Sheets-Sheet 11

Oct. 9, 1962 M. D. ADAMS ET AL 3,057,956

TELEGRAPH SWITCHING SYSTEM

Filed Sept. 13, 1960 63 Sheets-Sheet 12

Oct. 9, 1962 M. D. ADAMS ET AL 3,057,956

TELEGRAPH SWITCHING SYSTEM

Filed Sept. 13, 1960 63 Sheets-Sheet 15

Oct. 9, 1962 M. D. ADAMS ET AL 3,057,956

TELEGRAPH SWITCHING SYSTEM

Filed Sept. 13, 1960 63 Sheets-Sheet 17

Oct. 9, 1962 M. D. ADAMS ET AL 3,057,956

TELEGRAPH SWITCHING SYSTEM

Filed Sept. 13, 1960 63 Sheets-Sheet 22

Oct. 9, 1962 M. D. ADAMS ET AL 3,057,956

TELEGRAPH SWITCHING SYSTEM

Filed Sept. 13, 1960 63 Sheets-Sheet 27

Oct. 9, 1962 M. D. ADAMS ET AL 3,057,956

TELEGRAPH SWITCHING SYSTEM

Filed Sept. 13, 1960 63 Sheets-Sheet 30

Oct. 9, 1962 M. D. ADAMS ET AL 3,057,956

TELEGRAPH SWITCHING SYSTEM

Filed Sept. 13, 1960 63 Sheets-Sheet 31

Oct. 9, 1962 M. D. ADAMS ET AL 3,057,956

TELEGRAPH SWITCHING SYSTEM

Filed Sept. 13, 1960 63 Sheets-Sheet 32

Oct. 9, 1962 M. D. ADAMS ET AL 3,057,956

TELEGRAPH SWITCHING SYSTEM

Filed Sept. 13, 1960 63 Sheets-Sheet 35

Oct. 9, 1962 M. D. ADAMS ET AL 3,057,956

TELEGRAPH SWITCHING SYSTEM

Filed Sept. 13, 1960 63 Sheets-Sheet 37

Oct. 9, 1962 M. D. ADAMS ET AL 3,057,956

TELEGRAPH SWITCHING SYSTEM

Filed Sept. 13, 1960 63 Sheets-Sheet 38

Oct. 9, 1962 M. D. ADAMS ET AL 3,057,956

TELEGRAPH SWITCHING SYSTEM

Filed Sept. 13, 1960 63 Sheets-Sheet 41

Oct. 9, 1962 M. D. ADAMS ET AL 3,057,956

TELEGRAPH SWITCHING SYSTEM

Filed Sept. 13, 1960 63 Sheets-Sheet 52

TELEGRAPH SWITCHING SYSTEM

Filed Sept. 13, 1960 63 Sheets-Sheet 54

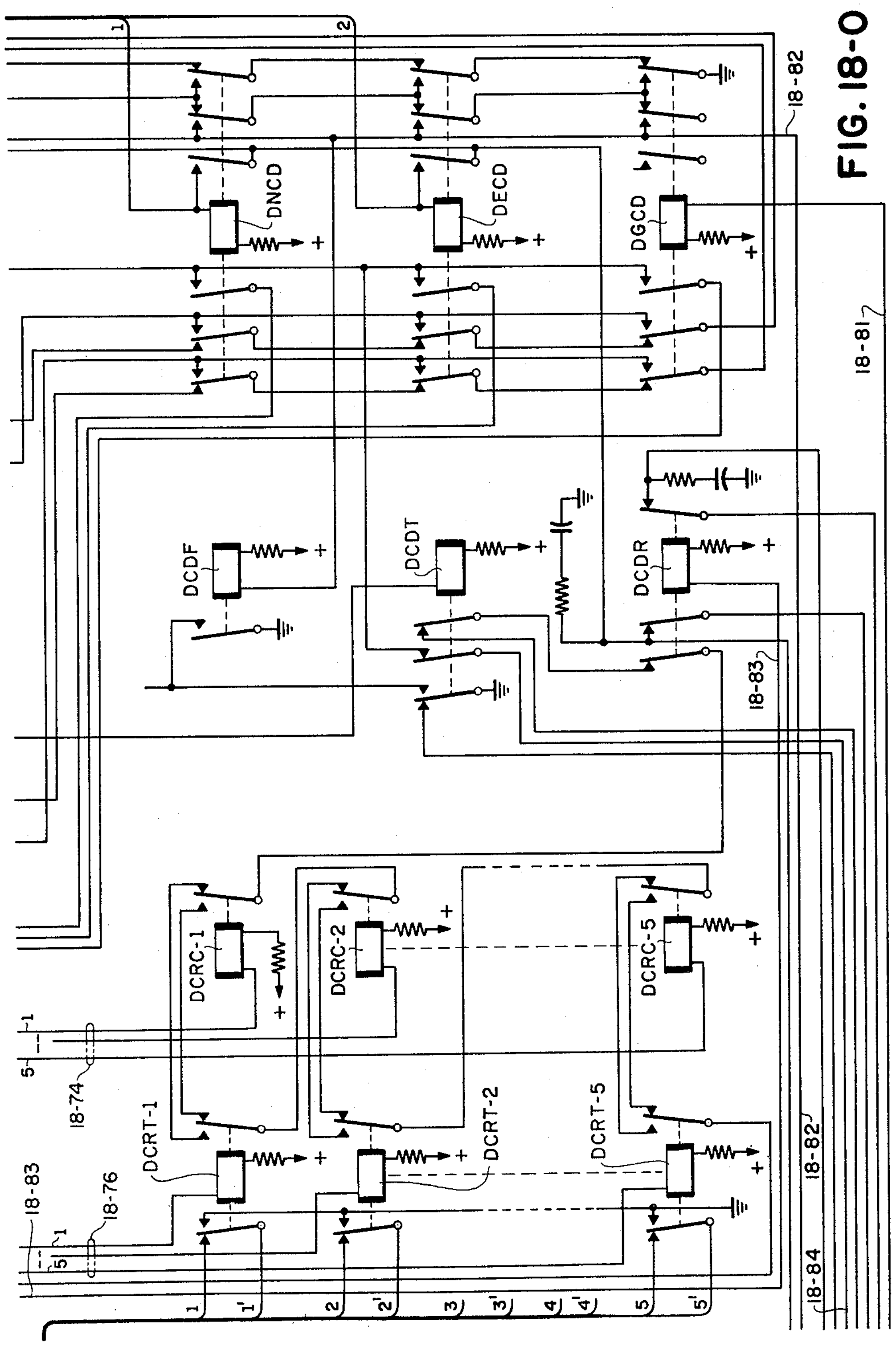
FIG. 18-O

United States Patent Office 3,057,956
Patented Oct. 9, 1962

3,057,956
TELEGRAPH SWITCHING SYSTEM

Myron D. Adams, New York, Claude W. Johnson, Elmhurst, Edward J. Chojnowski, Valley Stream, Albert M. Eisner, Elmhurst, John Elich, New York, and Harold Glick, Jackson Heights, N.Y., assignors to The Western Union Telegraph Company, New York, N.Y., a corporation of New York Filed Sept. 13, 1960, Ser. No. 64,689
25 Claims. (Cl. 178—23)

The present invention relates to telegraph switching systems and more particularly to automatic switching systems wherein address portions or routing indicators preceding messages automatically control the switching of the messages through one or more switching centers.

One of the principal objects of the present invention is to provide a telegraph switching system wherein the switching center is capable of accommodating a maximum number of incoming and outgoing line circuits with a minimum amount of switchng equipment. In this respect it is another object of the invention to provide a switching system of increased efficiency and flexibility.

The system of the present invention is arranged to accommodate and service a plurality of geographically separated switching centers with such centers interconnected by trunk circuits and each center having a plurality of remote offices or messages originating and destination offices individually associated therewith. All incoming lines at a switching center, trunks from other centers, single circuit lines from individual remote offices, and multi-station lines or way circuits, terminate in line receiving positions. These line receiving positions. include control units and signal storage means such as printer perforators for perforating tapes in accordance with the received signals. Associated with the printer perforators are tape transmitters which are employed to transmit the stored signals cross-office to line sending positions. The line sending positions include tape reperforators responding to the signals transmitted thereto cross office and tape transmitters for controlling the transmission of signals to the associated lines.

A feature of the invention resides in the ability of each line receiving position to transmit cross office up to a predetermined number of line sending positions when a received message is intended for destinations which can be reached through not more than the predetermined number of line sending positions, and when the requirements are such that more than the predetermined number of sending positions are required, to automatically direct the message to a multi-address position. The multi-address position has facilities enabling the message to be switched to any number of line sending positions depending upon the requirements of the routing information preceding the message. Accordingly with this arrangement a minimum number of multi-address positions are required.

Another feature of the invention resides in the novel automatic switching control circuits for establishing transmission paths at a switching center from a receiving position to a sending position that is arranged for fast, efficient and reliable operation. In this connection another feature is the employment of one or more directors for controlling the switching circuits on a sharing basis and in such a manner that all receiving positions have access to a director. A feature of the director resides in the employment of transistor circuits.

Another feature of the invention resides in the control circuits whereby one or more routing indicators preceding a message received at a switching center determines the switching requirements theerof automatically. In this connection a still further feature of the invention is the novel arrangement whereby a single routing indicator preceding a message controls a switching equipment to provide a plurality of paths of transmission to a plurality of sending positions. The routing indicators representing a plurality of destinations are termed herein group code routing indicators and a group code indicator may represent destinations served through a plurality of switching centers. In this connection a feature of the invention is the arrangement whereby the control circuits responding to a group code indicator distinguishes between the destinations requested by a group code indicator which are to be locally processed and those which have been processed at a previous switching center in the system. With this arrangement a message preceded by a group code routing indicator and directed to destinations served by a previous switching center are not sent back to this center.

Another feature of the invention resides in the arrangement of processing and switching a message in accordance with a plurality of group code indicators.

In the embodiment of the invention disclosed the director or a plurality thereof are arranged to process each of one or more routing indicators preceding a message. Normally the routing indicator either that for a single destination or a group code indicator, consists of a predetermined number of characters and a feature of the present invention resides in adapting the director to respond to a different number of characters in a routing indicator. In this connection a further feature of the invention resides in an arrangement for establishing an alarm condition when a routing indicator contains more than the predetermined number.

In connection with the processing of a routing indicator the director stores the characters of a routing indicator for subsequent action and a feature of the invention resides in the arrangement to eliminate certain control characters and prevent their storage when they occur in the routing indicators.

Since a director or the relatively few directors in the system as disclosed herein is adapted to serve a relatively large number of line receiving positions to direct the messages to selected outgoing line positions, an allotter is employed to assign the use of the director to the various requesting receiving positions. In connection therewith it is a still further object of the invention to provide an allotter arrangement whereby a requesting receiving position waiting for an allotter for a predetermined length of time is given preference to the use thereof over receiving positions subsequently requesting the use of the allotter.

In connection with the cross office transmission of message material from a requesting receiving position to a selected line position or positions, a feature of the invention resides in the arrangement of providing a parity check for each character transmitted across office from a receiving line position to a sending line position.

The above and further features and objects of the present invention will be more apparent in the following detailed description wherein reference is made to the accompanying drawings the latter of which:

Figure 2A:
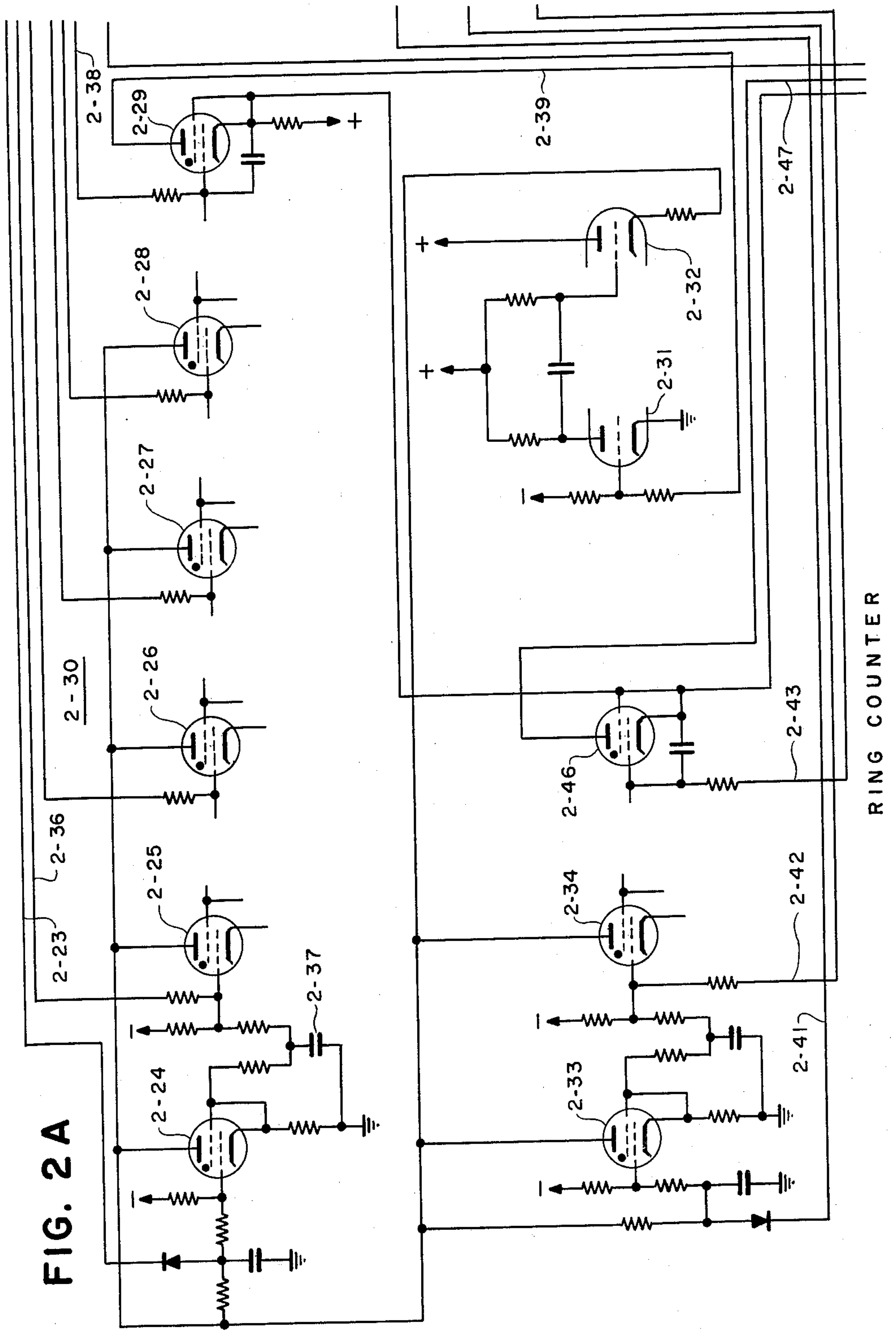
FIGS. 2A, 2B, 2C and 2D are detailed circuit drawings of a line receiving position of the present invention.
Figure 2B:
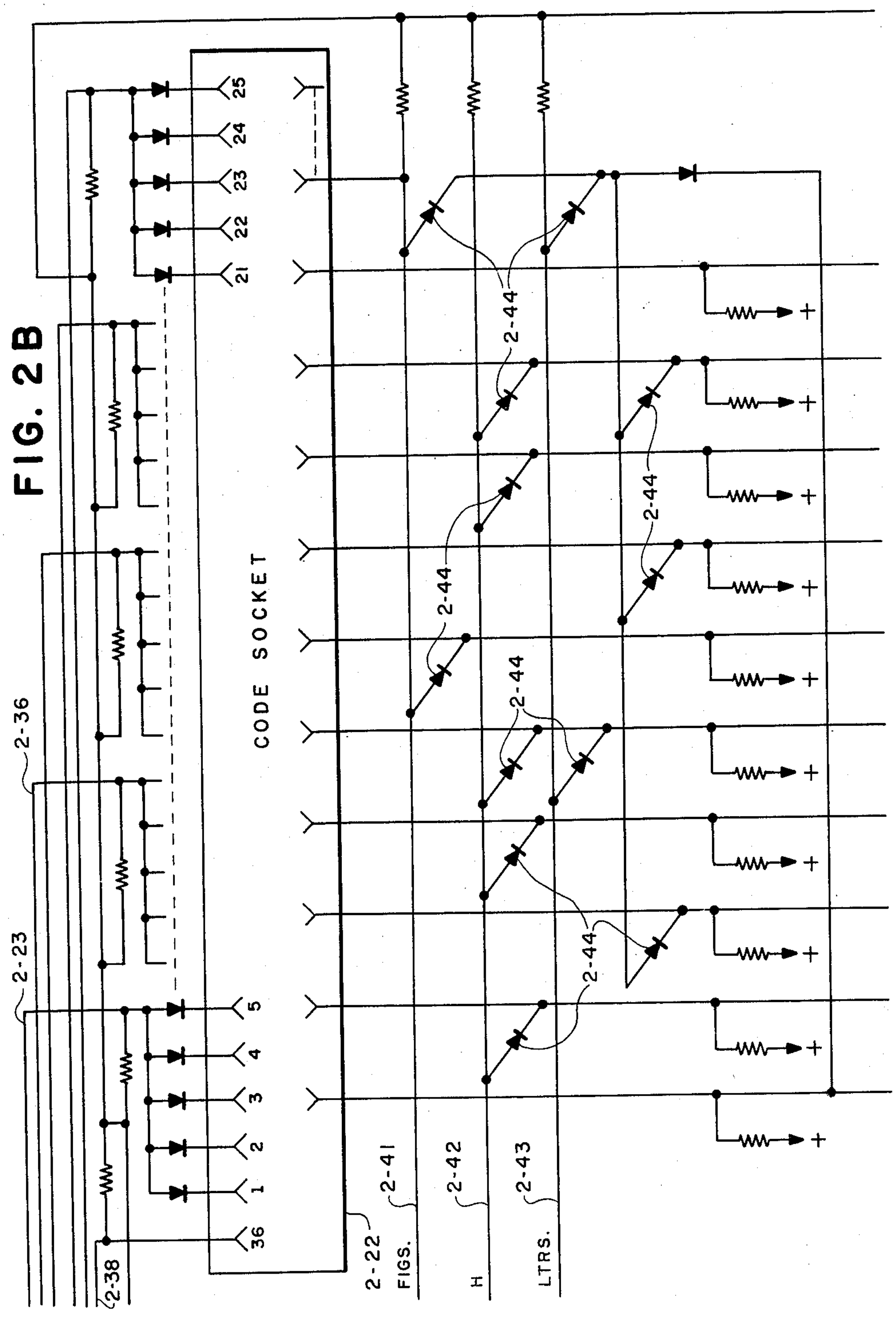
Figures 2, 2C:
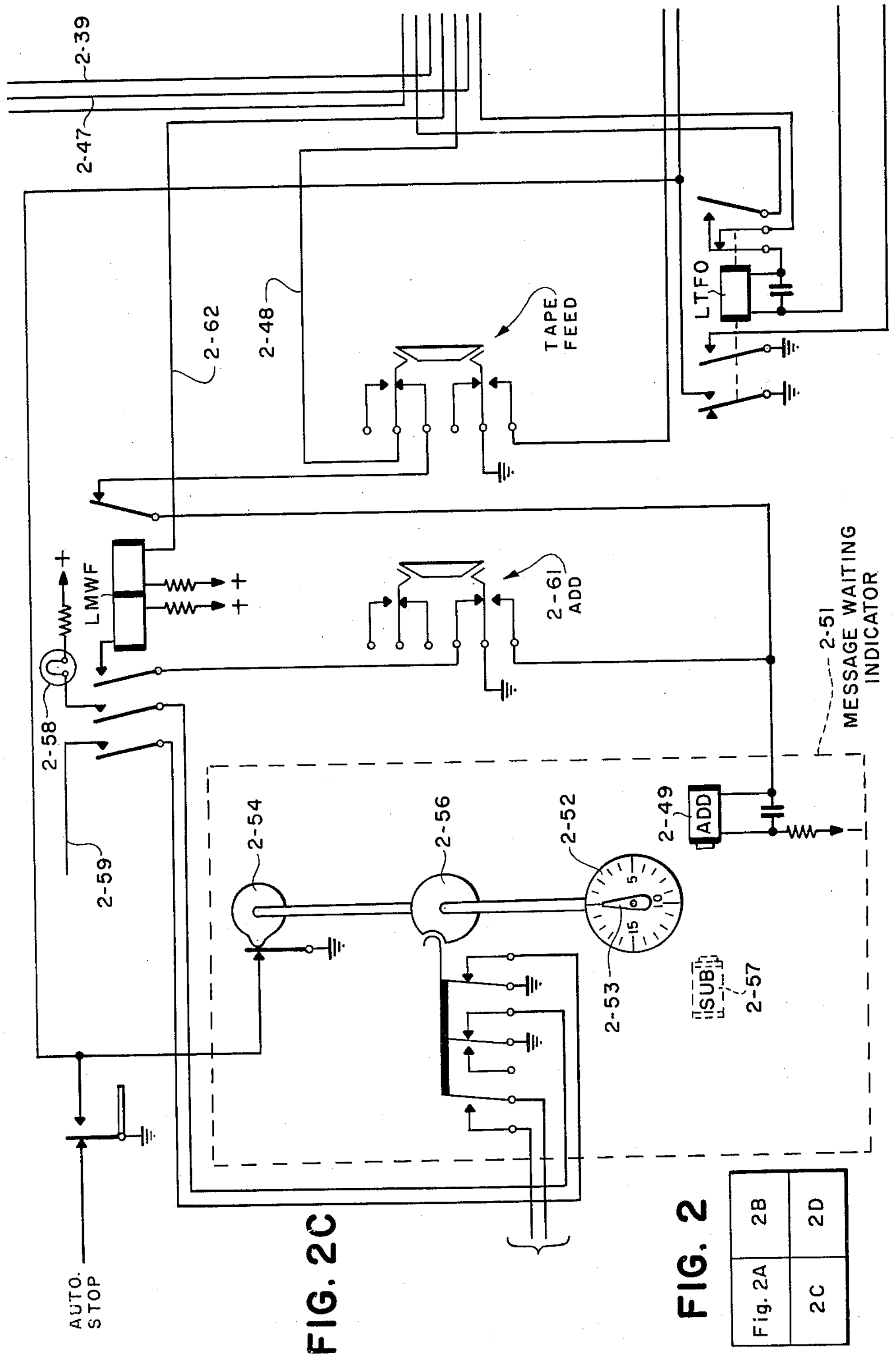
Figure 2D:
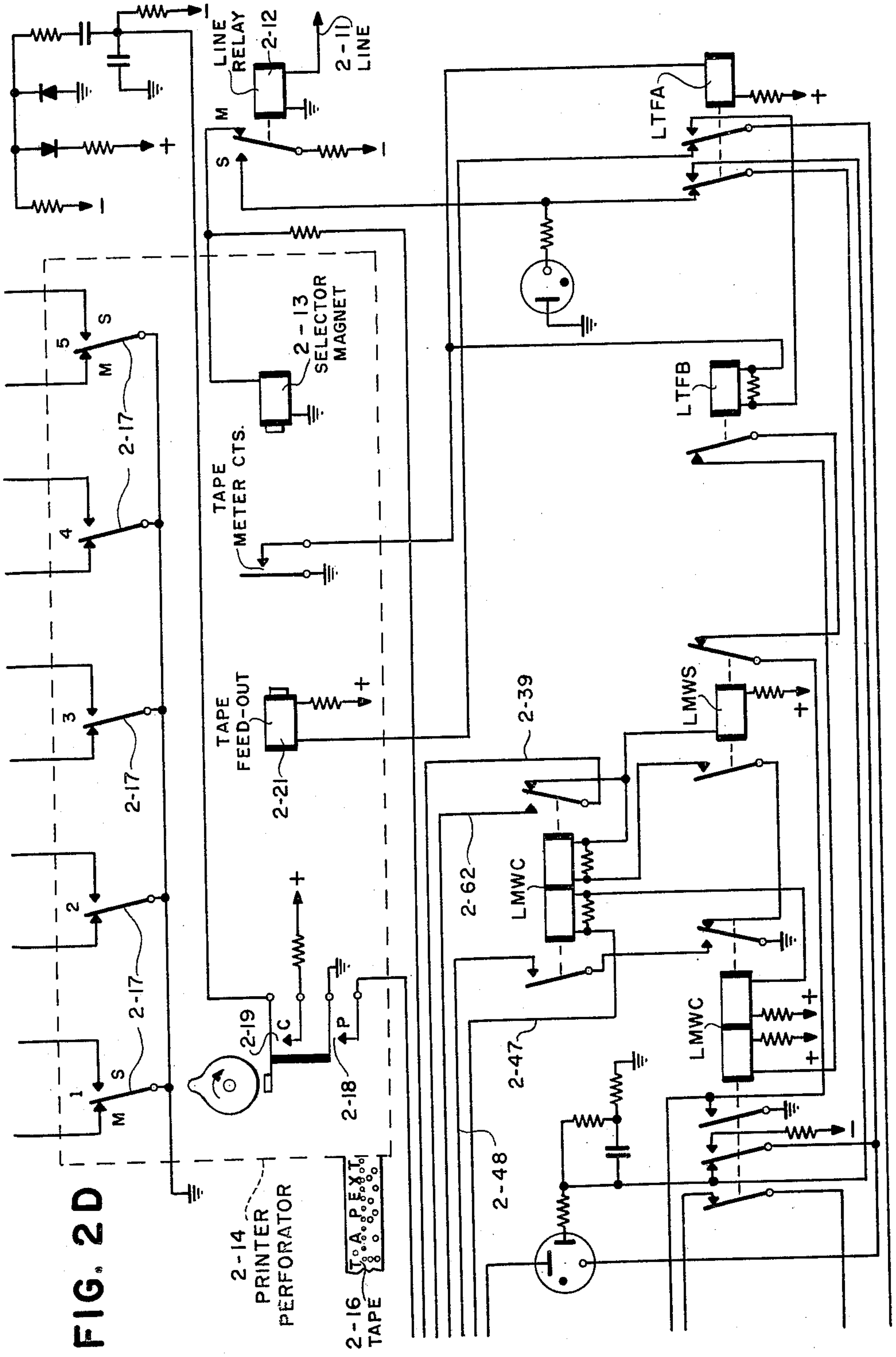

FIG. 2 indicates the manner in which FIGS. 2A through 2D should be arranged with respect to each other.

FIGS. 3A, 3B, 3C, 3D and 3E are details of route circuits and connecting circuits.

Figure 3A:
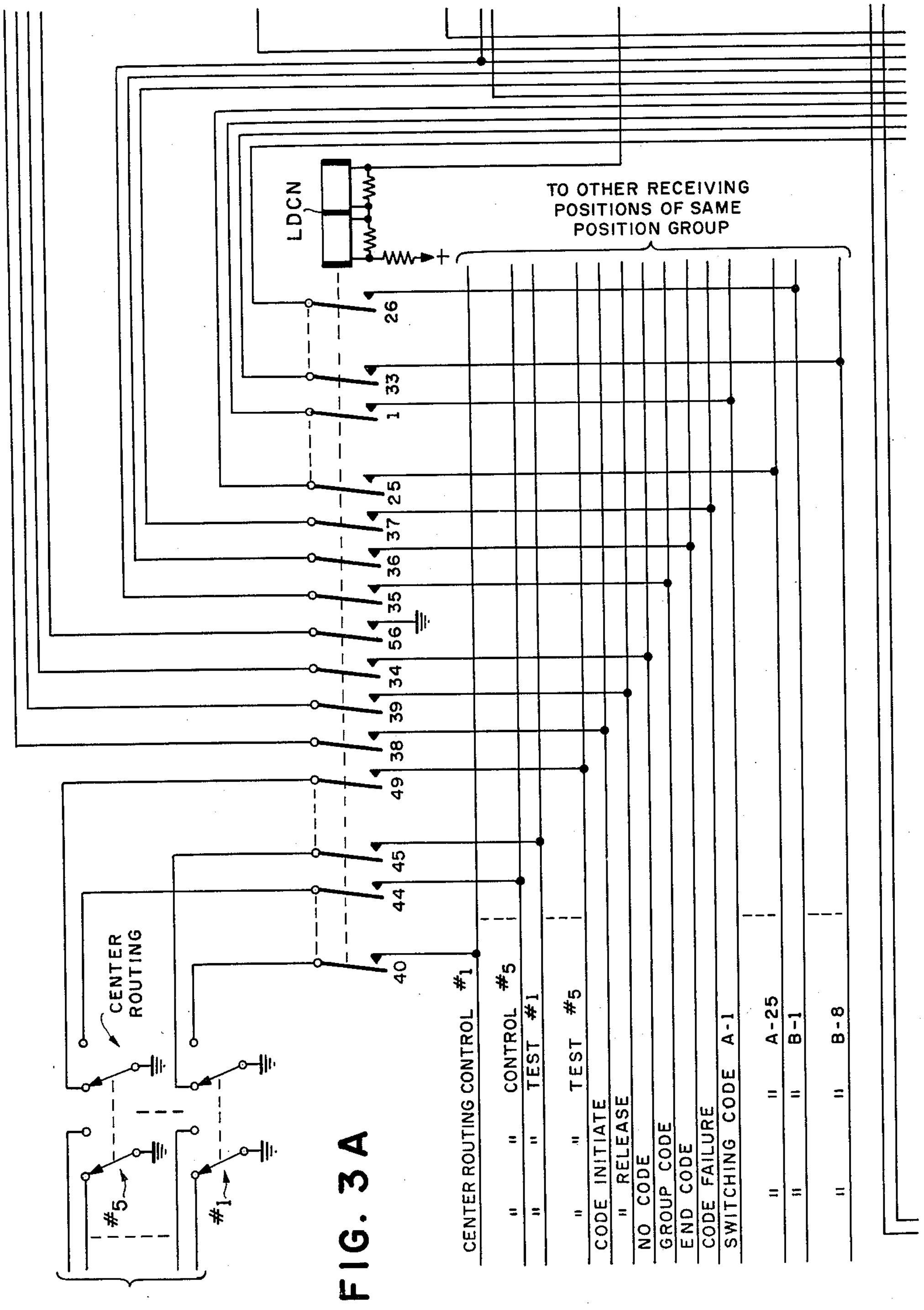
Figures 3, 3B:
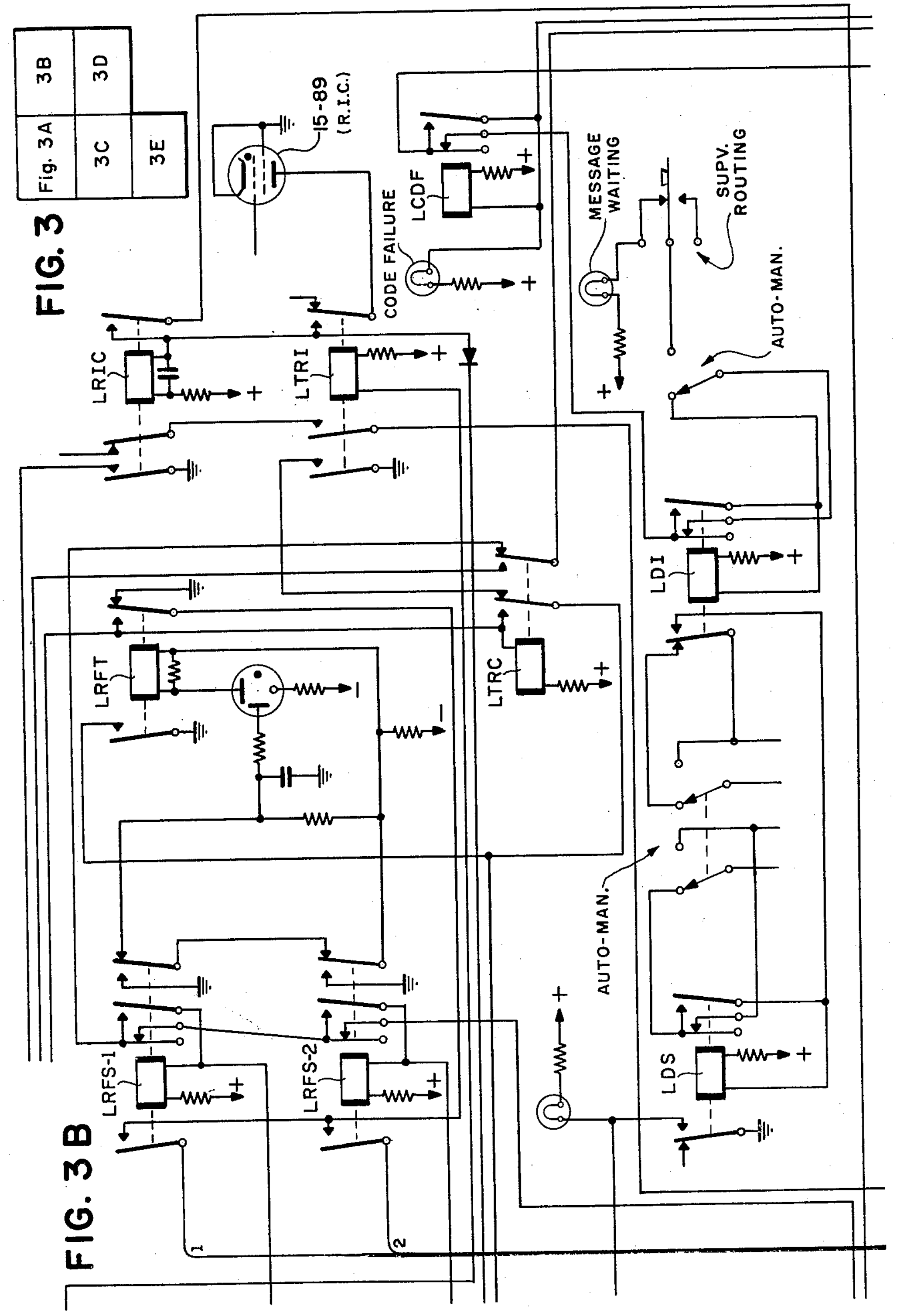
Figure 3C:
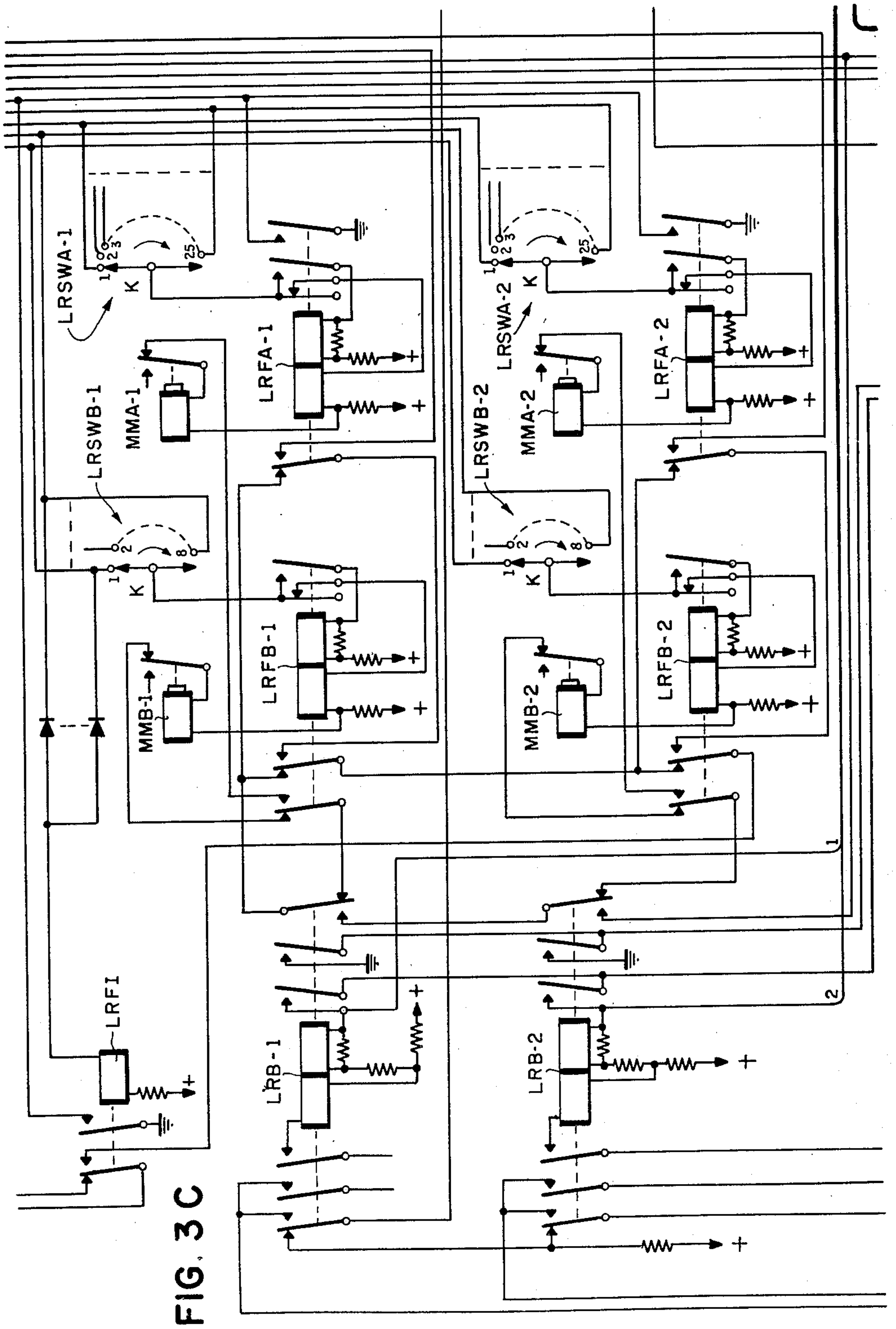
Figure 3D:
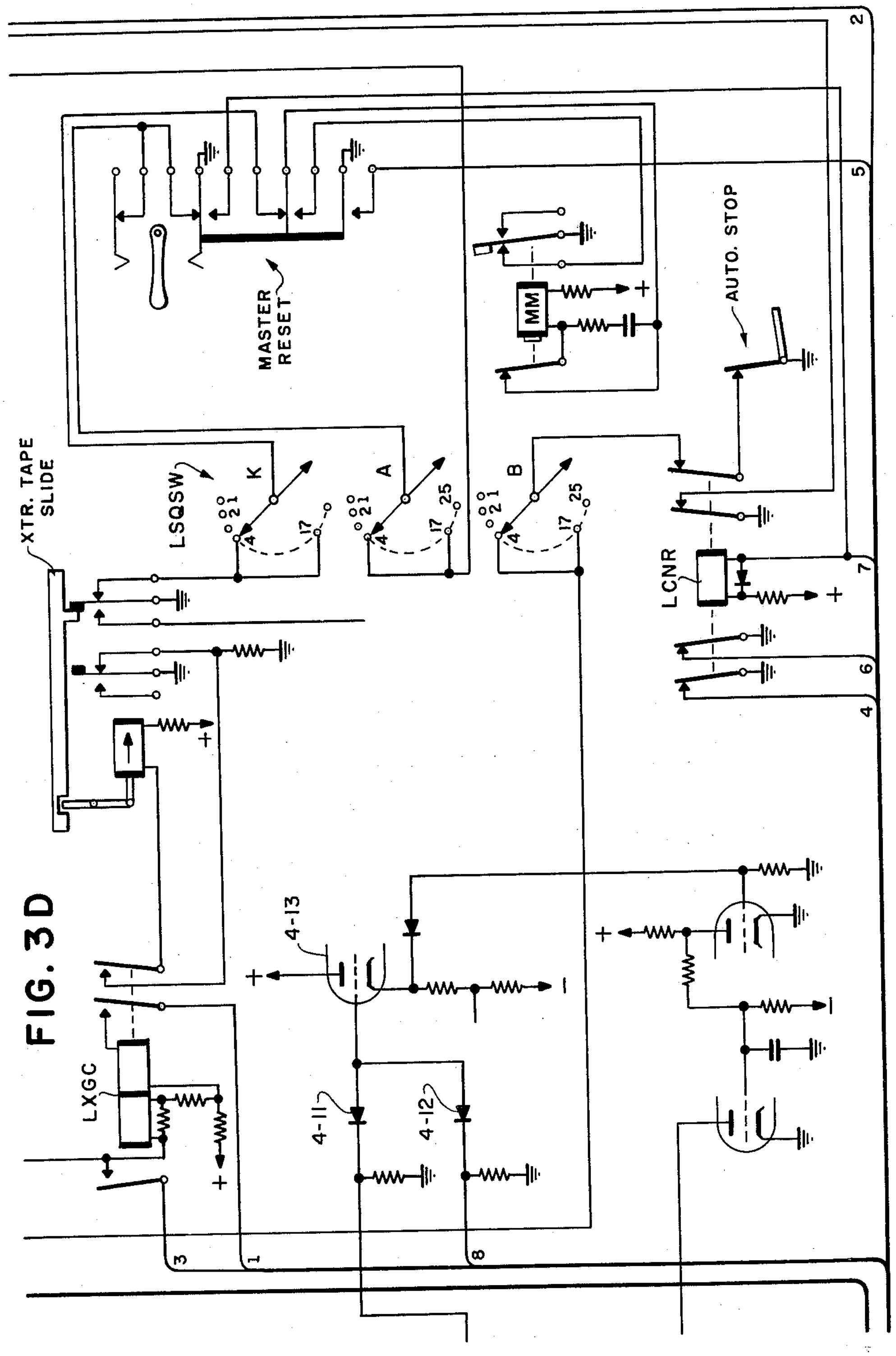
Figure 3E:
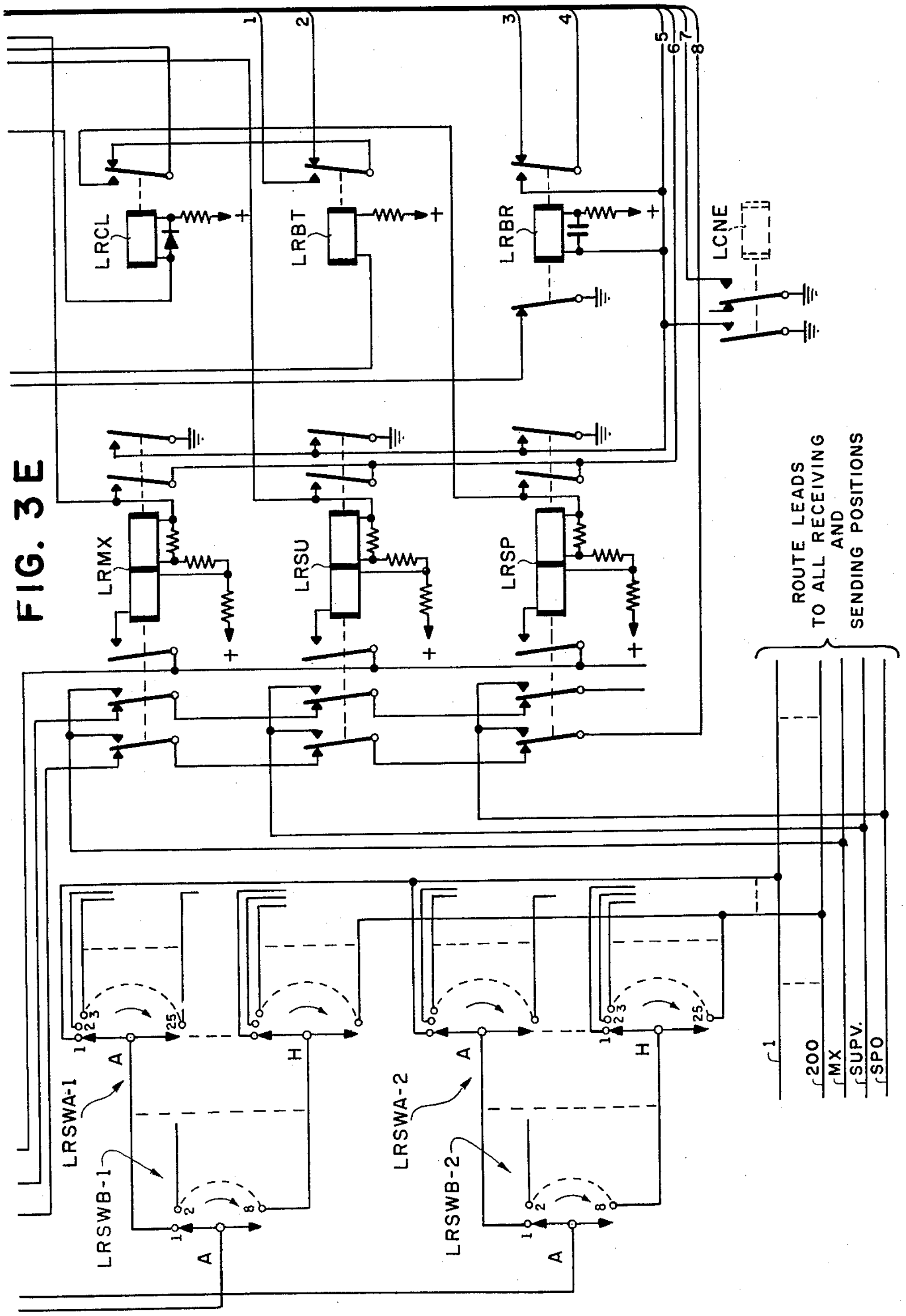

FIG. 3 indicates the manner in which FIGS. 3A through 3E should be arranged with respect to each other.

Figures 4, 4A:
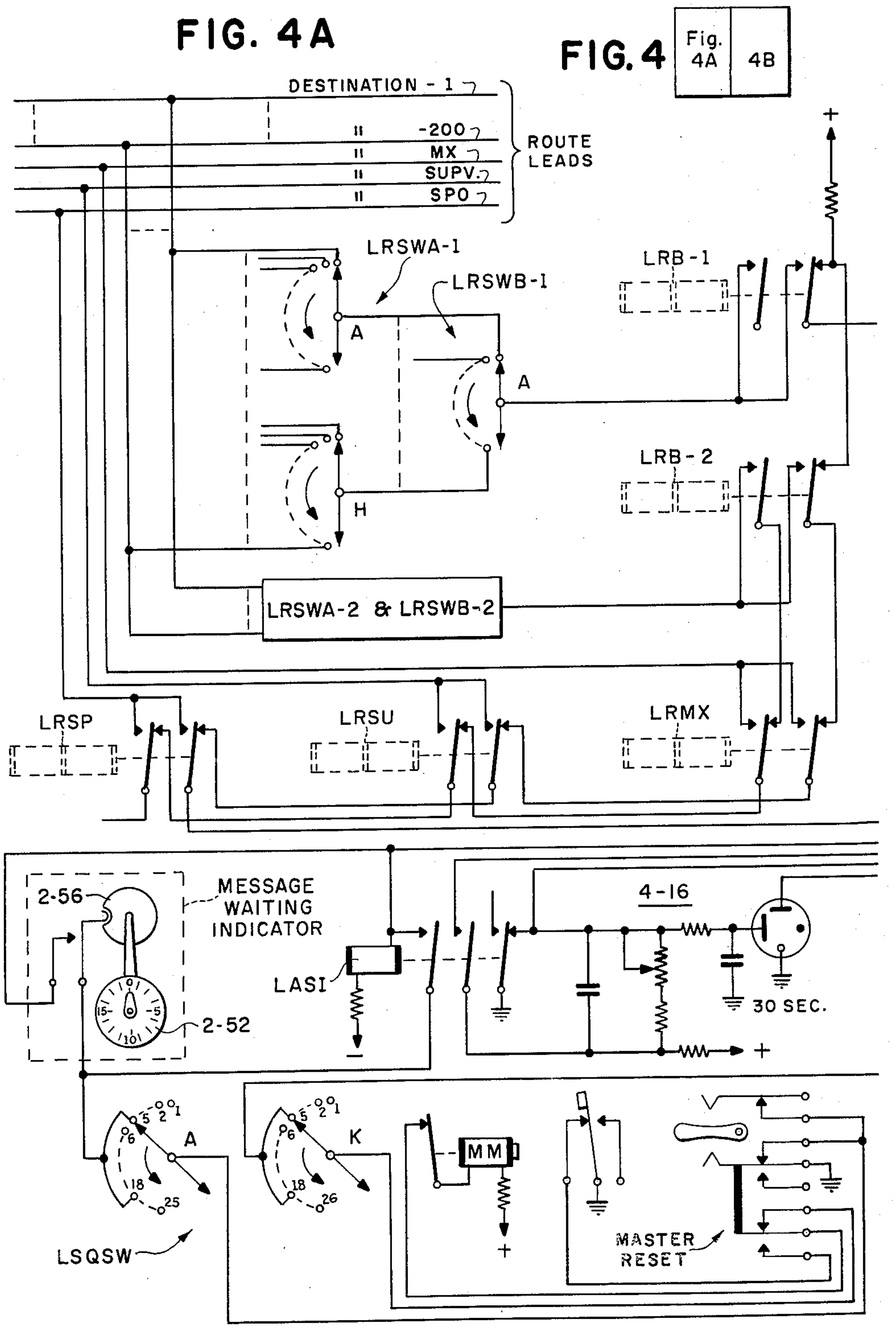
Figure 4B:
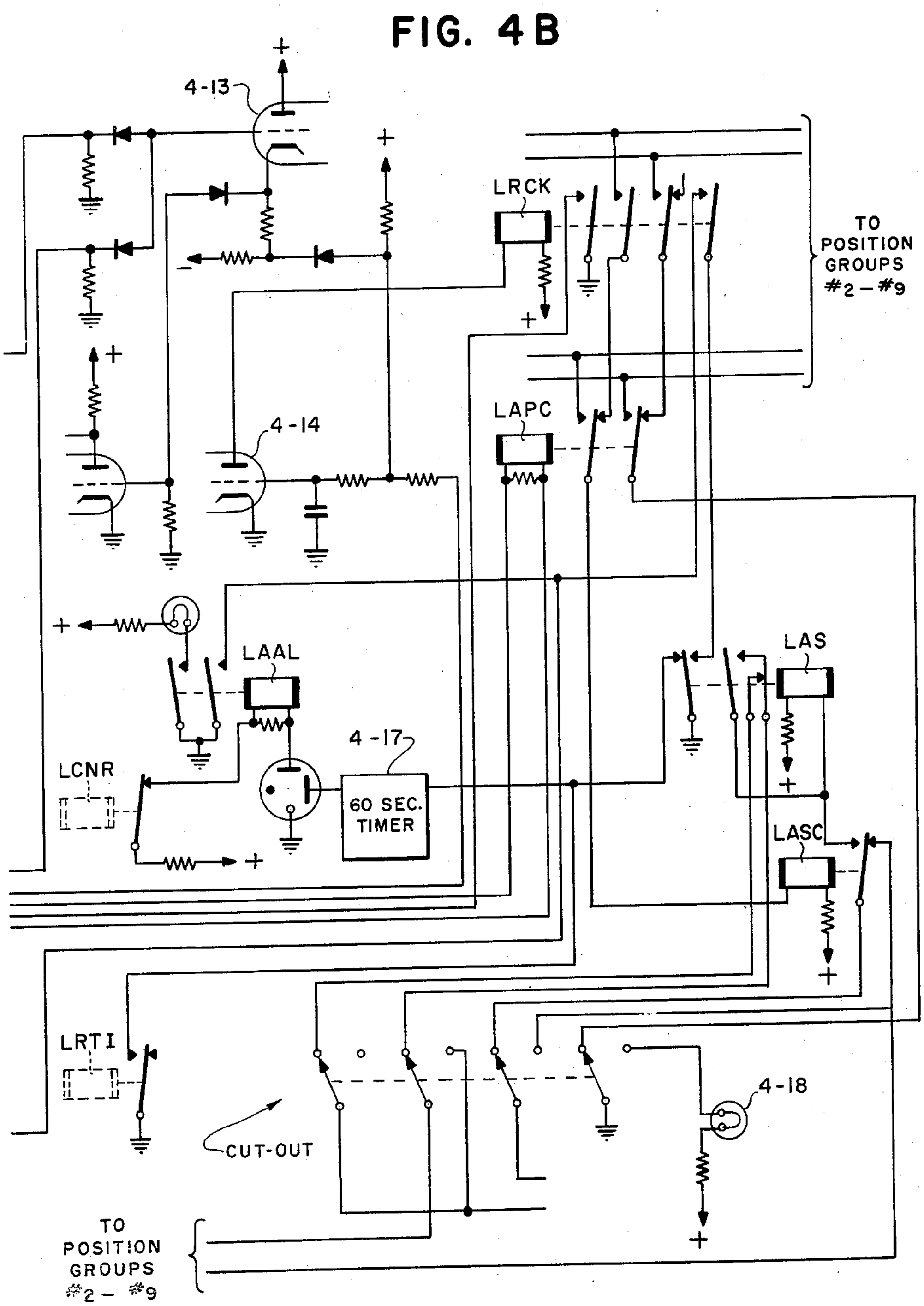

FIGS. 4A and 4B disclose the details of the cross office allotter selection circuits.

FIG. 4 indicates the manner in which FIGS. 4A and 4B should be arranged with respect to each other.

Figure 5A:
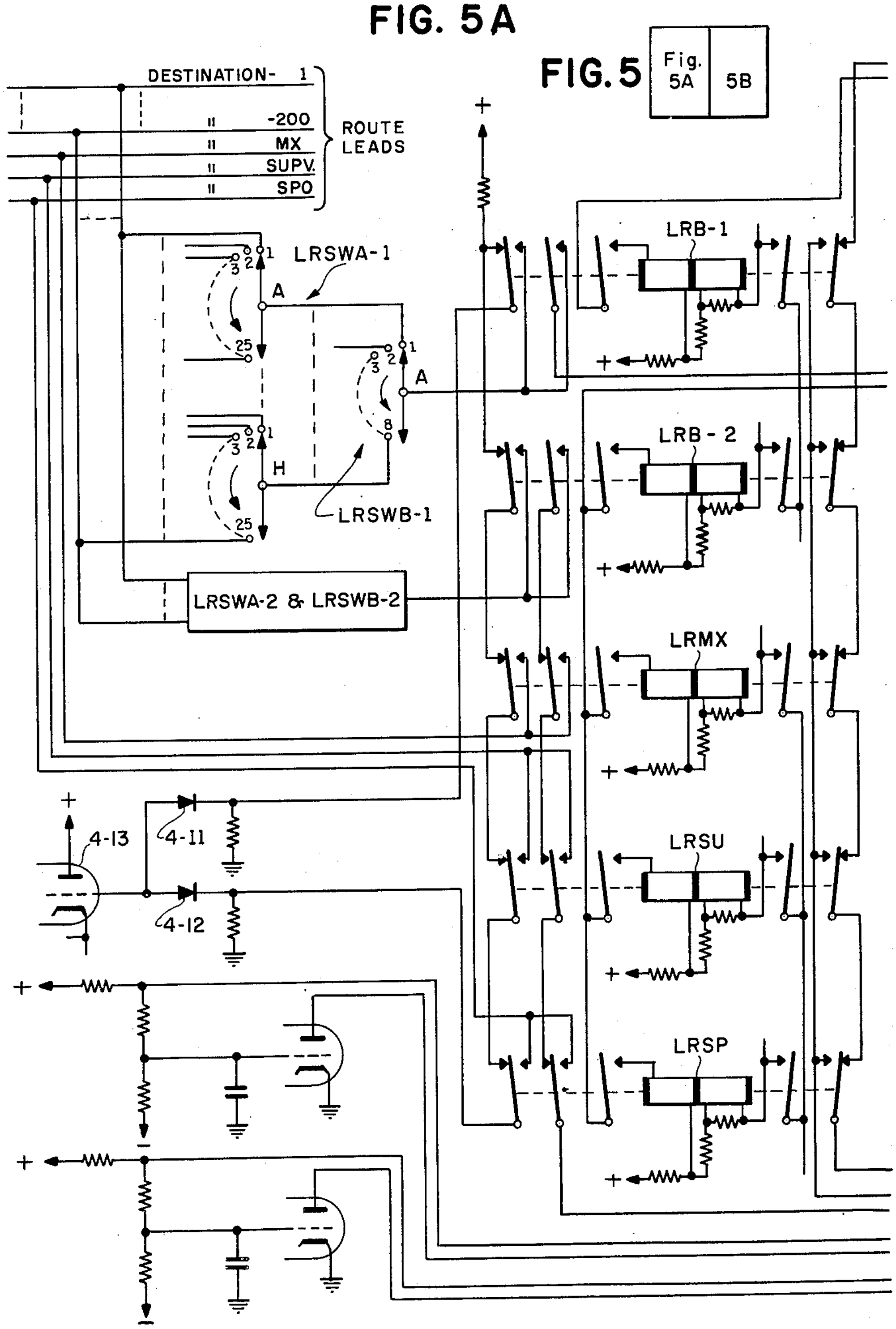
Figure 5B:
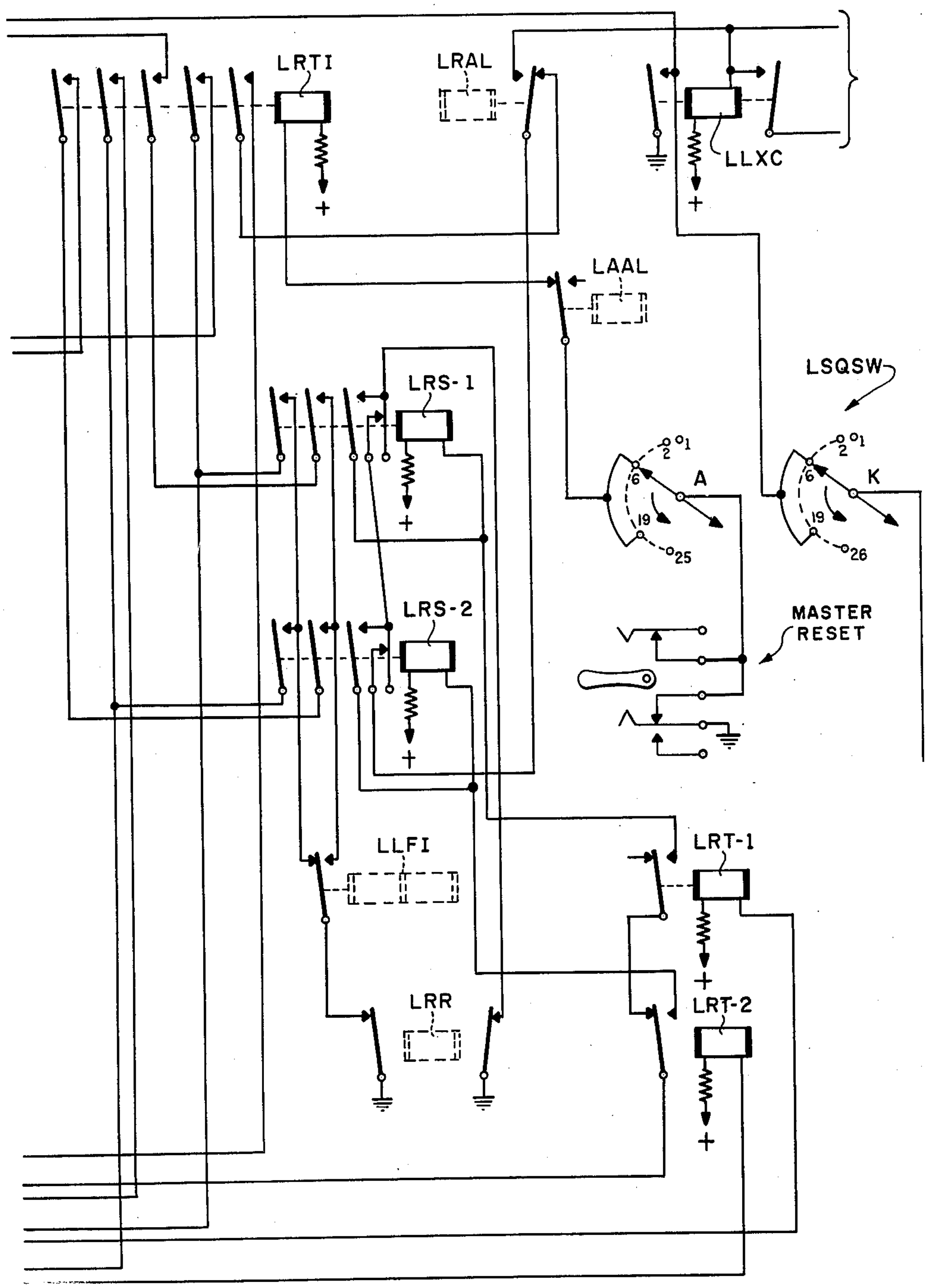

FIGS. 5A and 5B disclose the details of the cross office route selection circuits.

FIG. 5 indicates the manner in which FIGS. 5A and 5B should be arranged with respect to each other.

Figure 6A:
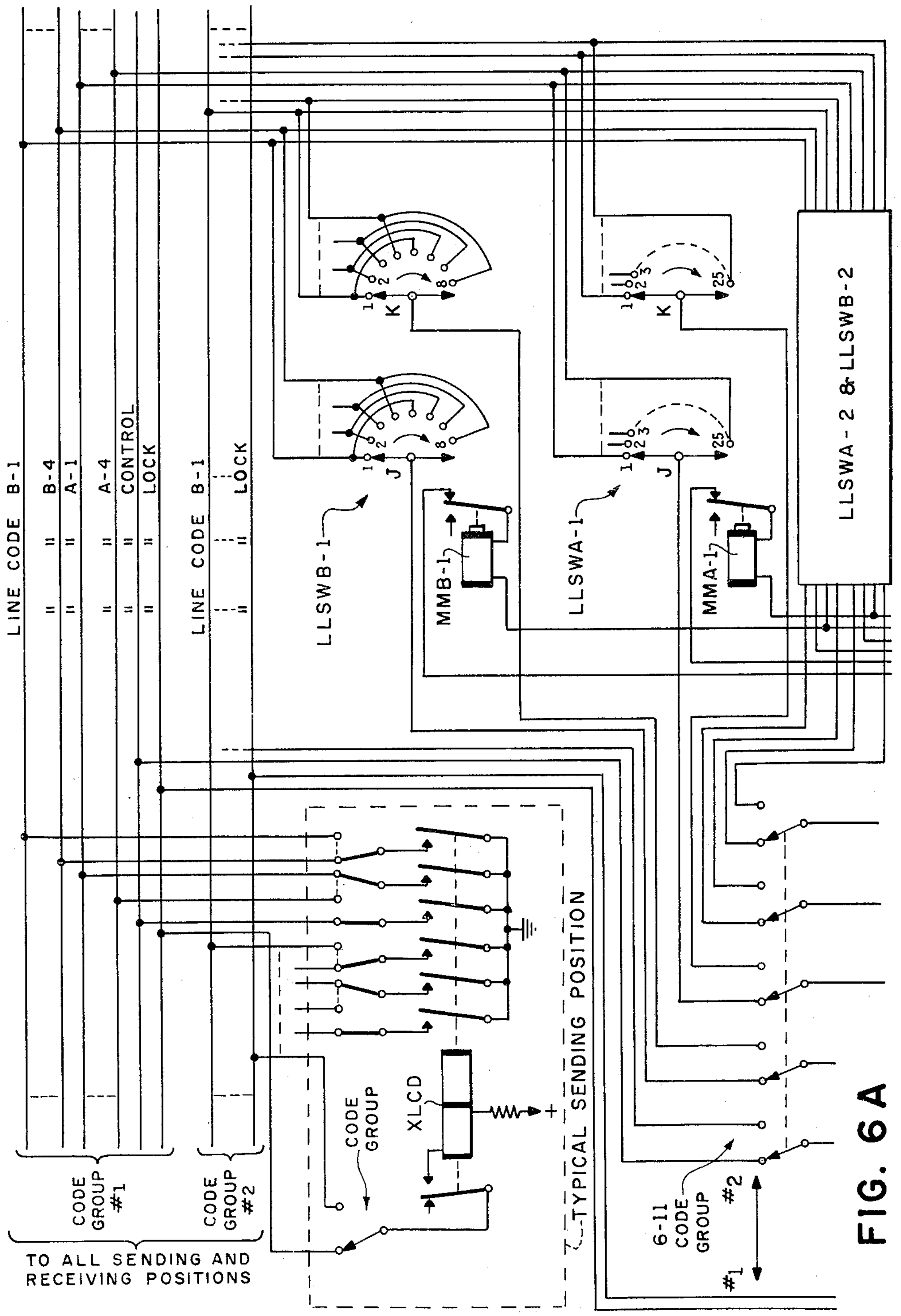
Figures 6, 6B:
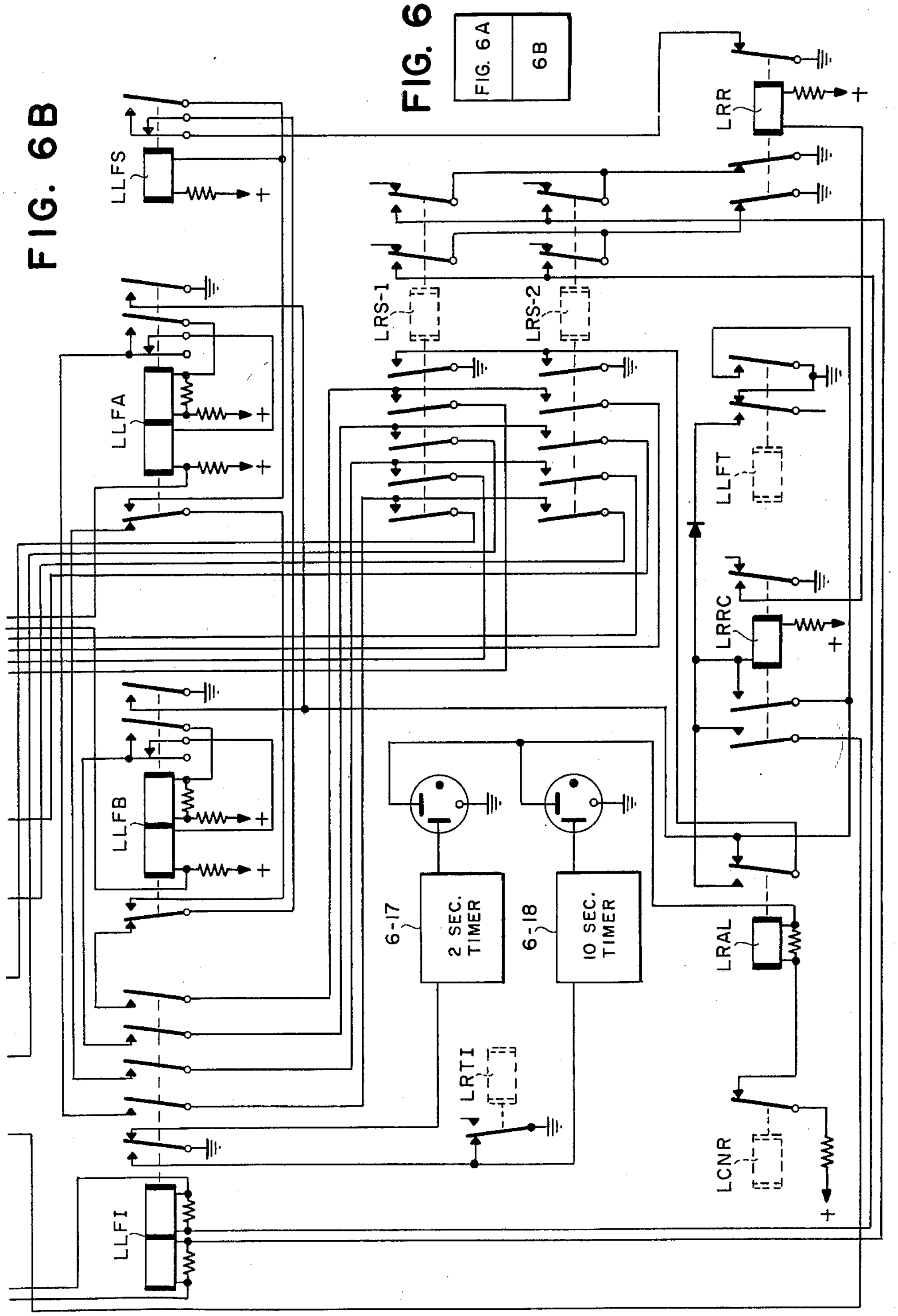

FIGS. 6A and 6B disclose the details of the cross office selection circuits.

FIG. 6 indicates the manner in which FIGS. 6A through 6C should be arranged with respect to each other.

Figure 7:
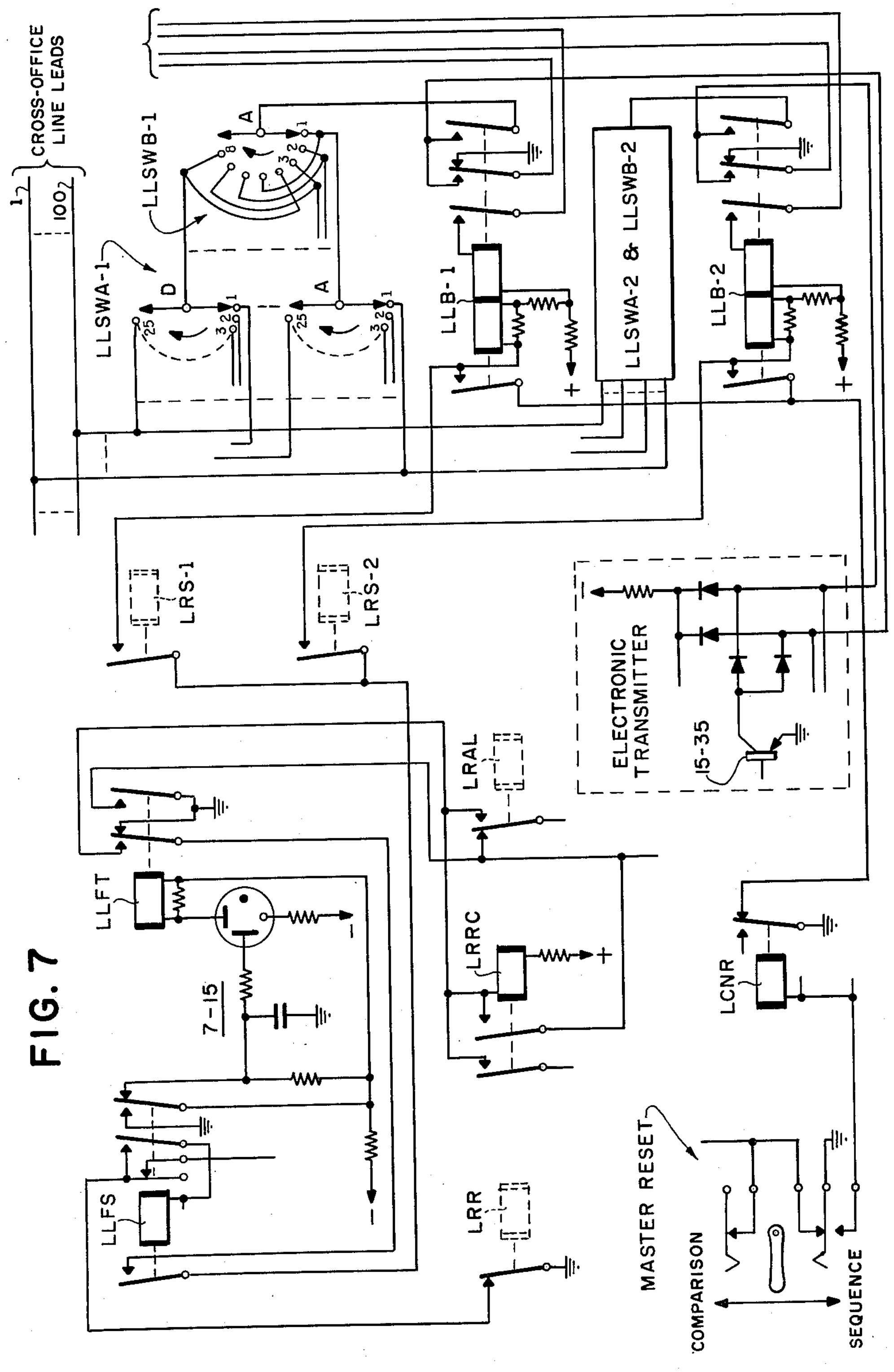

FIG. 7 discloses the details of the cross office line connecting circuits.

Figure 8:
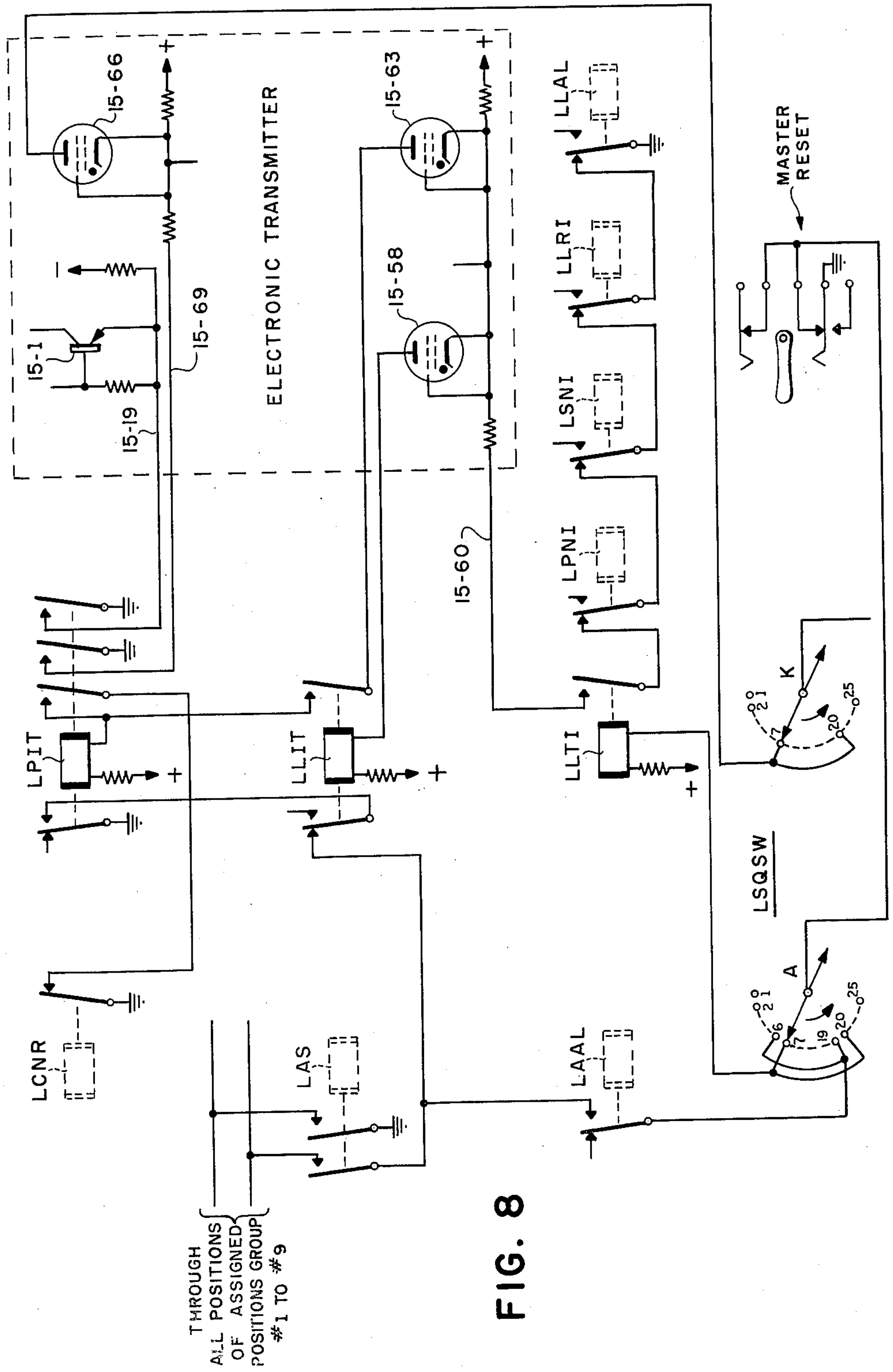

FIG. 8 discloses the details of the cross office allotter release circuits.

Figure 9A:
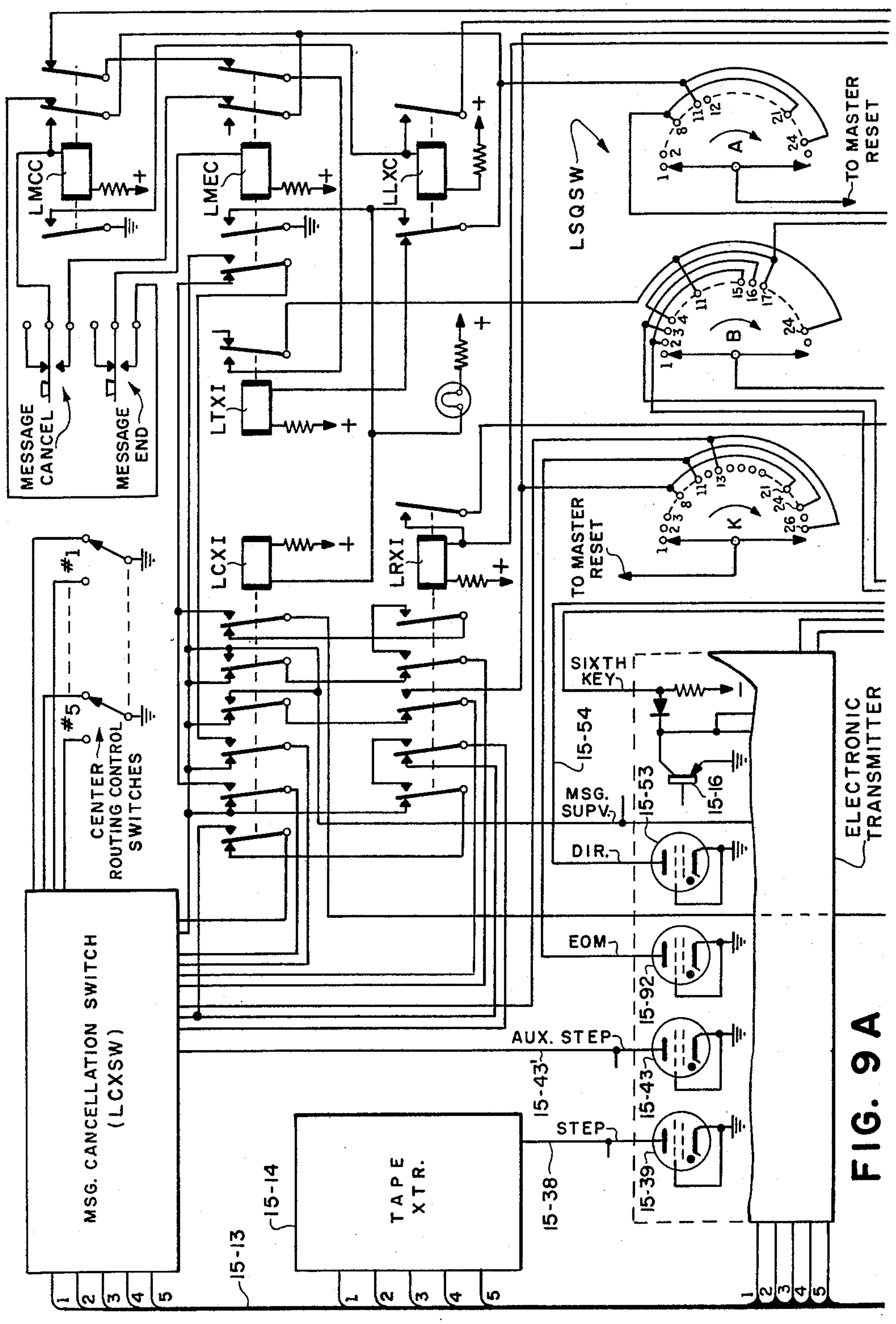
Figures 9, 9B:
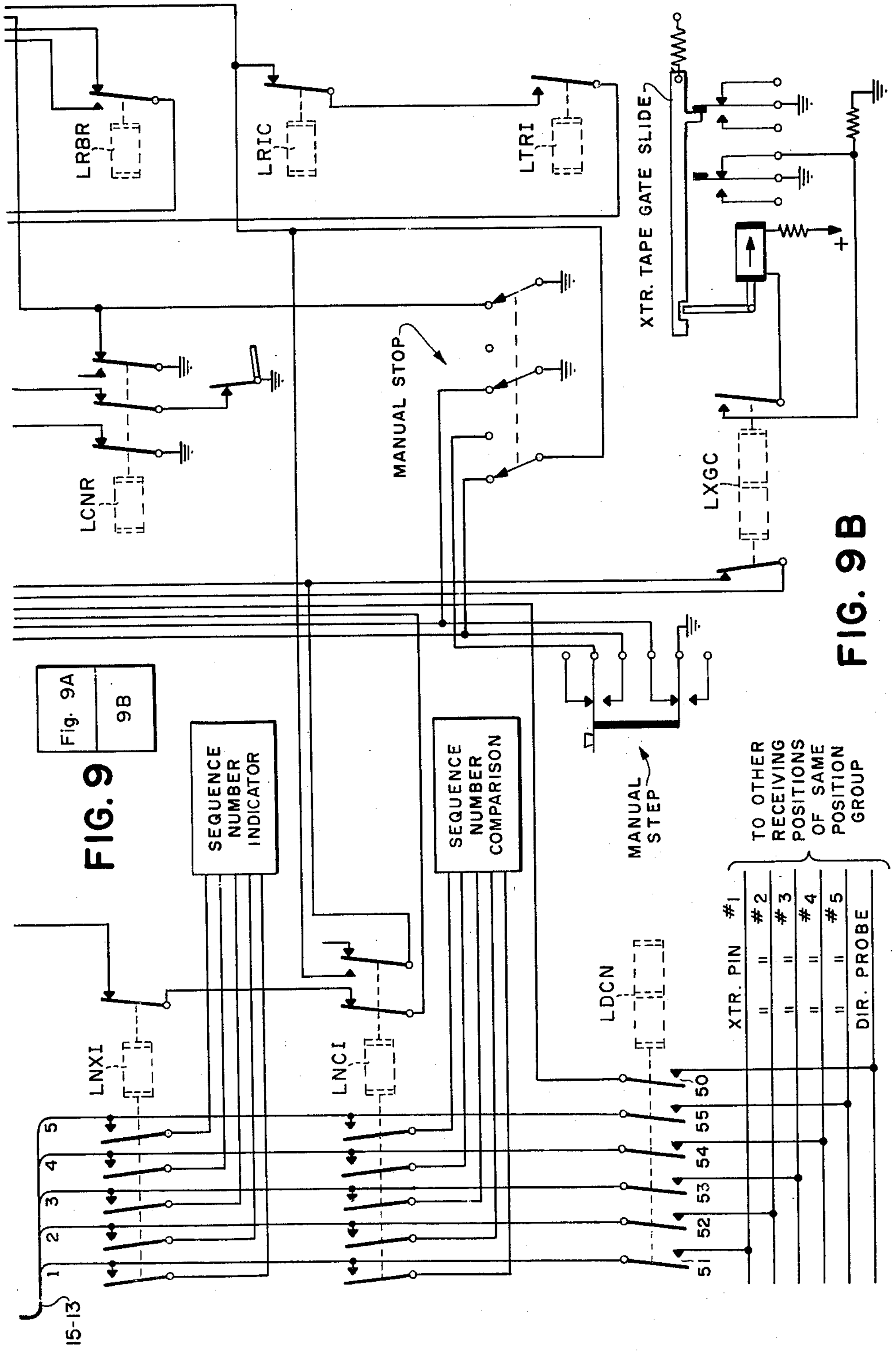

FIGS. 9A and 9B disclose details of the cross office tape transmitter and message transmission circuits.

FIG. 9 indicates the manner in which FIGS. 9A and 9B should be arranged with respect to each other.

Figures 10, 10A:
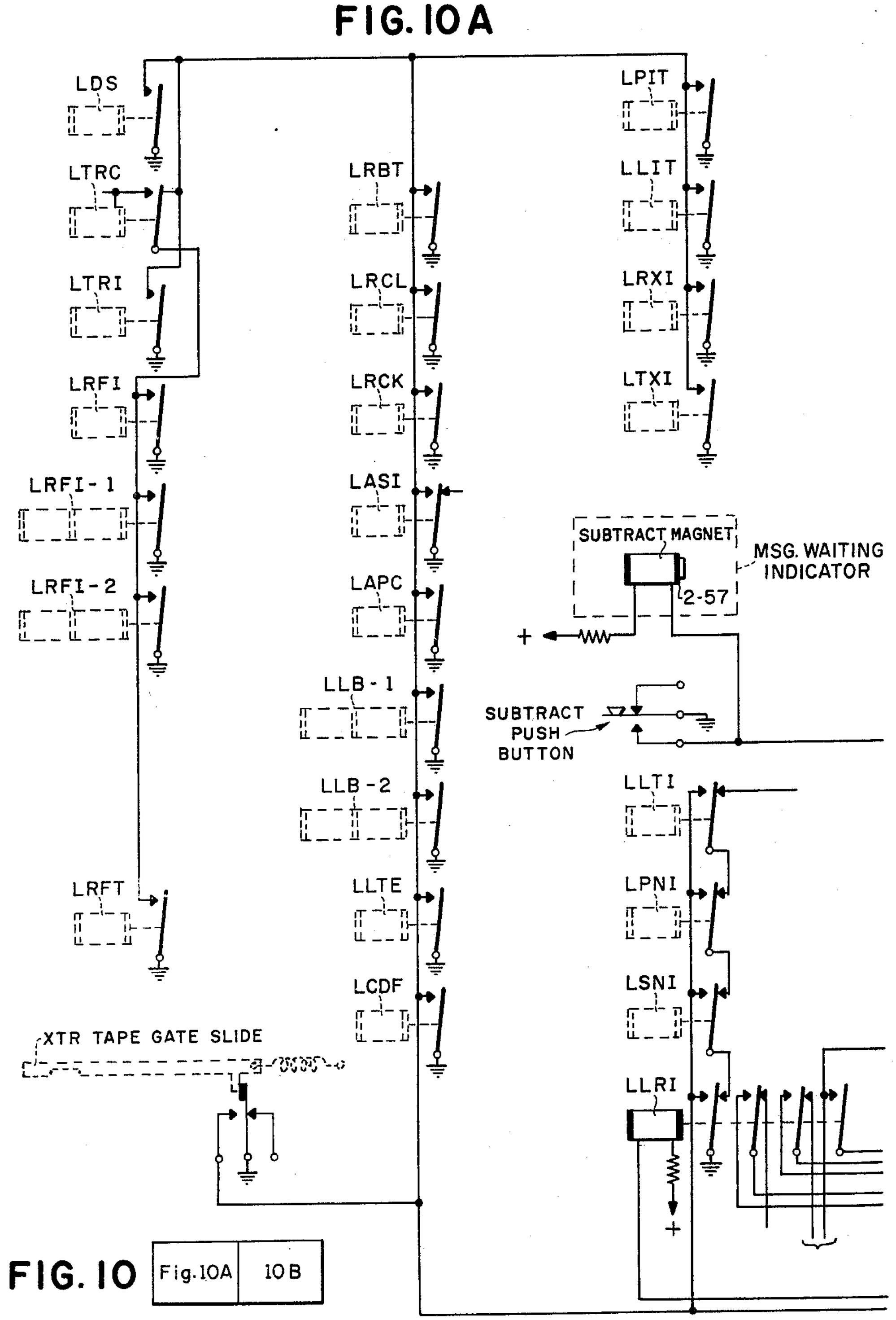
Figure 10B:
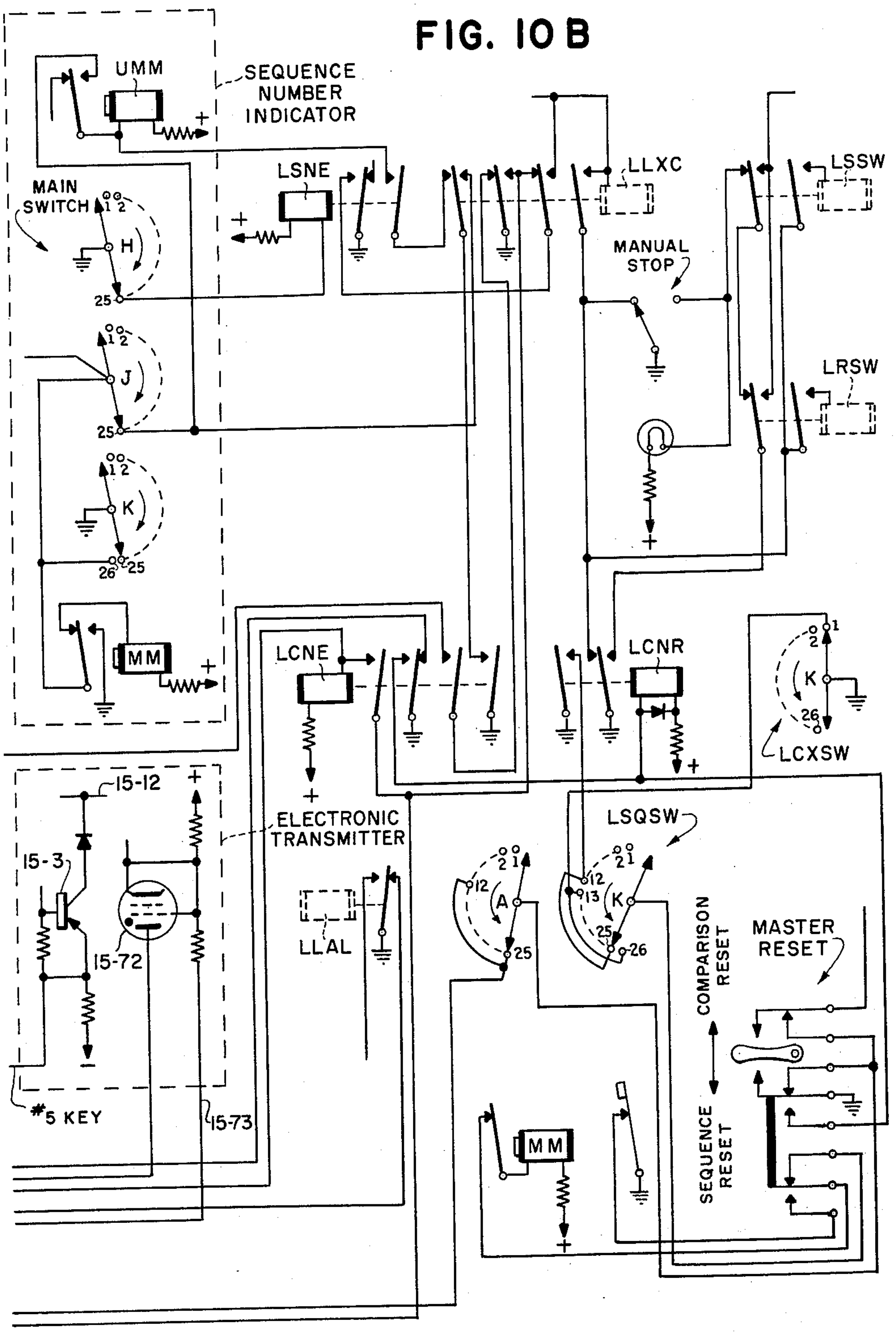

FIGS. 10A and 10B disclose the details of cross office line disconnection circuits.

FIG. 10 indicates the manner in which FIGS. 10A and 10B should be arranged with respect to each other.

FIGS. 11A, 11B, 11C and 11D disclosed the detailed circuits involved in the cross office trouble detecting and alarm circuits.

Figures 11, 11A:
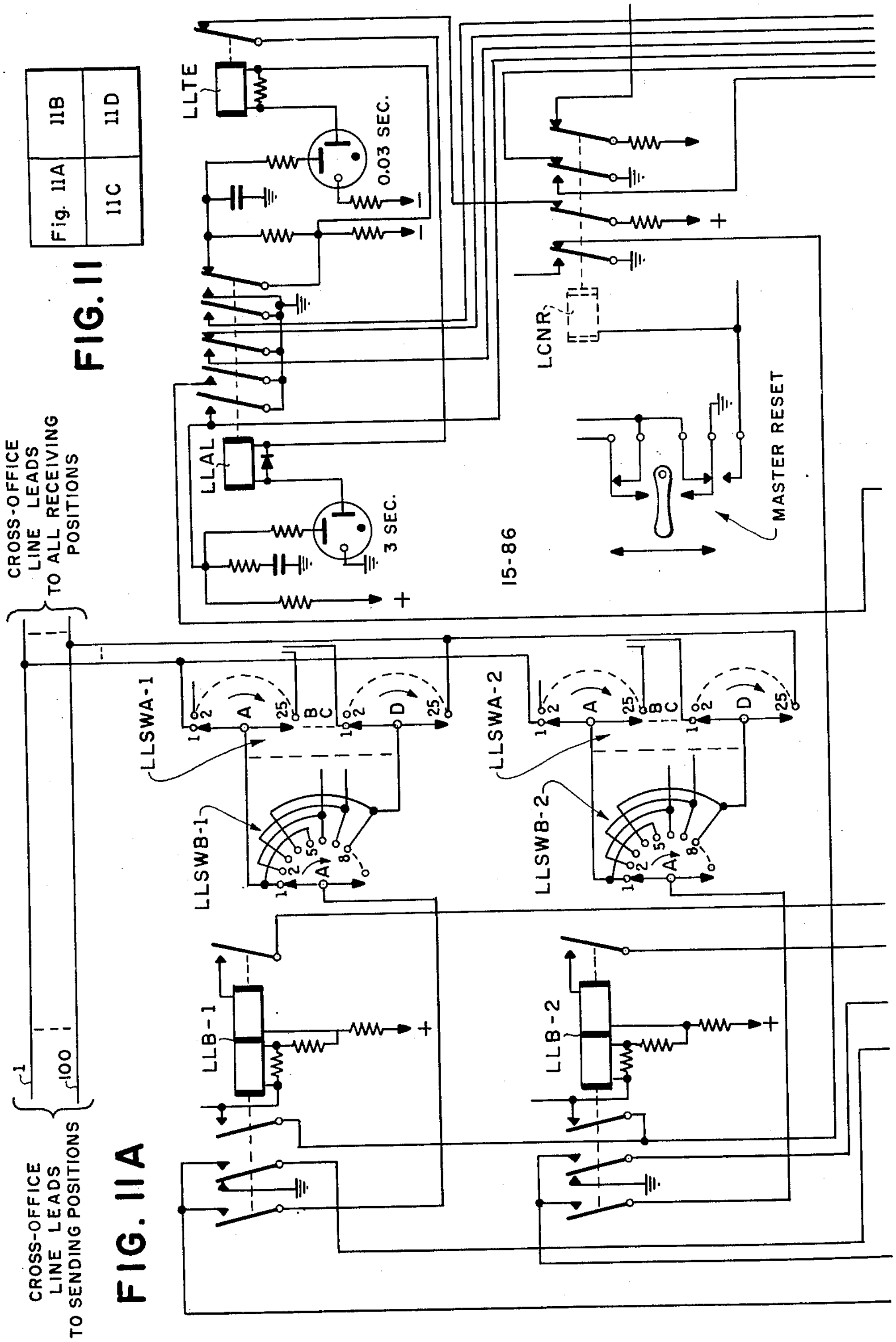
Figure 11B:
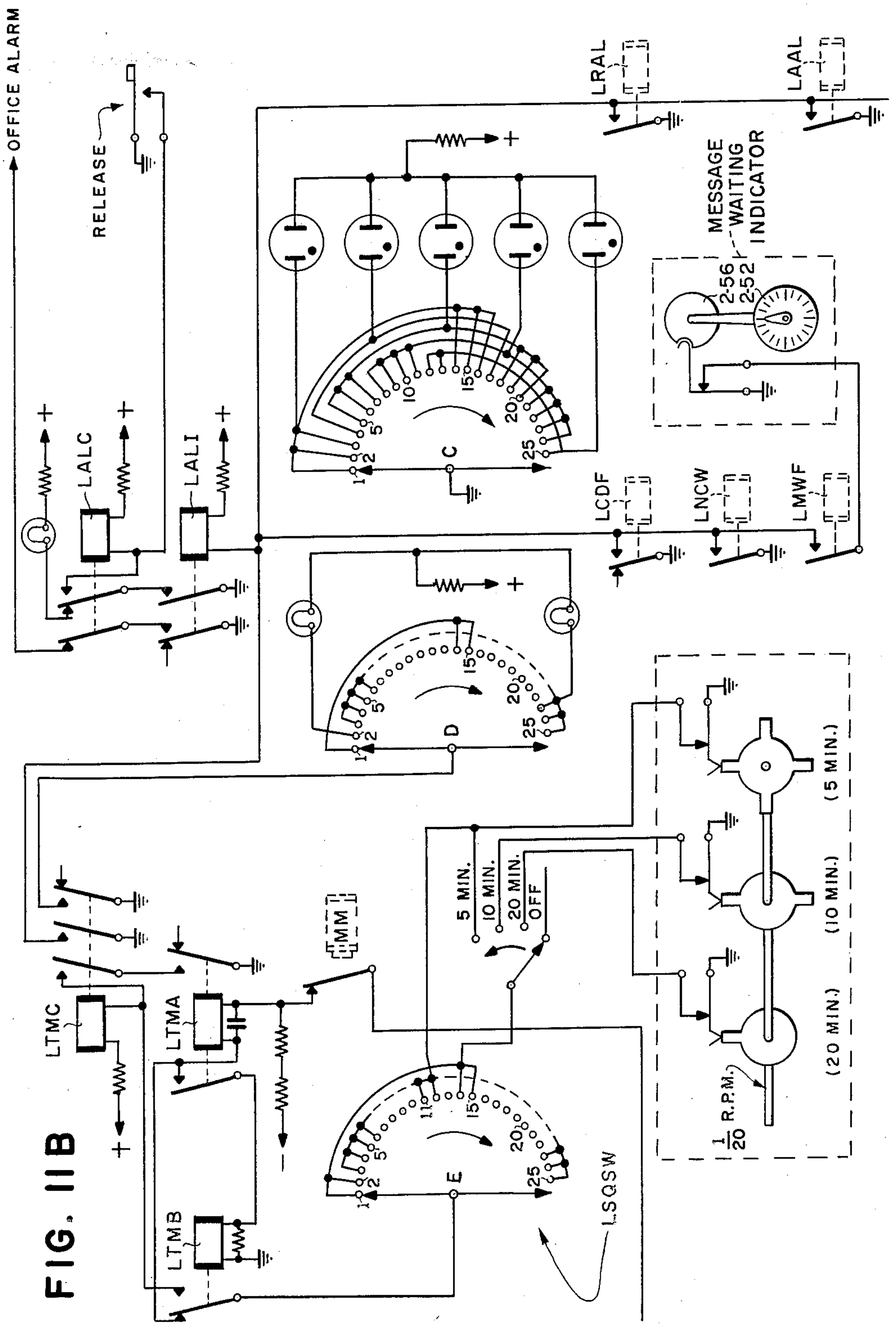
Figure 11C:
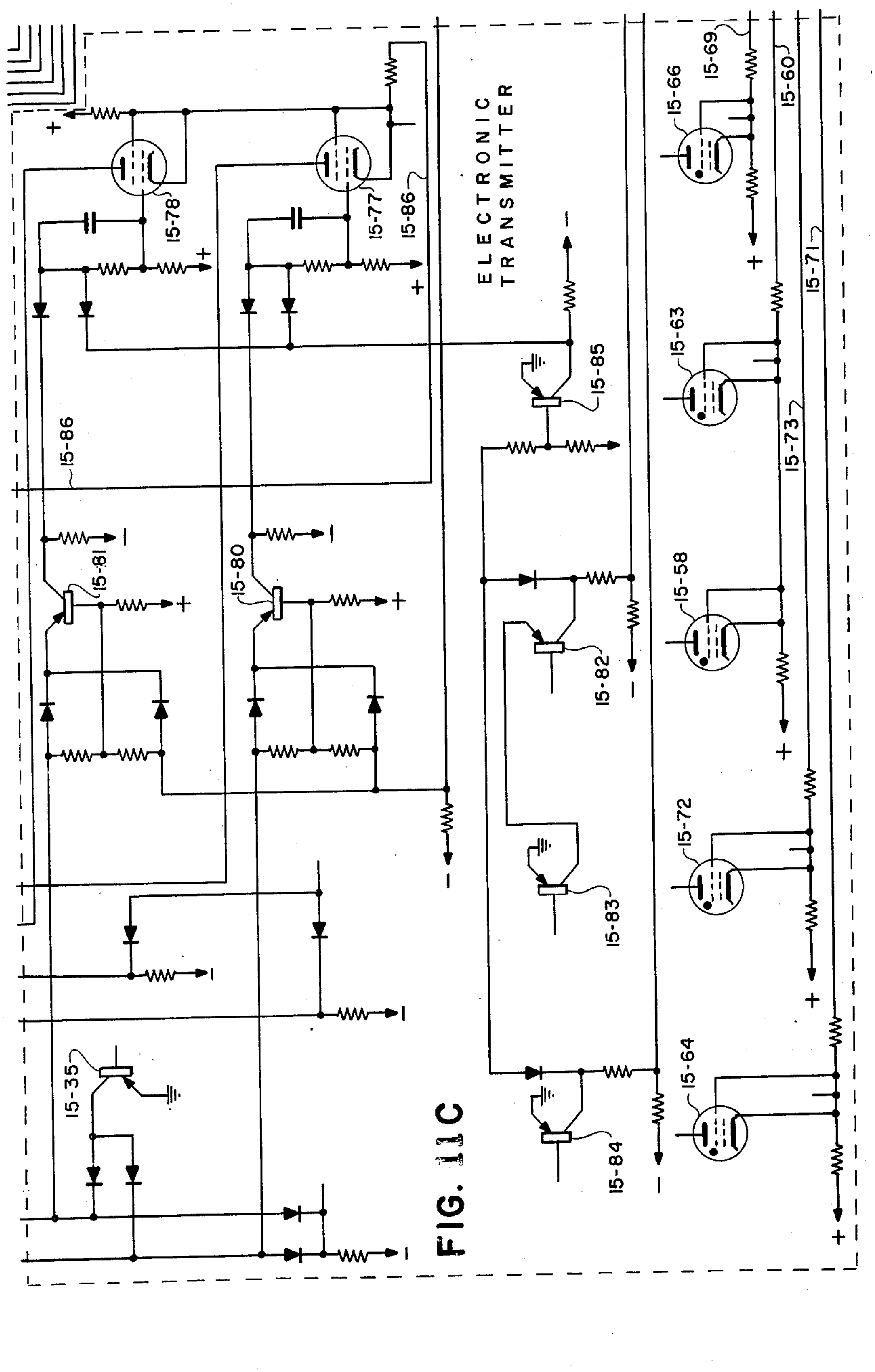
Figure 11D:
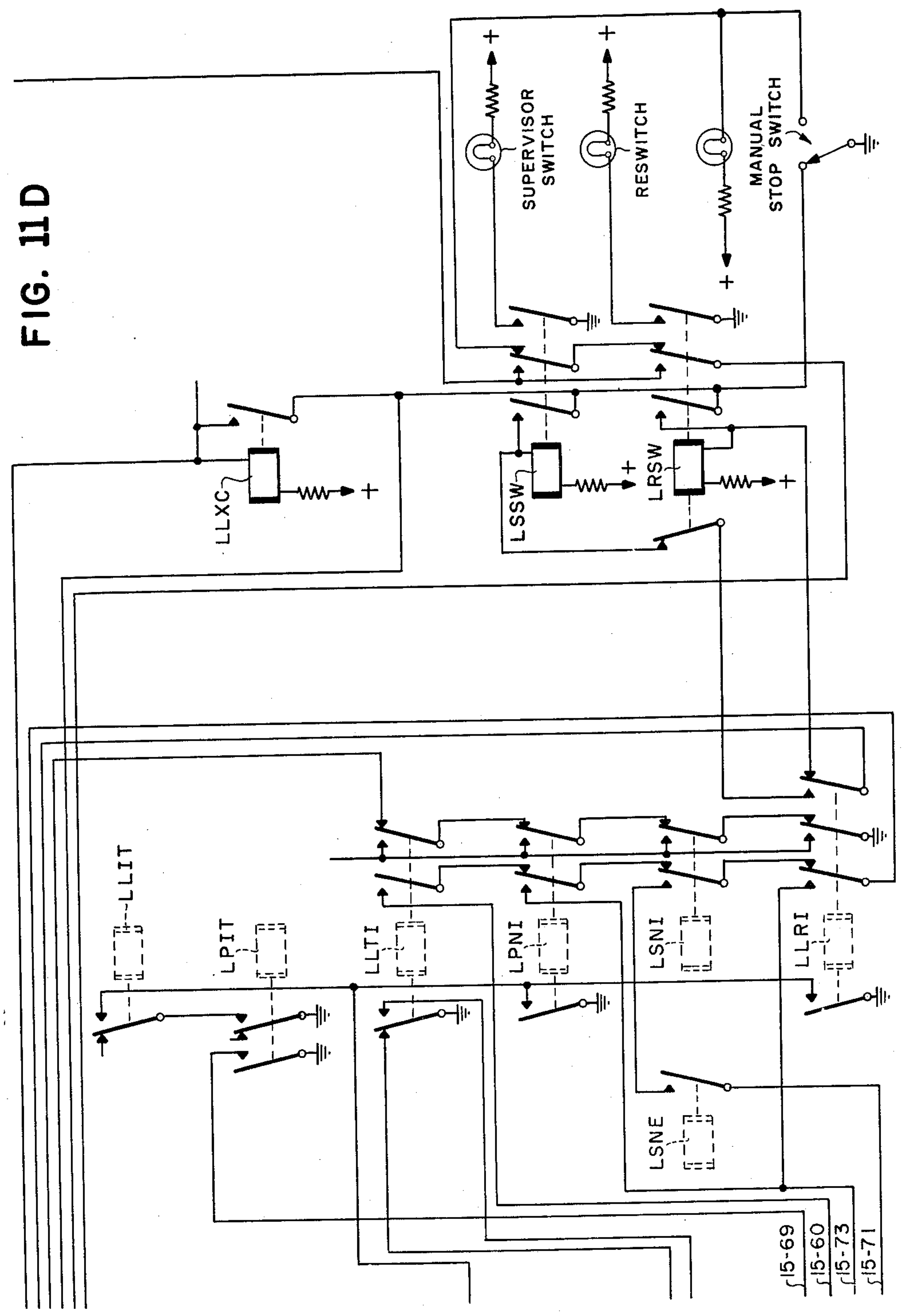

FIG. 11 indicates the manner in which FIGS. 11A through 11D should be arranged with respect to each other.

Figure 12:
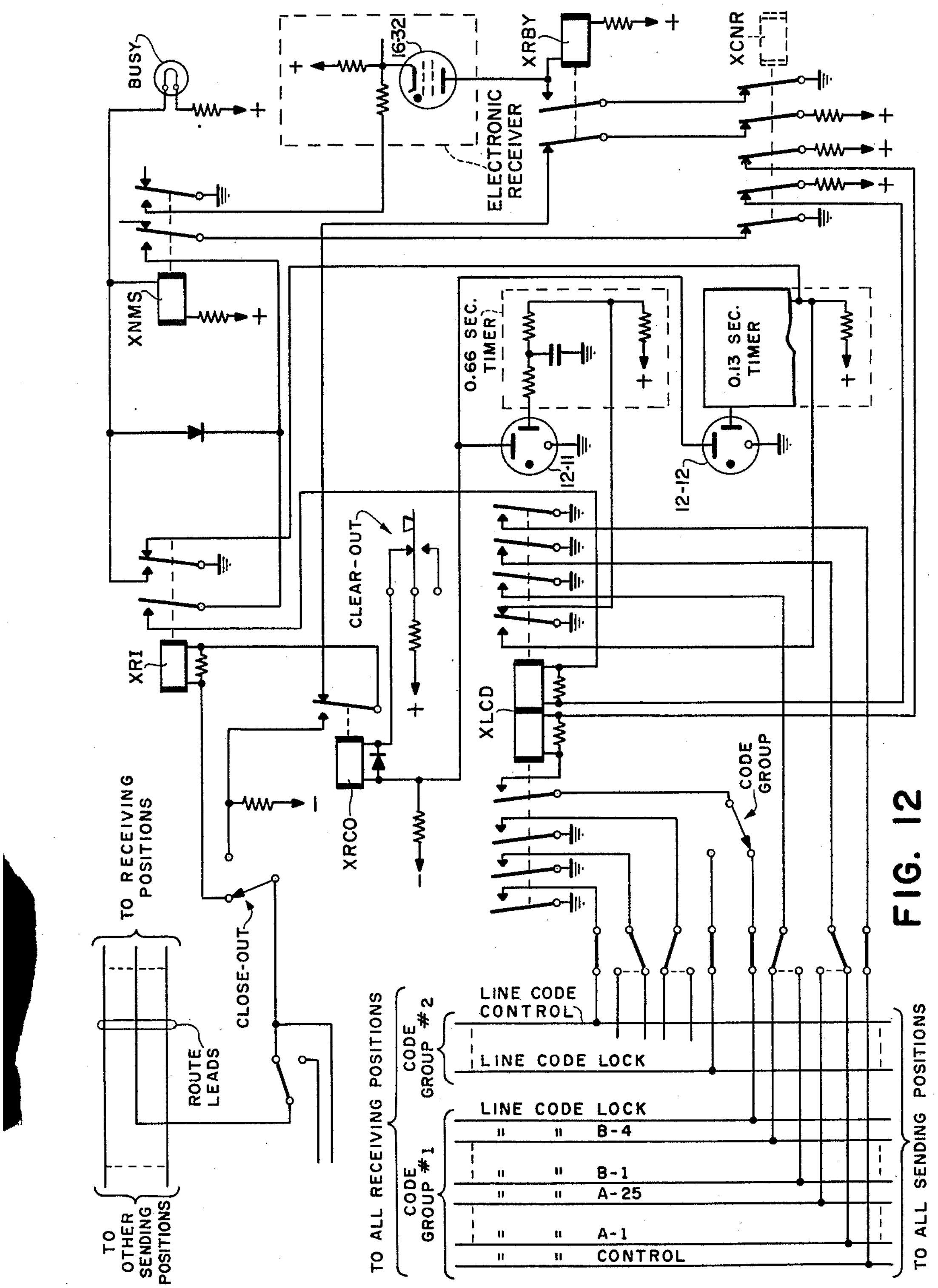

FIG. 12 discloses the details of the route lead circuits.

Figure 13:
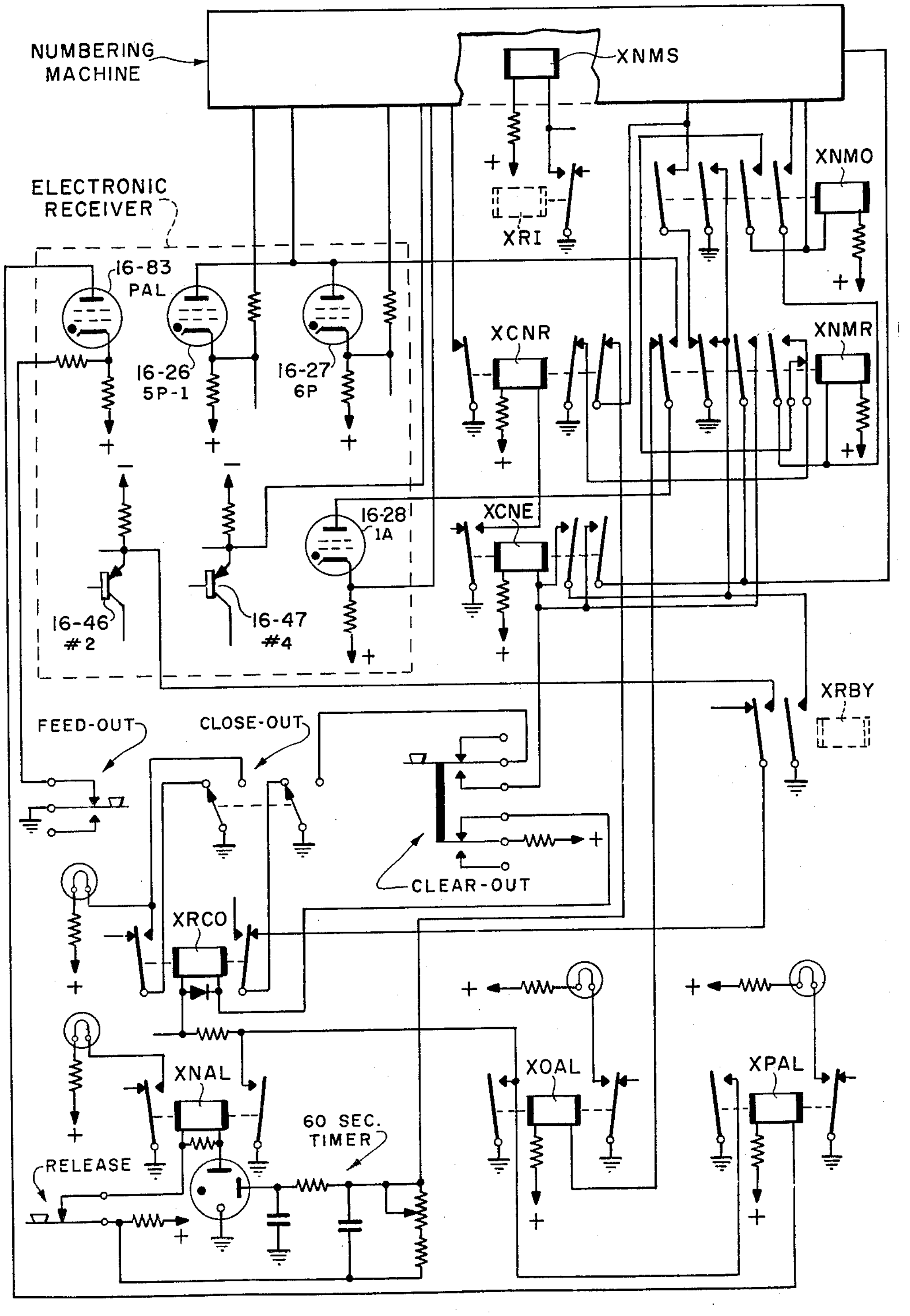

FIG. 13 discloses the details of the cross office connection circuits.

Figures 14, 14A:
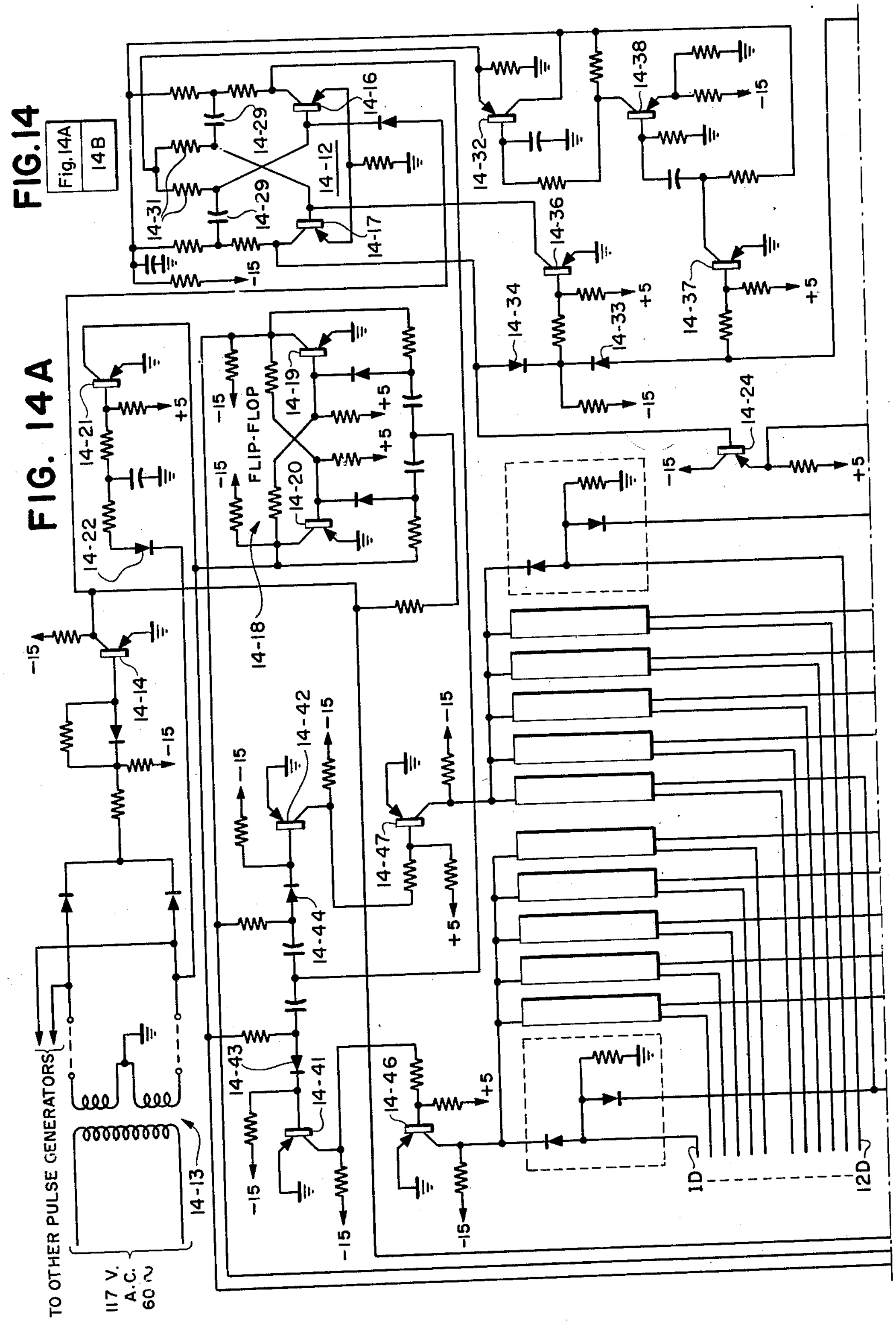
Figure 14B:
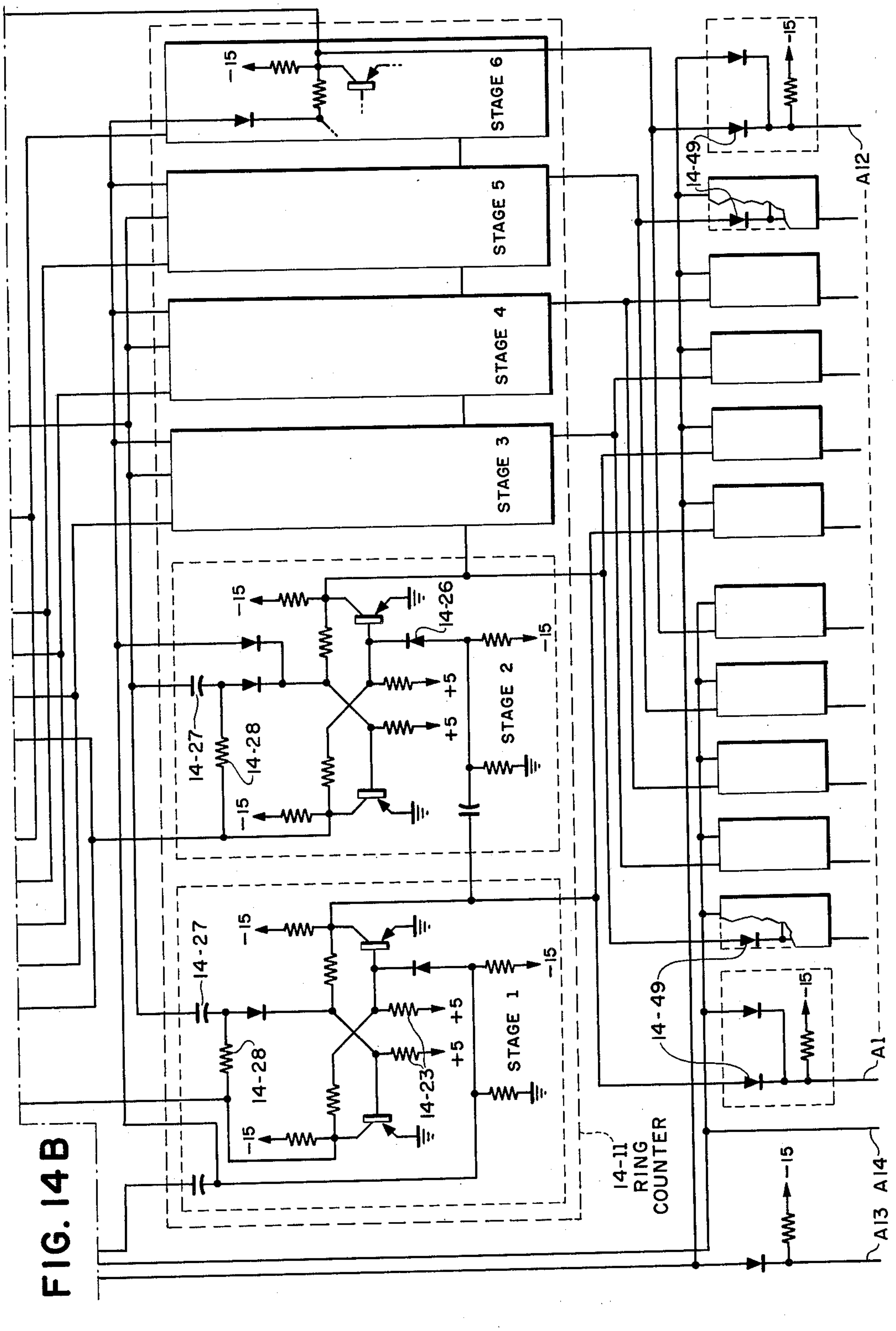

FIGS. 14A and 14B disclosed the detailed circuits of a pulse generator.

FIG. 14 indicates the manner in which FIGS. 14A and 14B should be arranged with respect to each other.

FIGS. 15A, 15B, 15C and 15D disclose the circuit details of the electronic transmitter employed at a line receiving position.

Figure 15A:
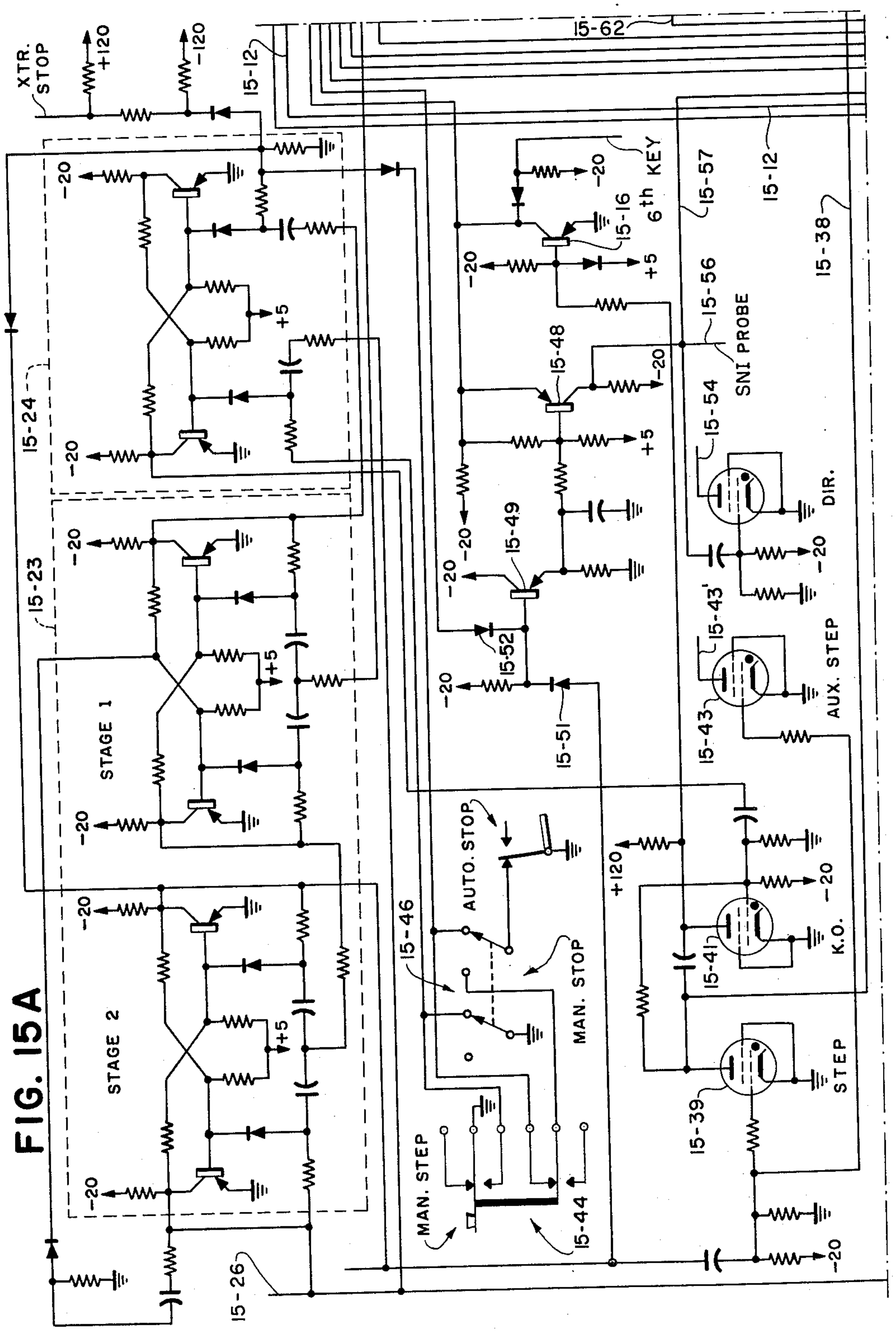
Figure 15B:
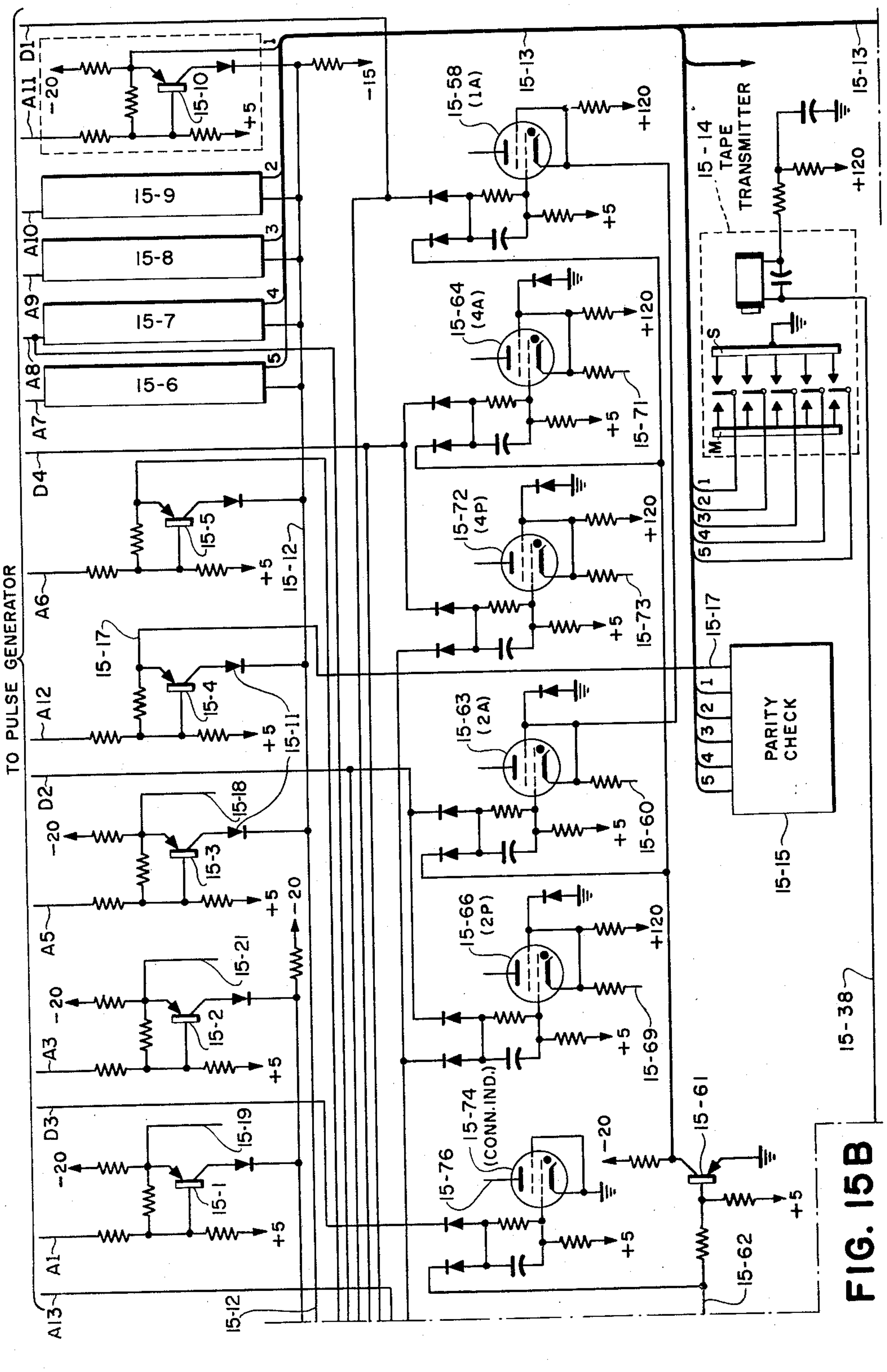
Figure 15C:
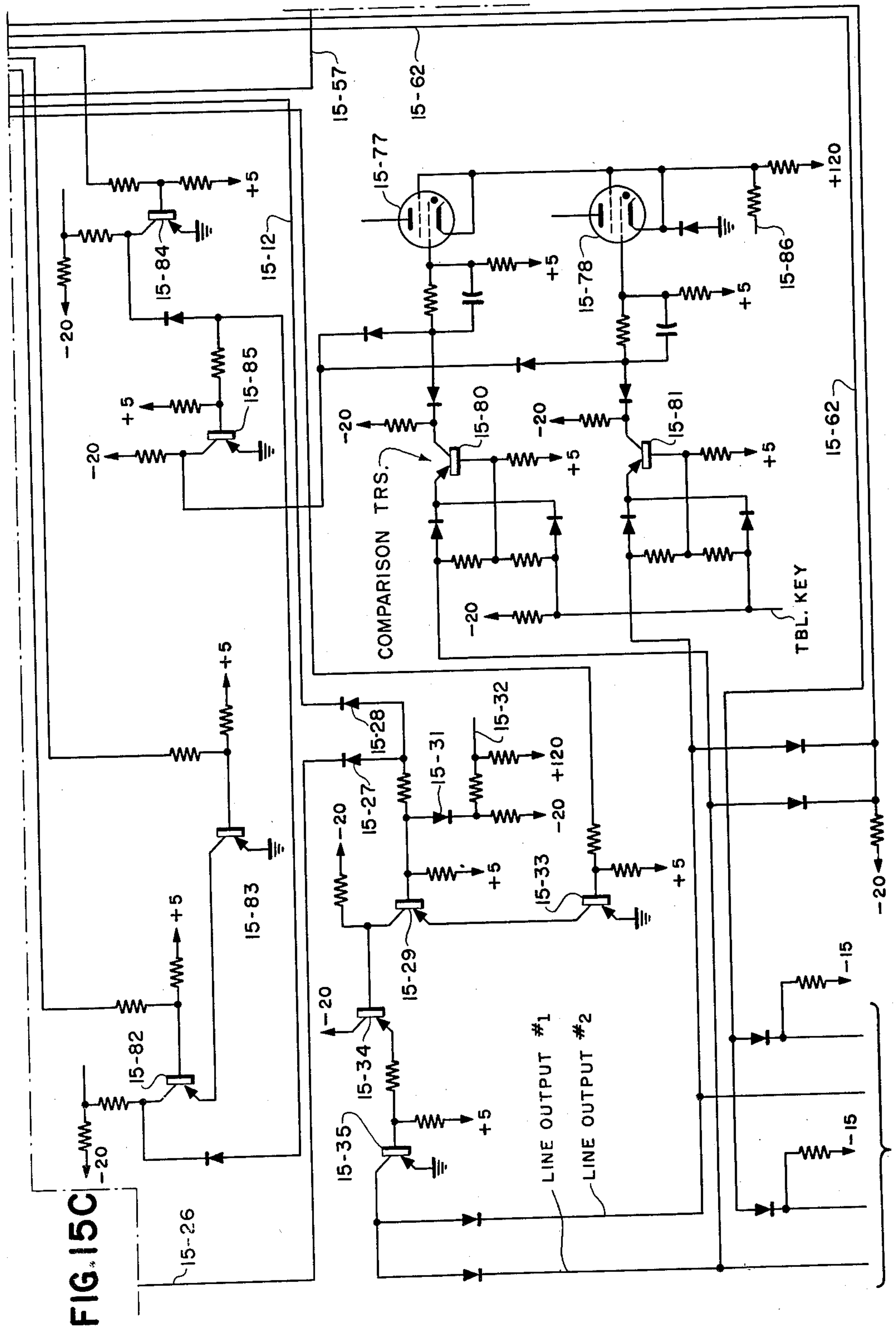
Figures 15, 15D:
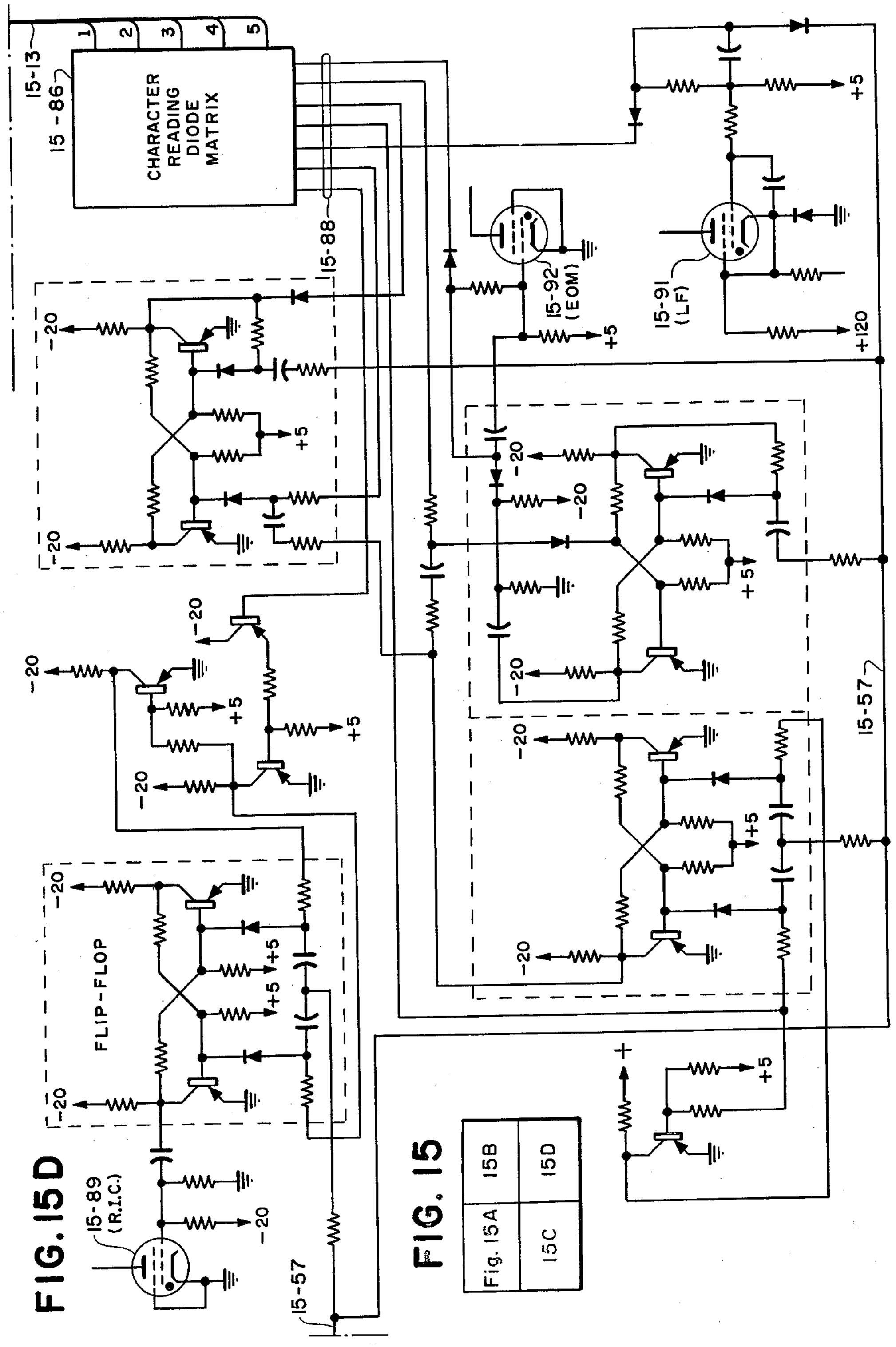

FIG. 15 indicates the manner in which FIGS. 15A through 15D should be arranged with respect to each other.

FIGS. 16A, 16B, 16C and 16D disclose the details of an electronic receiver employed at a position adapted to receive cross office transmission.

Figures 16, 16A:
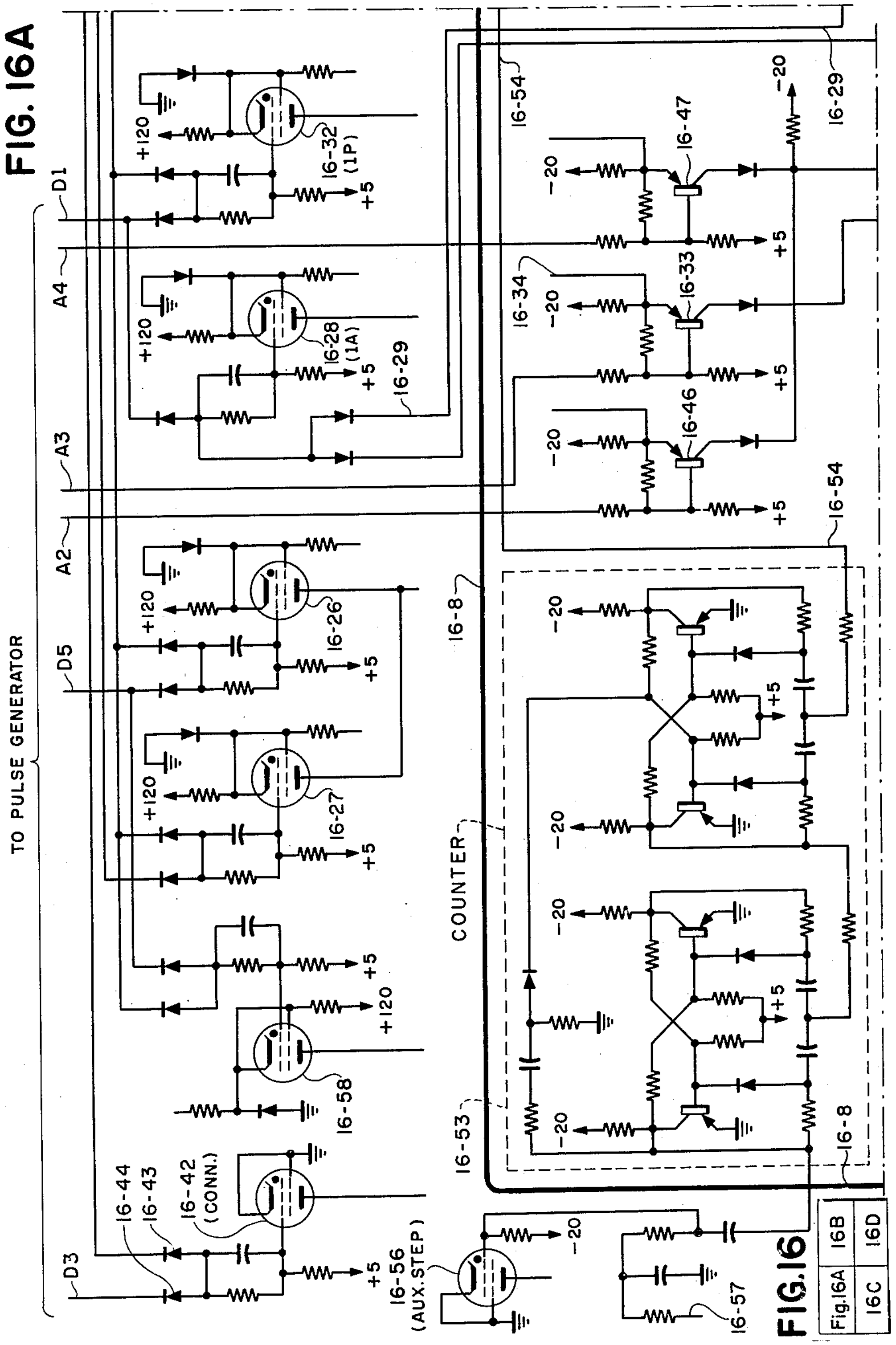
Figure 16B:
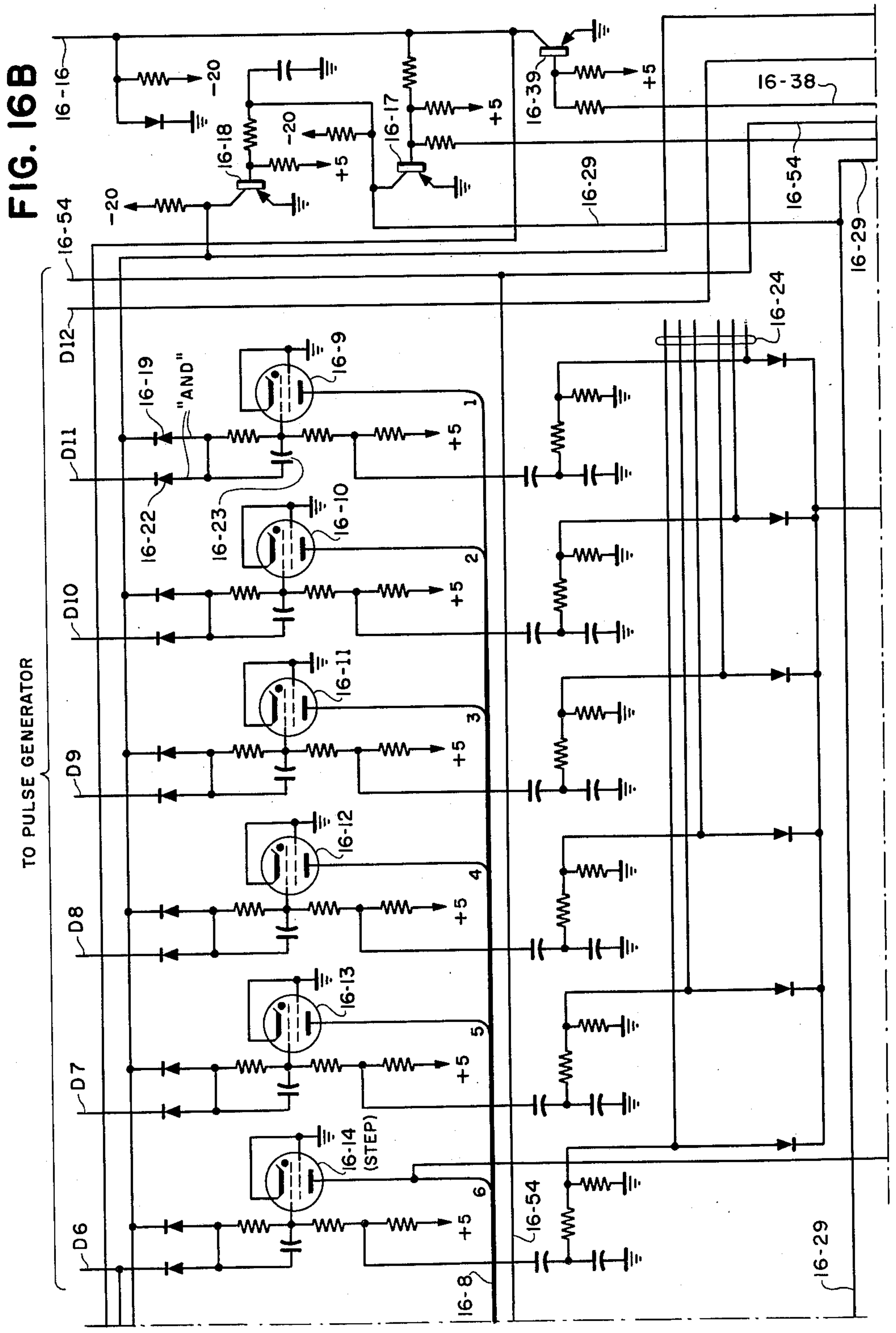
Figure 16C:
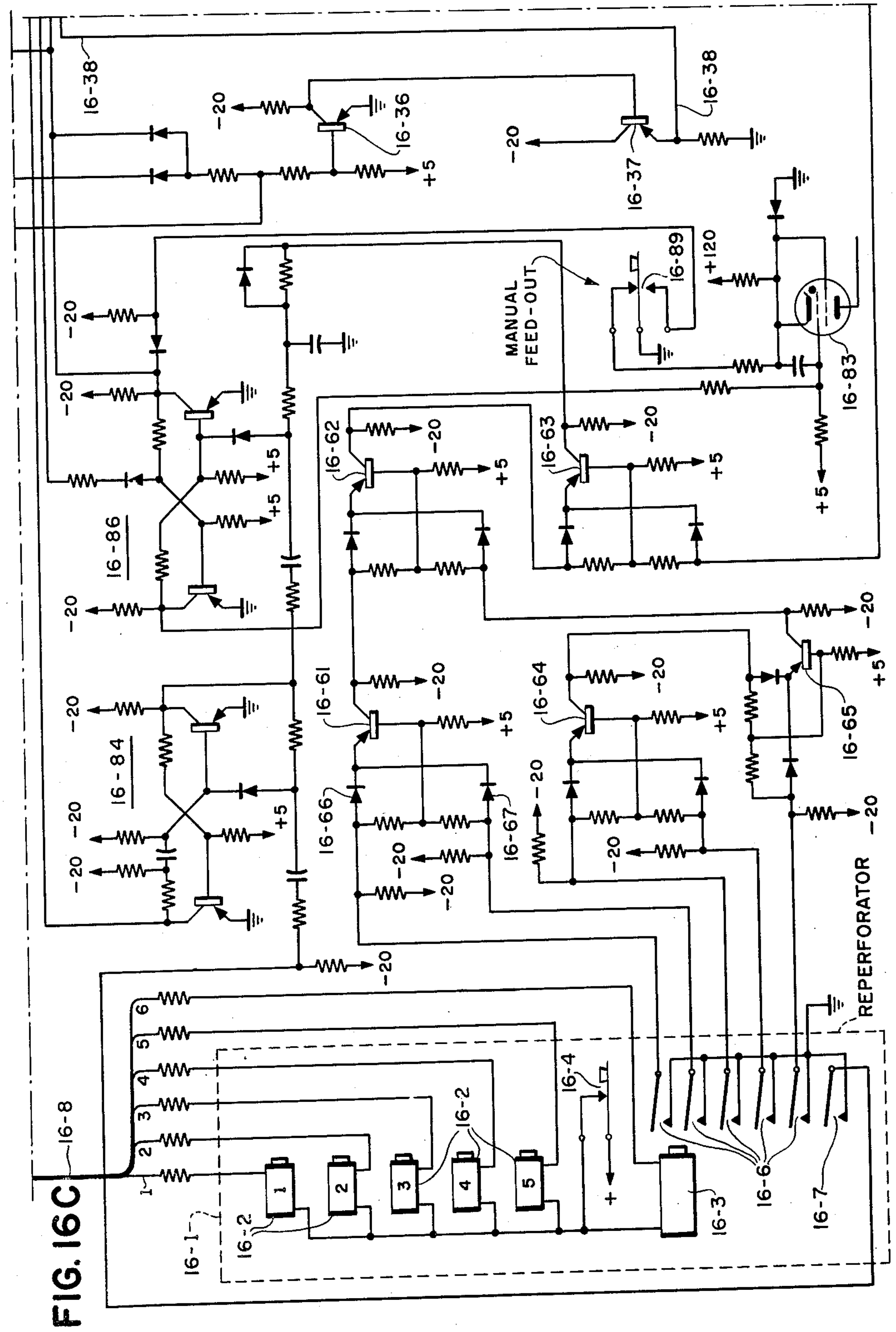
Figure 16D:
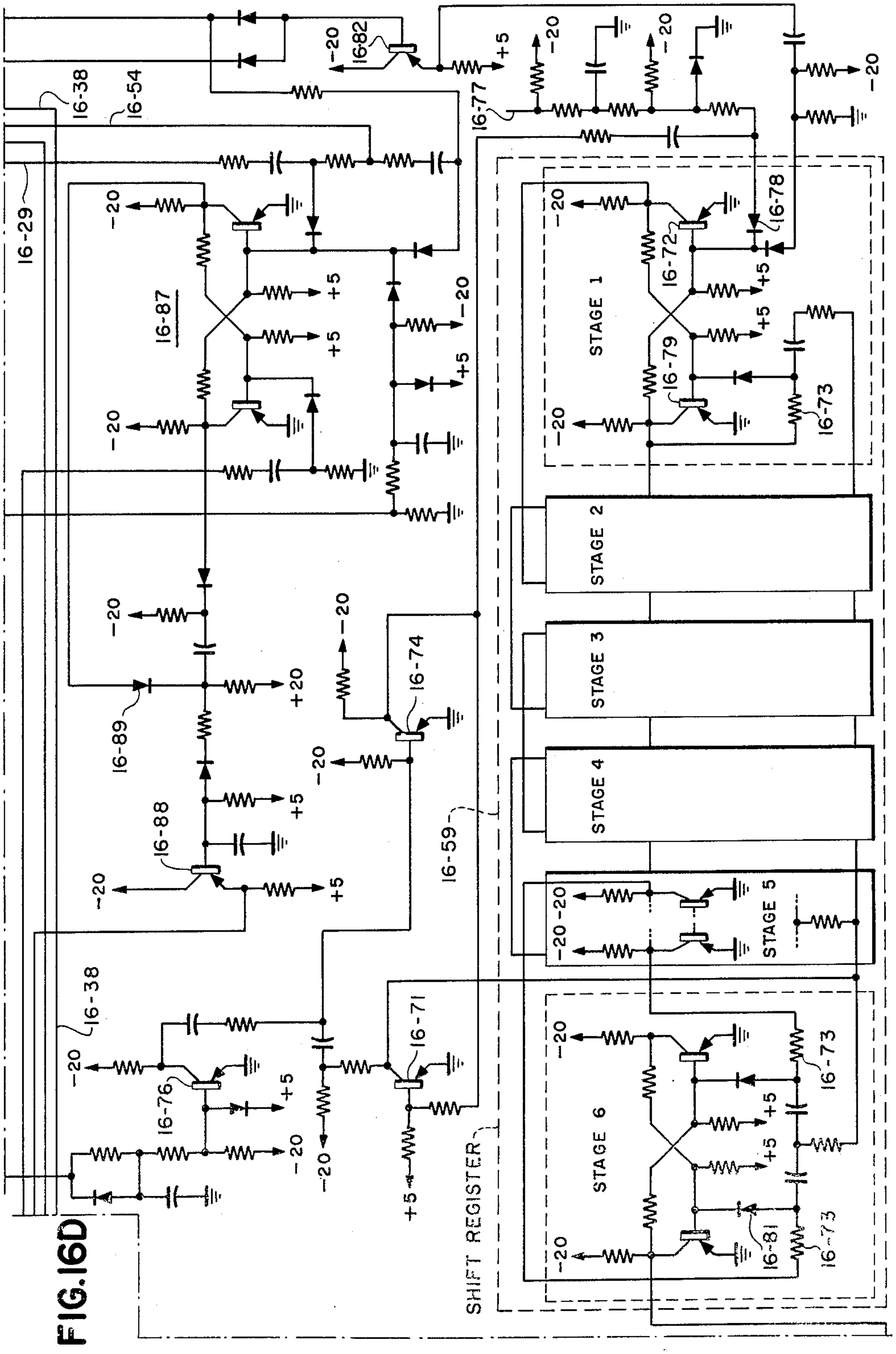

FIG. 16 indicates the manner in which FIGS. 16A through 16D should be arranged with respect to each other.

FIGS. 17A, 17B, 17C, 17D, 17E and 17F disclose selection and position selection control circuits of the director.

Figure 17A:
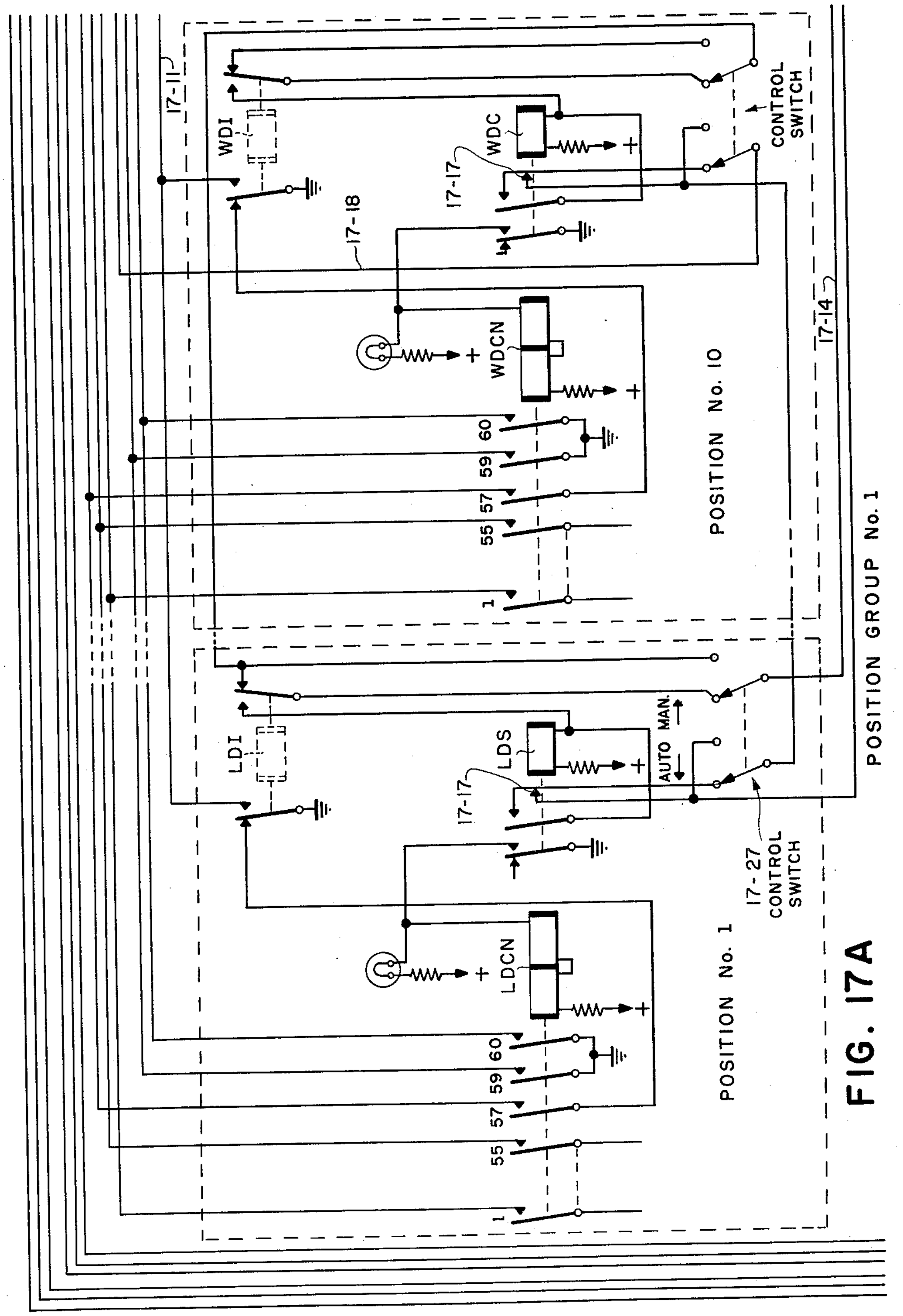
Figure 17B:
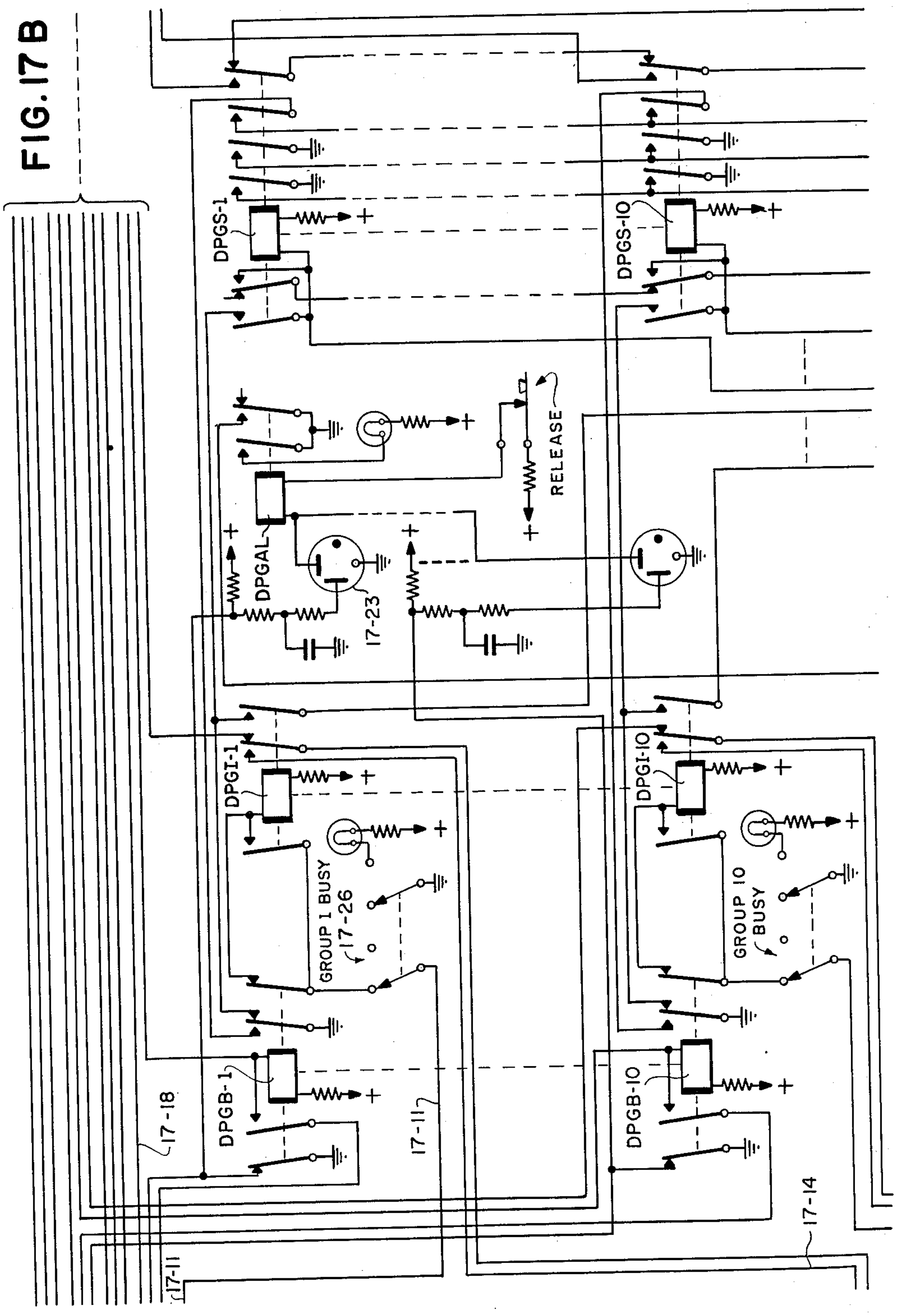
Figures 17, 17C:
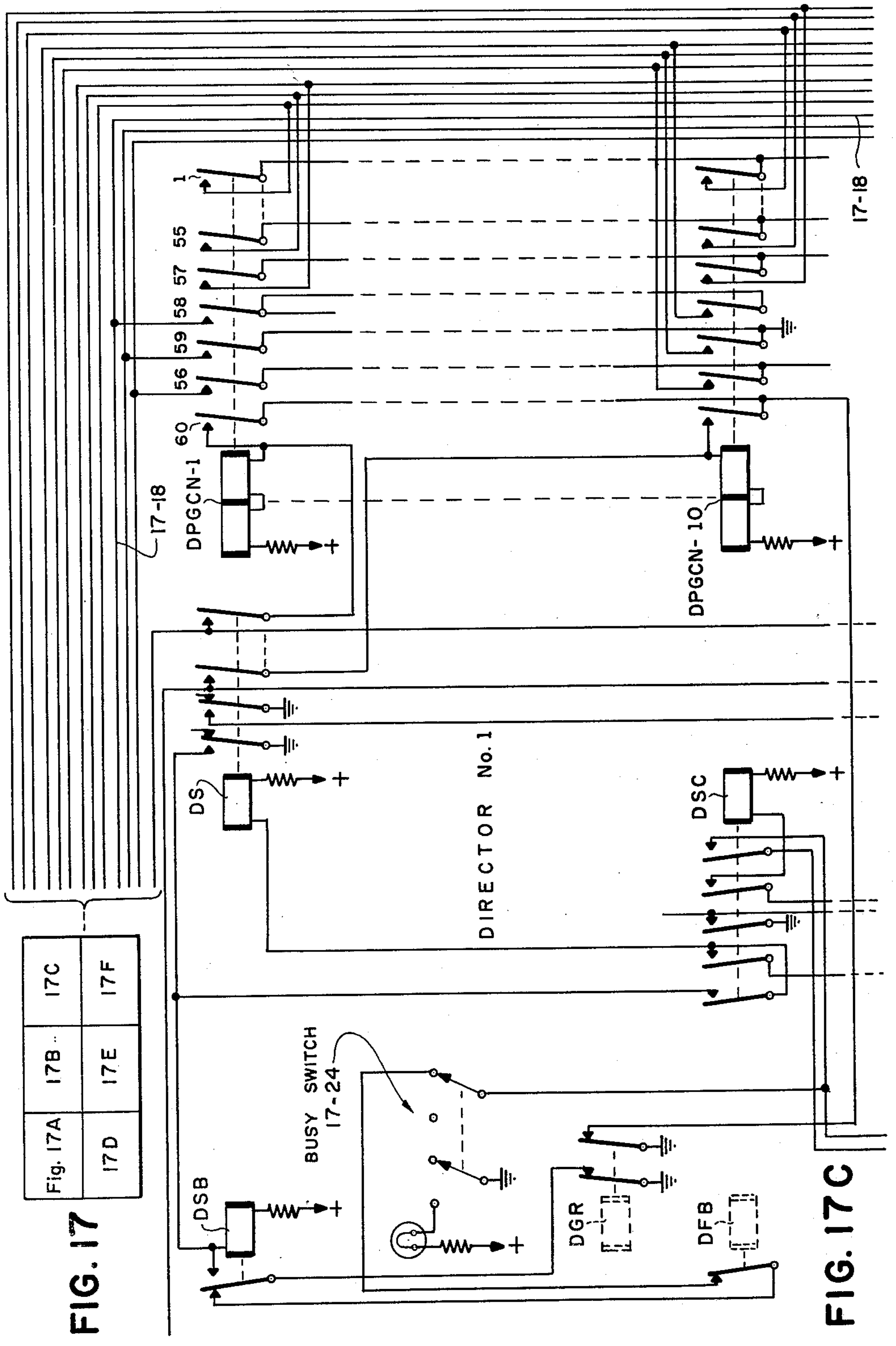
Figure 17D:
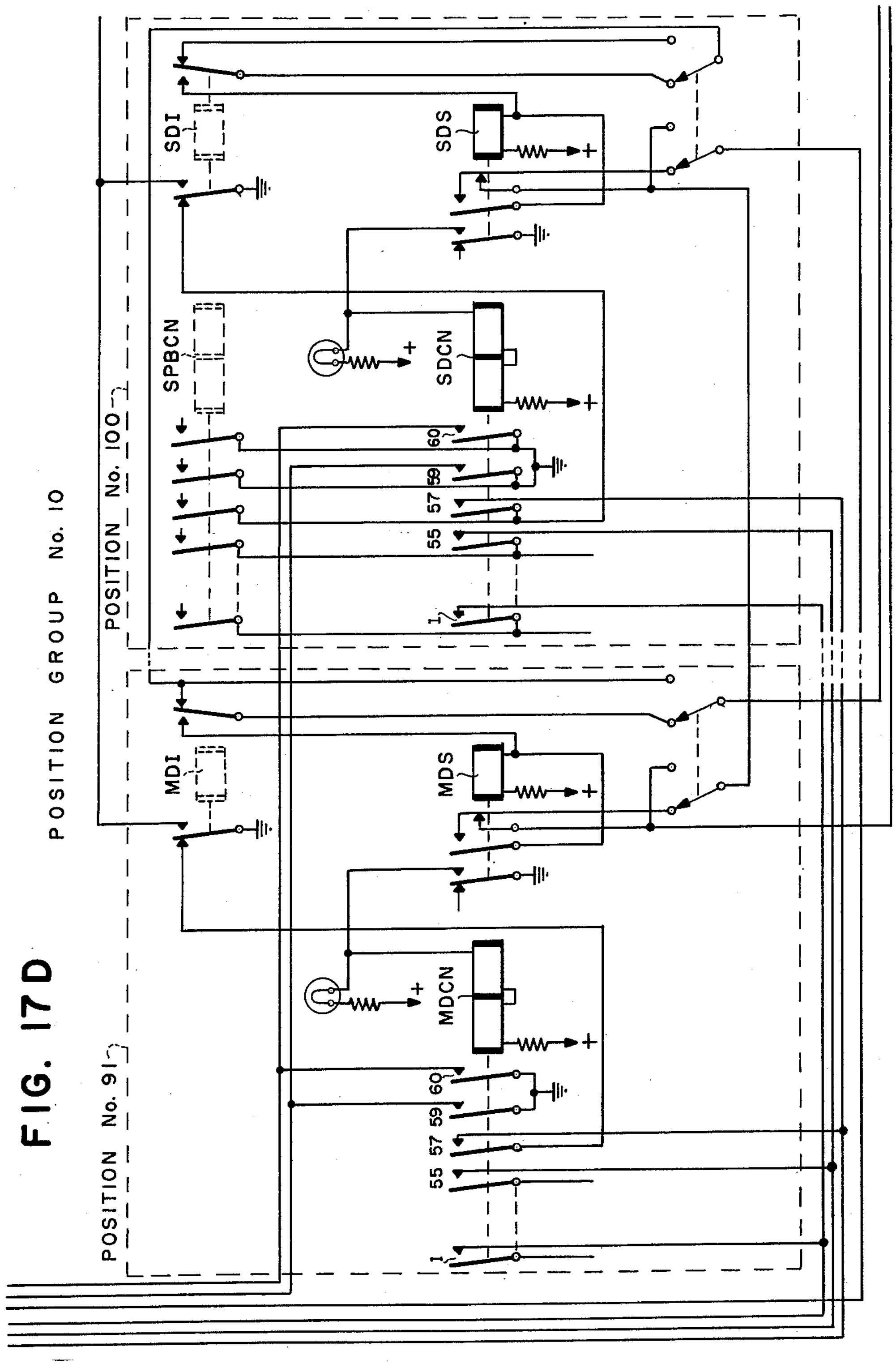
Figure 17E:
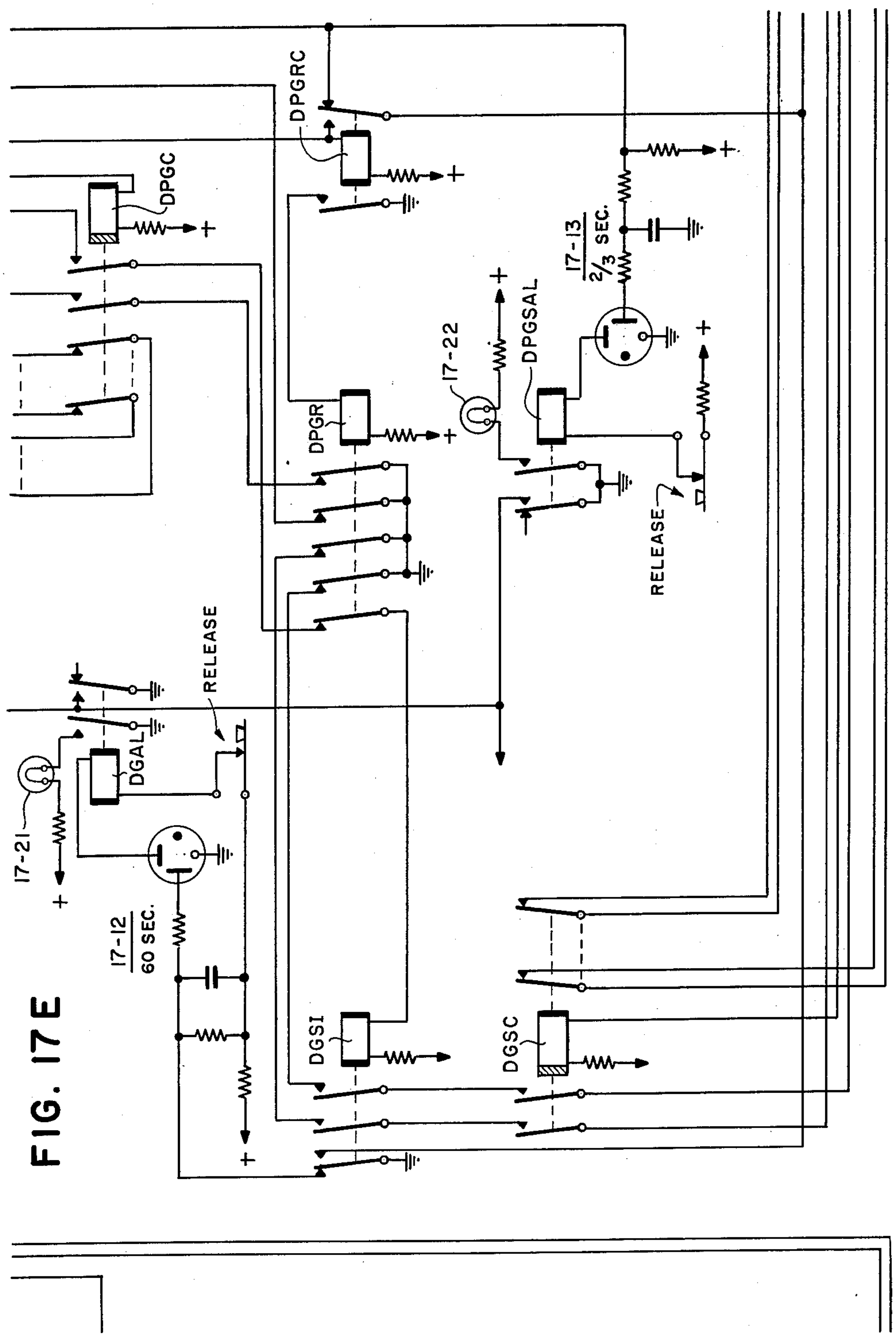

FIG. 17 indicates the manner in which FIGS. 17A through 17F should be arranged with respect to each other.

FIGS. 18A, 18B, 18C, 18D, 18E, 18F, 18G, 18H, 18I, 18J, 18K, 18L, 18M, 18N and 18O disclose the details of the control circuits involved in the director operation.

Figures 18, 18H:
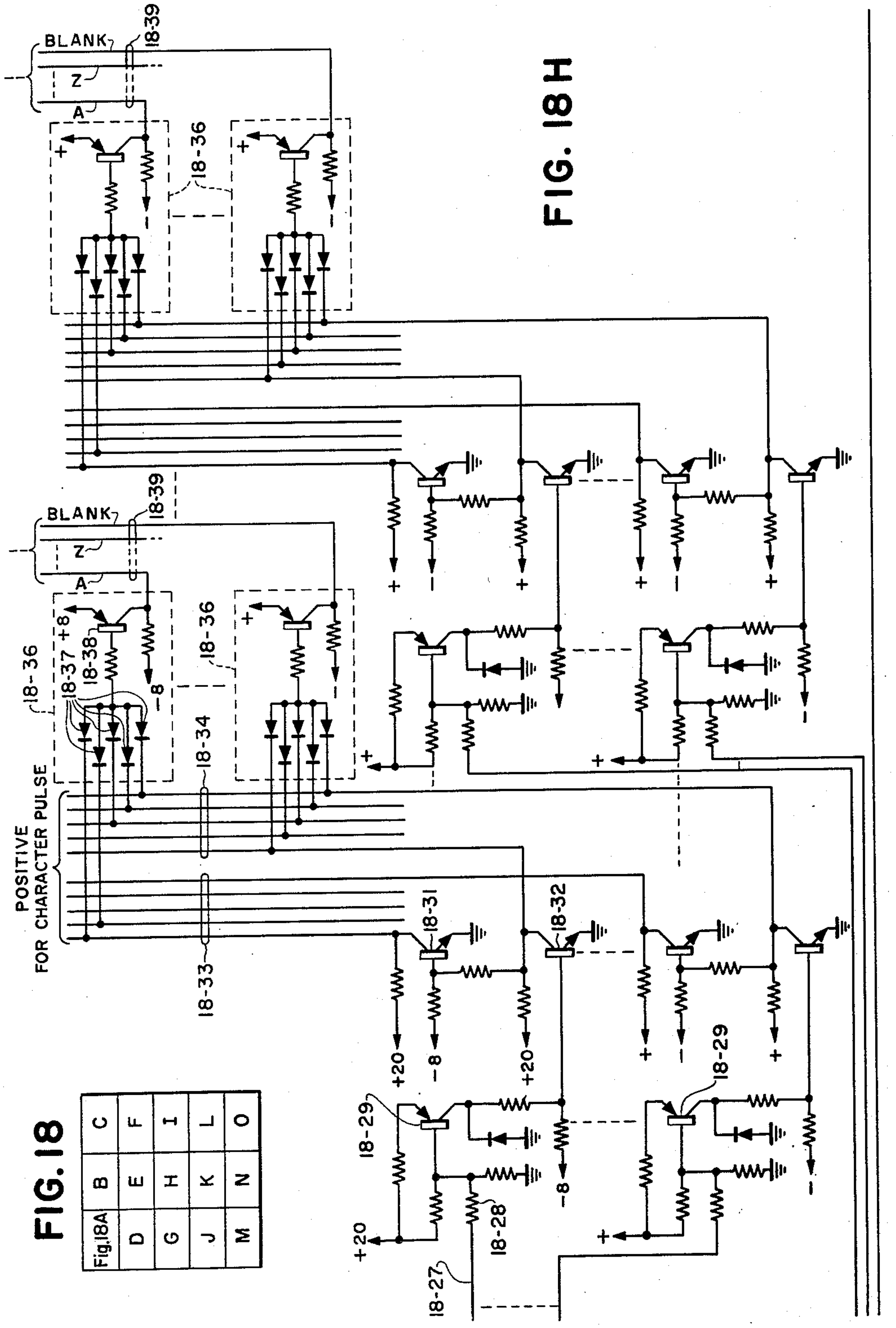
Figure 18A:
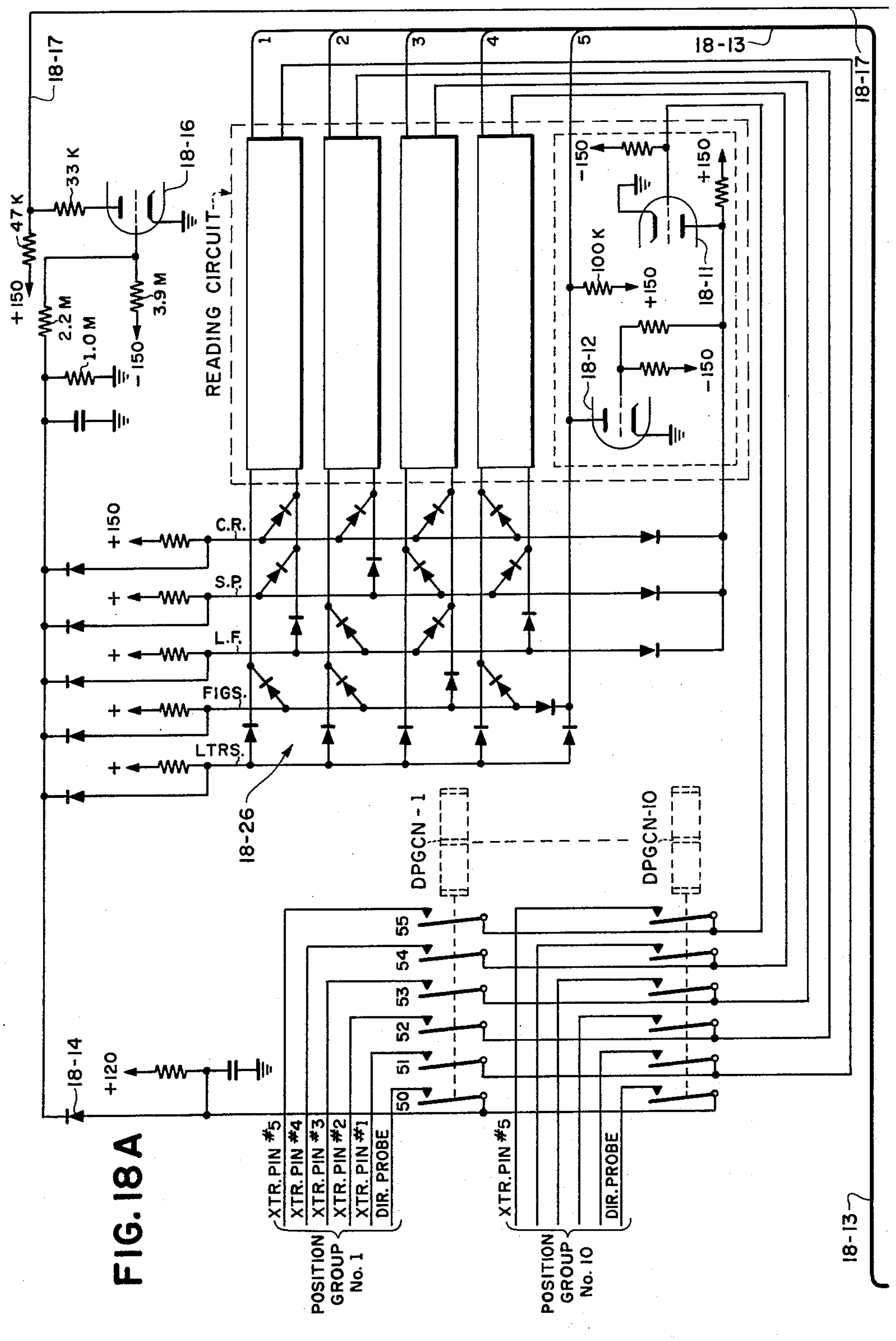

FIG. 18 indicates the manner in which FIGS. 18A through 18O should be arranged with respect to each other.

Figures 19, 19A:
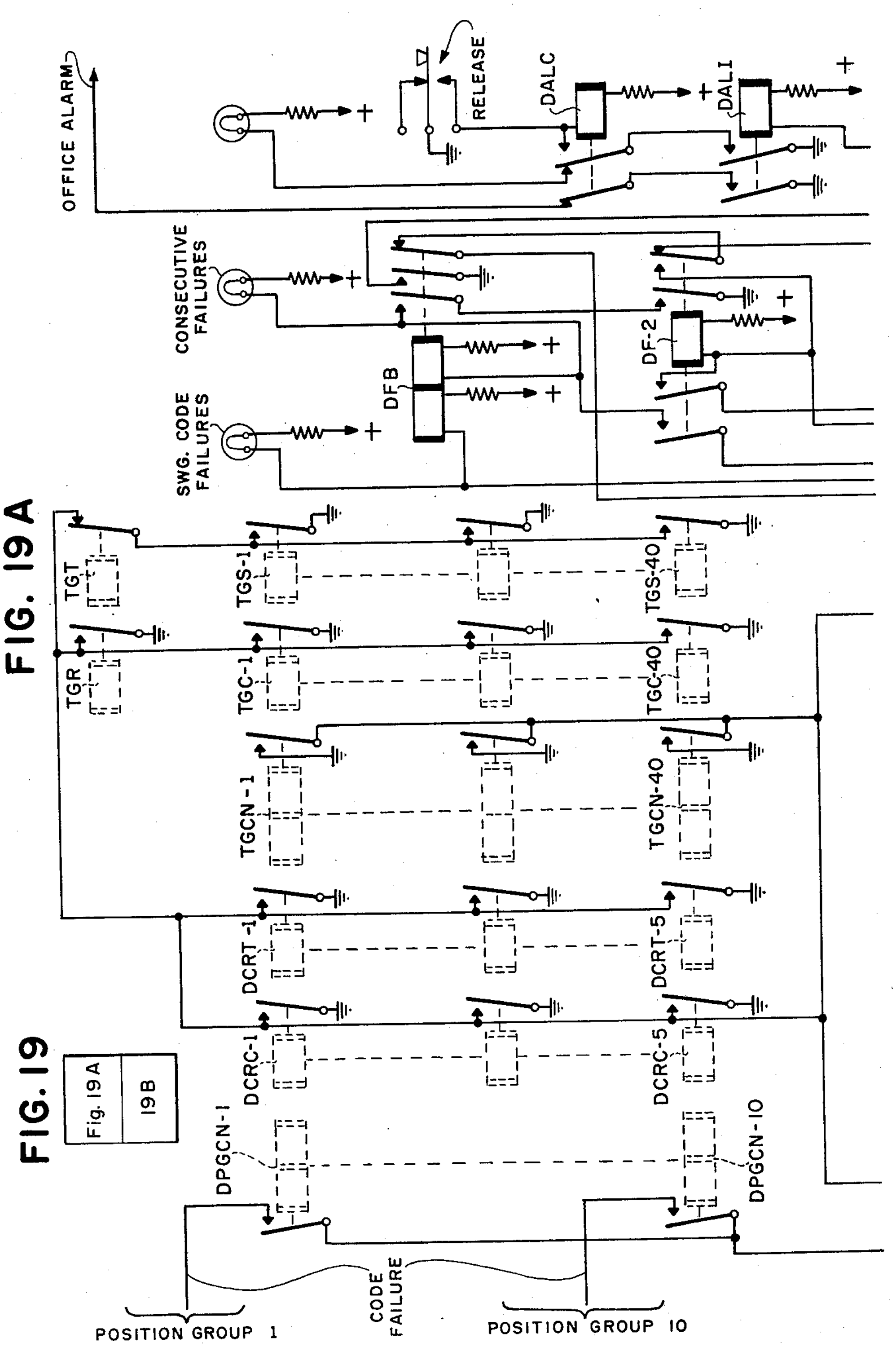
Figure 19B:
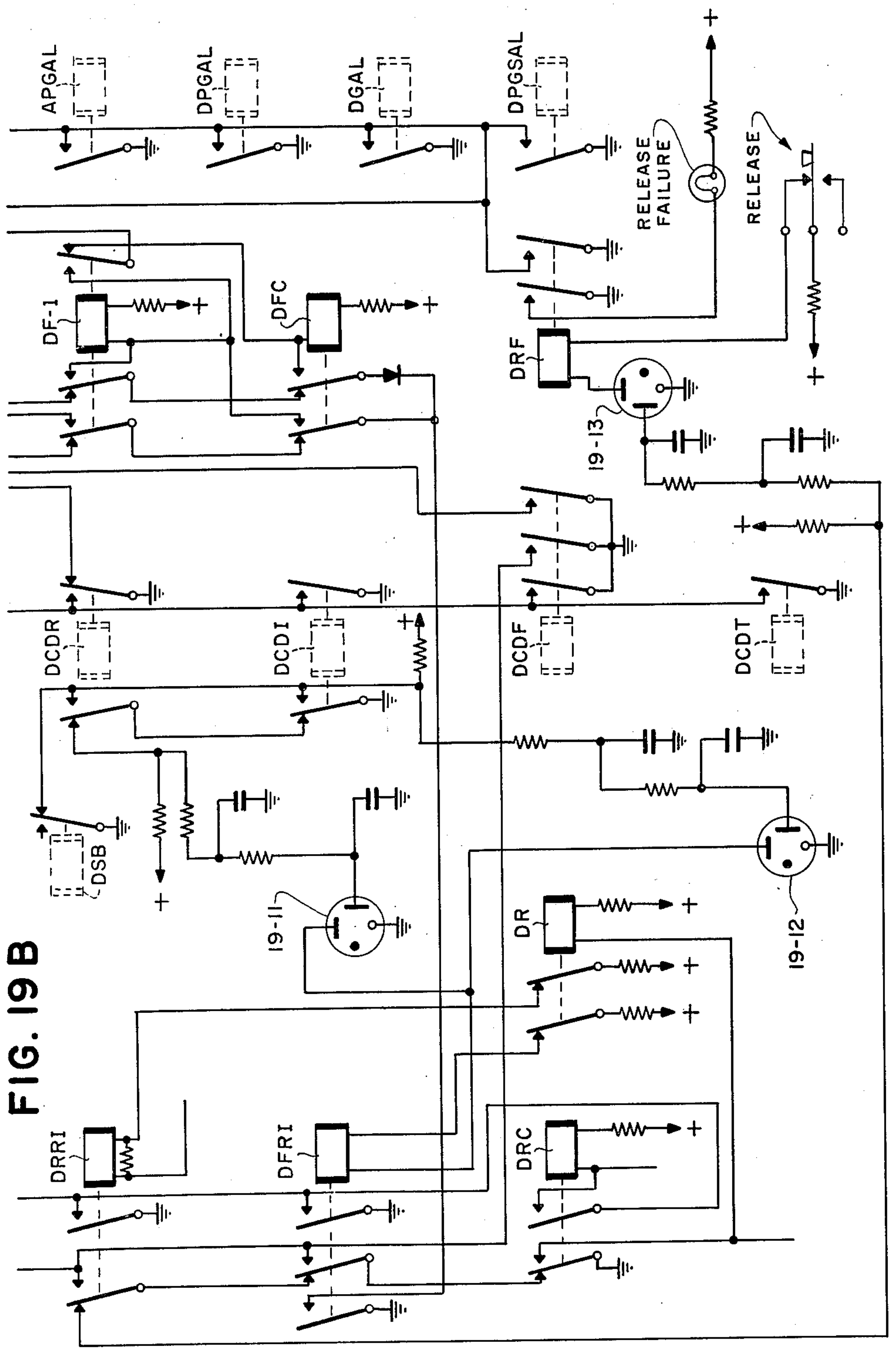

FIGS. 19A and 19B disclose the details of the director alarm and releasing control circuits.

FIG. 19 indicates the manner in which FIGS. 19A and 19B should be arranged with respect to each other.

Figures 20, 20A:
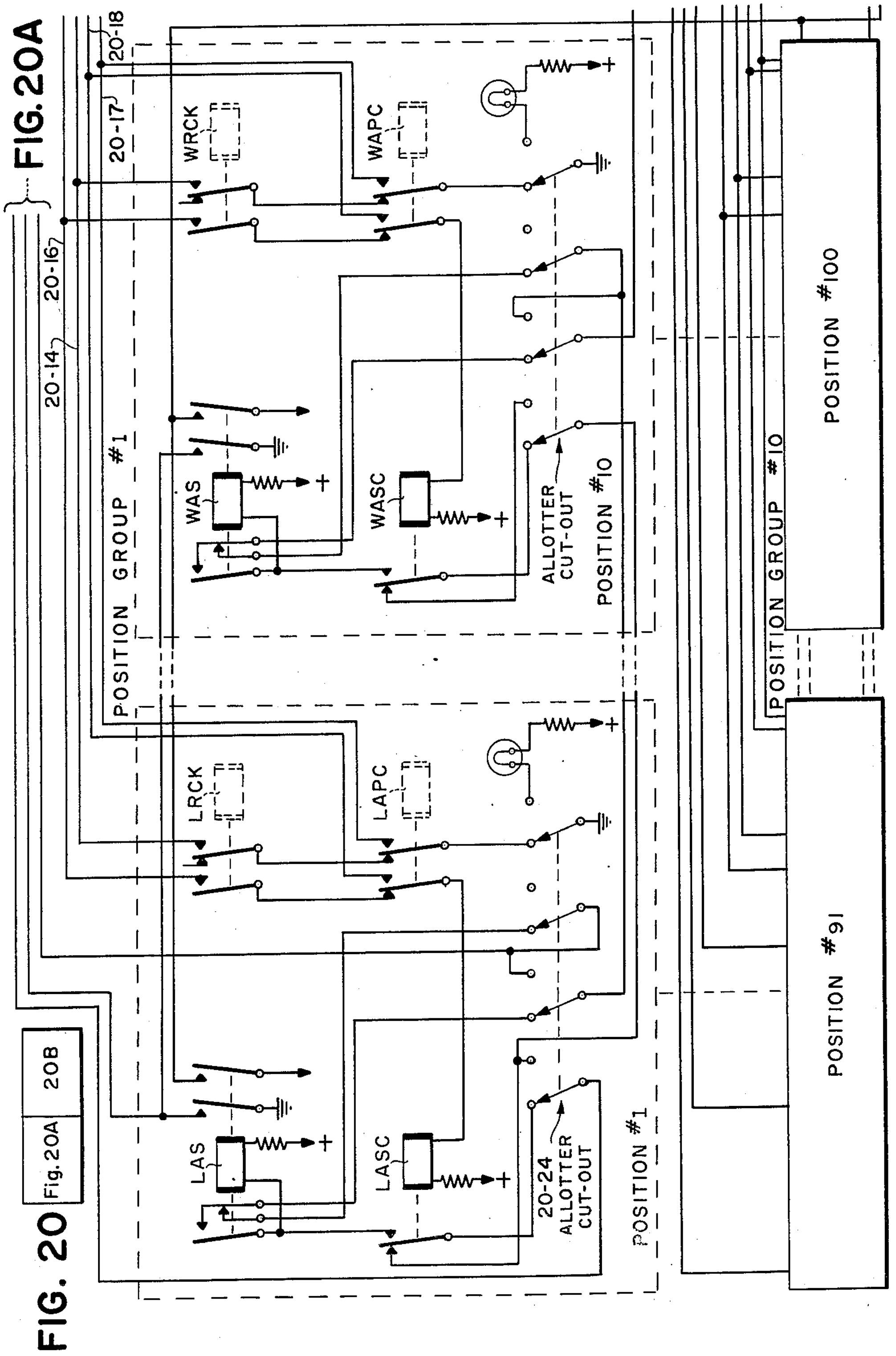
Figure 20B:
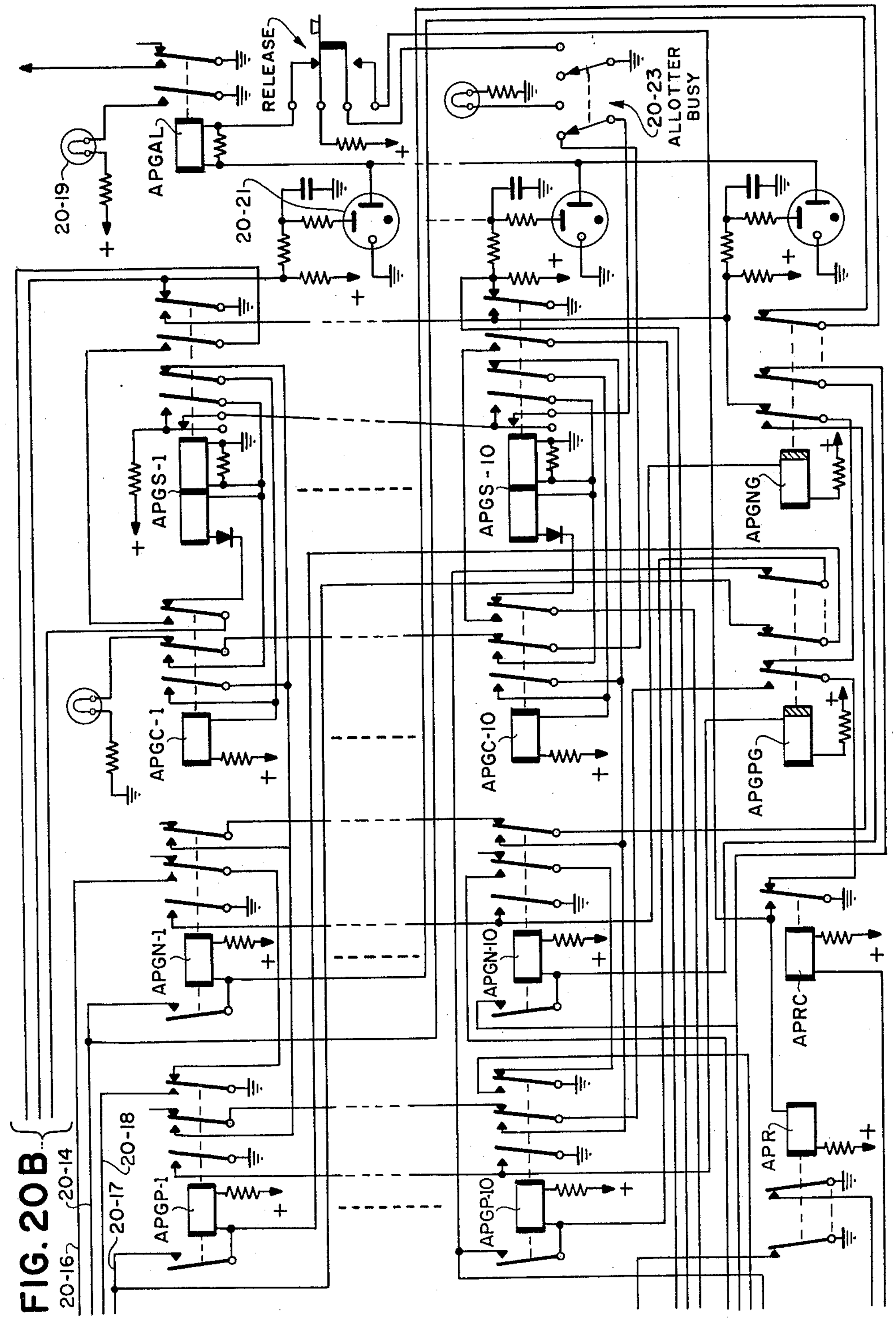

FIGS. 20A and 20B disclose the details of the allotter control circuits, and

FIG. 20 indicates the manner in which FIGS. 20A and 20B should be arranged with respect to each other.

Figure 1:
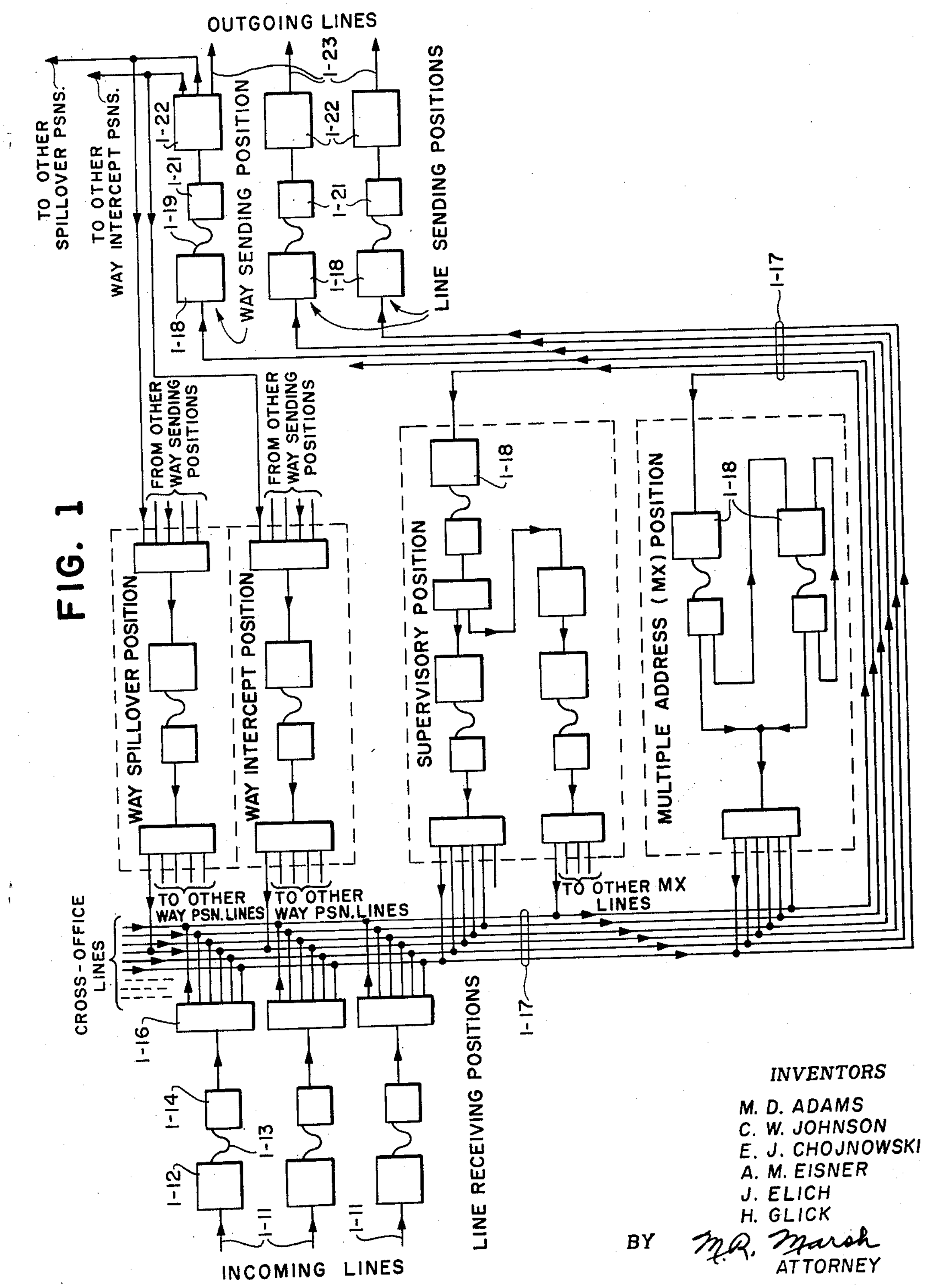
FIG. 1 is a block diagram showing the arrangement of some of the elements of a switching system constructed in accordance with the present invention.

The block diagram of FIG. 1 illustrates in general the arrangement of some of the equipment at a switching center and particularly that at the various operating positions. In accordance with the principles of the invention messages are received over incoming lines such as 1–11 and operate printer perforators 1–12 to store messages in associated tapes 1–13. The tapes 1–13 lead to respective transmitters 1–14. A printer-perforator with its associated transmitter together with associated control circuits is termed a line receiving position.

The output of the transmitters 1–14 are applied through line switching equipment 1–16 to cross office lines, such as 1–17, leading to other positions including line sending positions, multiple address positions, supervisory positions, way spill-over positions and way-intercept positions. The messages transmitted over the cross office lines 1–17 are restored by reperforators, such as 1–18, of the above named positions.

The reperforators 1–18 of the line sending positions prepare tapes 1–19 for associated transmitters 1–21. The transmitters 1–21 control sending equipment 1–22 for transmission of messages to sending lines 1–23.

The reperforators 1–18 of supervisory positions store messages requiring supervisory attention and such messages may be switched through the equipment at the supervisory position to the cross office lines 1–17 to appropriate line sending positions.

The multiple address position is arranged to transmit a single message to a plurality of line sending positions and is arranged so that when some of the desired sending positions are unavailable the message may be sent to those that are available and is restored for subsequent transmission to those unavailable at that time. The way-interceptor position is adapted to intercept messages switched through the switching center destined for way-circuits having temporary closed-out way stations. Messages intended for a way-station to be closed out for an extended period are diverted to the way spill-over position. Here the messages are stored until such time as it is determined that a transmission thereof should be made.

In an effort to simplify the description of the complicated, extensive and involved circuits of a switching center arranged in accordance with the present invention and to enable a more complete and comprehensive understanding of the arrangement and operation thereof, the circuits for the most part are broken down and segregated into functional sections with each such second depicting in detail a separate phase in the operation of the system. Where the circuits of a functional section being described include various elements such as relay contacts of one or more other functional sections, the operating circuits of the relays of such other sections are not generally included. To further assist in understanding the circuits, most of the various components such as relays, rotary switches, etc., are identified by letters indicating the function thereof.

A line receiving position terminates an incoming line and receives messages coming into a center on an incoming line such as a trunk circuit from a distant center or a local circuit from a station tributary. A Tributary-Trunk switch at a line receiving position enables it to function as either a tributary or a trunk receiving position.

All messages coming into a line receiving position are recorded in perforated and printed tape by a printer perforator mechanism. Each incoming message is monitored by an electronic unit which reads for the start-of-message and the end-of-message character combinations, determines that these characters occur in the proper sequence and controls the tape feed-out operation of the printer perforator. The line receiving position also includes a message waiting indicator which provides a visual indication for the number of complete messages on hand waiting to be switched cross office to a line sending position.

The tape issuing from the printer perforator at a line sending position is fed through an associated tape transmitter where additional checks are made which includes a check of the sequence numbers of the messages.

Each incoming message to a receiving center is preceded by one or more routing indicators which indicate the destination or destinations to which the message is to be sent. Transmission from a line receiving position to a selected sending position takes place over a cross office line circuit and a plurality of cross office line connections can be established for a given message at the line receiving position. In the arrangement shown herein, a maximum of two cross office line connections can be established and if more than two cross office connections are required for a message, it is diverted to a special MX position assigned to handle multi-address messages.

Referring now to the detailed drawings, FIGS. 2A, 2B, 2C and 2D, which arranged together as indicated in FIG. 2, disclose the message waiting indicator and the circuits of a line receiving position. Signals incoming over line 2–11, operate a line relay 2–12 which controls the selector magnet 2–13 of the receiving line printer perforator 2–14. The printer perforator 2–14 reproduces the received signals in punched and printed form on the tape 2–16.

The printer perforator includes an addition to the perforating mechanism a set of five reading contacts 2–17, one for each of the five levels of the signal code which operate into marking and spacing positions concomitantly with the punch pins of the perforating mechanism as well as a pair of cam operated contacts 2–18 and 2–19. Contacts 2–18 and 2–19 are so arranged that the former closes slightly ahead of the latter and opens slightly after the latter. Contacts 2–15 and 2–19 are sometimes referred to hereinafter respectively as the probe contacts and the common contacts. The printer perforator may also include a tape feedout mechanism operated by the tape feedout magnet 2–21 to pass the last received message completely through the associated transmitter. The contacts 2–17 control an electronic character reading circuit shown principally on FIG. 2A which includes a message waiting indicator code socket 2–22 that has a code plug (not shown) so strapped that various terminals of the code socket are connected together to permit any combination of characters to be read as call letter identification characters. Such characters when read in the proper sequence and followed by a figure shift result in a start-of-message indication. For example, with the code plug strapped for the characters L, I, N, E, A and figure shift, the strapping for the character L is such that the terminals 1, 2, 3, 4 and 5 of the code socket are connected to respective terminals 31, 27, 33, 34 and 30. In a similar manner the remaining terminal groups are connected to represent respective call letter characters. Accordingly when the character L as the first of the call letter series, is represented by the positions of contacts 2–17, no ground appears at the diodes connected to group one terminals numbered 1 to 5 of the code socket. However, ground will appear on one or more diodes in each of the other groups of five diodes and at terminal 36. With the contacts 2–17 reaching the character L when the common contacts 2–19 close, a positive pulse is applied over conductor 2–23 to the control grid of tube 2–24. Tube 2–24 is the first of a series of six tubes 2–24 through 2–29 forming a ring counter referred to generally by reference numeral 2–30. The positive pulse applied to the control grid of tube 2–24 appears simultaneously at the grid of tube 2–31. The resulting negative plate circuit pulse is differentiated and applied to the grid of tube 2–32. The negative grid pulse causes the cathode of tube 2–32, which was positive, to go negative sufficiently to extinguish tubes 2–24 through 2–28 as well as tubes 2–33 and 2–34 if any are conducting. When the extinguish pulse is over, the grid of tube 2–24 is still under control of the positive pulse and this tube fires storing the information that the first call letter (the identifying character L) has been read.

If the next character following the L character is an I the tongues of contacts 2–17 will be correspondingly operated and the strapping of the code plug is such that the ungrounded ones of the lower terminals of the code socket 2–22 will be connected to the second group of terminals Nos. 6–10 in the upper row. Accordingly, when the common contact 2–19 again closes a positive pulse is applied over conductor 2–36 to the control grids of tubes 2–25 and 2–31. The resulting negative cathode pulse tube 2–31 extinguishes taube 2–24 by driving its plate in the negative direction while a 0.03 mfd. cathode capacitor 2–37 momentarily maintains the positive cathode potential to insure extinction of the tube. The positive cathode potential of tube 2–24 is maintained sufficiently long to gate the grid circuit of tube 2–25. This reduced negative bias and the positive pulse on the control grid over conductor 2–36 are both necessary for tube 2–25 to fire. When this tube fires it indicates that the second call letter identifying character I has been read.

If the second character is something other than an I the cathode pulse of tube 2–32 extinguishes tube 2–24. Since no positive pulse is applied to the control grid of tube 2–25 for this condition it does not fire. The reading circuit is then reset and tube 2–24 will fire when another L character is read.

If the characters N, E, and A follow characters L and I in the proper sequence, tubes 2–26, 2–27 and 2–28 will fire in sequence. This indicates that the five characters L, I, N, E, A have been read and stored. If the next character is a figure shift a positive pulse is applied over conductor 2–38 to the control grid of tube 2–29 causing it to fire as timed by the probe contacts 2–18. The operation of tube 2–29 completes a circuit including conductor 2–39 for the operation of relay LMWS, and when the probe contacts open relay LMWS locks up in series with relay LMWC which operates.

In situations where the call letter identifying character groups consist of less than five characters, the group of five terminals following the last assigned character through the code plug, are connected to read a figures shift character. The remaining unassigned groups of five terminals, as well as terminal No. 36 are left unconnected. The tubes 2–24 through 2–29 associated with the unassigned groups of five terminals are not fired by the reading of specific characters but are fired sequentially by the probe pulse from the common contact 2–19. In this manner the ring counter completes its cycle even through less than five call letters identifying characters are read. When the last stage in the ring counter is reached tube 2–29 fires to operate relay LMWS to indicate a start of message.

*End of Message Recording*

Three conductors 2–41, 2–42 and 2–43 are interconnected through a group of diodes 2–44 to the marking and spacing stops of the contacts 2–17 in such a manner that positive pulses are applied to the conductors 2–41 through 2–43 in sequence when the characters, figure shift, H, and letter shift are read by the contacts 2–17. These positive pulses fire tubes 2–33, 2–34 and 2–46 in the same manner as tubes 2–24 through 2–29 were fired by call letters L, I, N, E, A. When tube 2–46 fires, it by way of conductor 2–47 momentarily holds relay LMWC operated and operates relay LMWE. Relay LMWE then locks up through its left hand winding and relays LMWC and LMWS release. When relay LMWE is operated and before relay LMWC releases, ground is applied over conductor 2–48 to the add magnet 2–49 of the message waiting indicator unit 2–51. The message waiting indicator comprises a device with a dial 2–52 with a pointer 2–53 which indicates the number of messages waiting to be switched together with a pair of cams 2–54 and 2–56 which operate associated contacts. When the circuit to the add magnet 2–49 is interrupted by the release of relay LMWC, the indicator steps to the next higher number. Each time a message is switched across office, the subtract magnet 2–67 is operated, and the message waiting indicator is operated to subtract one from the number indicated waiting to be switched.

Circuits are provided to indicate the failure of an end of message and this includes relay LMWF. Failure to read an end of message results in the message waiting indicator count being less than the number of messages waiting to be switched. Consequently when the message waiting indicator reaches the zero position, there will still be messages waiting to be switched. To indicate this condition a circuit is arranged to light the no end of message lamp 2–58 associated with the particular receiving position as well as to complete a circuit to conductor 2–59 leading to a supervisory position. If additional messages are received while this trouble condition exists, the message waiting indicator remains in the zero position and normal operation of the particular line receiving position can not be resumed until the count is manually corrected by the operation of the add push button 2–61.

When an end-of-message sequence is not read, tube 2–46 will not fire and relay LMWE remains unoperated while relays LMWS and LMWC remain operated. The next message preceded by the characters L, I, N, E, A causes tubes 2–24 through 2–28 to fire in the manner pointed out and tube 2–29 fires on receipt of the following figure shift. If this occurs with relay LMWC still operated, a circuit is completed over conductor 2–62 for the operation of relay LMWF. This relay locks to ground through the add push button and when the message waiting indicator is at zero, the contacts associated with cam 2–56 close to the right to complete the circuits to the lamp 2–58 and to the conductor 2–59 leading to the supervisory position. The operation of the add push button releases relay LMWF and the indicator dial pointer is stepped to position No. 1 when the push button is released. The latter may be reoperated to correct the message waiting count for each additional message waiting.

When no end-of-message condition exists, messages received by the printer perforator will not be switched because the message waiting indicator is at the zero position. When an end-of-message sequence is read, tube 2–46 fires and operates relay LMWE. However, since relay LMWF is operated to open the circuit to the add magnet, the message waiting indicator remains in its zero position. Accordingly, this message will not be switched cross office until the add push button 2–61 is operated to manually correct the message count.

*Transmission Sequence Switch*

A multiple level rotary type message transmission sequence switch LSQSW is employed and controls the sequence of all message processig and cross office transmission functions at the line receiving position. As employed the LSQSW switch has some thirteen positions for controlling the various functions.

At the line receiving position, a master reset key is provided and operation thereof at any time during the processing of a message releases the line receiving position circuit. The master reset key operated to one position effects a comparison reset and when operated to another effects a sequence reset.

In the preferred embodiment of the invention, a control circuit is provided to check the incoming channel call letter identification characters and to determine that a correct message sequence number is present in the tape as it passes through the transmitter. These control circuits and associated equipment are similar in operation to those described in a copending application of G. S. Vernam et al., Serial No. 791,404, filed February 5, 1959, and functions to bring up an alarm when a wrong comparison is detected and step the transmission sequence switch when a proper comparison has been made.

*Automatic Switching Circuits*

If the incoming channel identification characters and message sequence number have been compared and all origin information has been put into tape storage, the line feed character in the message heading is read, causing the transmission sequence switch to step to stud 4. With the switch on stud 4, the routing line is processed.

As described hereinafter, each routing indicator is transmitted character by character itno the director where it is stored and then translated into a code. A code is generated by applying a ground on two of a number of leads multiplied to all receiving positions. These grounds mark the set of two route switches which establish the route connections to the sending positions represented by the routing indicator.

The route selecting and connecting circuits are shown in FIGS. 3A to 3E inclusive, and when the transmission sequence switch LSQSW steps to stud 4, a ground is applied through the A level thereof and back contacts of relay LCDF to operate relay LDI. This initiates a request for a director and when a director is obtained, relay LDS operates which in turn operates relay LDCN. As soon as relay LCDN operates, the center routing information is applied to the center routing control and the center routing test leads. The operation of relay LDCN operates relay LTRI so that the tape transmitter steps and sends the first routing indicator to the director. The last routing indicator is terminated by the end of routing sequence (figure shift, M, letter shift) and when this combination is read a tube in the electronic transmitter identified as the RIC tube, fires to operate relay LIRC which stops the tape transmitter.

In addition, the operation of relay LIRC applies a ground over the code initiate to the director whereupon it sends back the switching code. At the line receiving position there are two sets of routing switching LRSWA–1, LRSWB–1 and LRSWA–2 and LRSWB–2. Accordingly, each position can handle two cross office connections for each message. The first switching code positions the No. 1 set of switches and the second switching code, if present, positions the No. 2 set.

At the same time the ground that is applied to mark a stud on switch LRSWB–1 is also applied through a diode network to operate the route finder initiate relay LRFI. This relay completes the circuit for stepping the route switches until the marked stud is reached. At the completion of the stepping of the route switches, the transmitter restart control relay LTRC operates. This relay completes the ground circuit over the code release lead to the director whereupon, the next routing indicator which has been temporarily stored in the director can now be translated into a switching code. The appearance of another code results in the reoperation of relay LRFI and once again the transmitter steps and sends the next routing indicator into the director.

As the last routing indicator is sent to the director relay LRIC operates. This stops the transmitter and the director sends back the switching code for the last routing indicator. The director then reading the end of routing characters sends a ground back to the line receiving position over the end code lead which is effective to release relay LXGC. This relay causes the tape gate slide to return to its normal position and the transmission sequence switch steps to stud 5. At this time relay LDI will release to send a ground to the director to initiate the disconnect process and in conjunction therewith relay LDCN releases to complete a director disconnect process.

*Close-Out Control*

If a switching code sent back from the director results in connection to a route lead for a closed out line sending position, negative battery over the route lead is applied through the appropriate LRB relay to the route text circuit of the electronic transmitter. This negative potential causes a tube to conduct, resulting in the operation of the line route closed relay LRCL. When the end-code ground comes back from the director, it is applied through the contacts of relay LRCL to operate relay LRSP. The operation of the latter relay results in the automatic connection to a spill-over position when the cross office connection process is completed.

A line receiving position in the arrangement disclosed herein can handle messages requiring a maximum of two cross office connections. Should the line receiving position receive a third switching code from the director, the B ground of this switching code will cause normal operation of relay LRFI. This time relay LRFI applies a ground to operate relay LRMX resulting in an automatic connection to a multiple send position when the cross office switching process is completed. If the director recognizes a group code indicator, it sends a ground over the group code lead to operate relay LRMX to set up the circuits for an automatic connection to a multiple sending position.

A ground is sent from the director over the no-code lead when a no-code condition is detected. This ground operates relay LTRC which releases relay LRIC causing the transmitter to start and send the next routing indicator to the director.

If the director is unable to translate a routing indicator into a switching code, it sends a ground over the code failure lead to operate relay LRSU. This relay causes any previously operated LRB relay to release and results in an automatic connection to the supervisory sending position. If no route busy relays LRB are operated because of a failure to receive at least one switching code or because of circuit failure, relay LRBT is operated. When this condition occurs, the end-code ground from the director is applied to operate relay LCDF. The operation of this relay among other things lights the code failure lamp and activates the office alarm.

An automatic manual switch enables messages to be switched from a receiving position to a supervisory sending position where the message may subsequently be switched to the desired sending position by manual selection.

*Cross Office Allotter Selection Circuits*

When the transmission sequence switch LSQSW reaches stud 5 both of the route busy relays LRB have been operated, or only one relay if one cross office connection is required. The operation of each route busy relay completes the route lead circuit from the selected sending position to the route test circuits in the electronic transmitter associated with the line receiving position. No cross office connections are established unless both of the selected sending positions are idle when two are required or one in the case of a single cross office connection, until the desired sending position or positions are idle. A route test is made at this time to determine the condition of the one or two selected sending positions. If the required sending positions are found to be idle a request is made for the allotter. The allotter functions in the manner described hereinafter in connection with the description of the director.

*Route Testing*

Reference is now made to FIGS. 4A and 4B which disclose the principal circuits involved in the route testing and it will be assumed that both LRB relays are operated. Thus each relay completes a circuit from the selected sending position over the route test lead through the marked studs of the appropriate rotary switches and contacts of the operated LRB relays to associated diode in the grid circuit of a vacuum tube 4–13. If both sending positions are idle, positive battery at the inputs of diodes 4–11 and 4–12 cause the vacuum tube 4–13 to conduct. With the transmission sequence switch on stud 5 and the message waiting indicator off its zero position, a ground is applied through the master reset switch to operate relay LASI. The same ground removes negative battery from the grid of vacuum tube 4–14 whereupon it conducts and operates relay LRCK. At the time relay LASI operated the timer 4–16 starts and if relay LRCK is not operated within thirty seconds thereafter, the timer tube fires and operates relay LAPC to establish priority for the line receiving position. If relay LRCK operates within the thirty-second time period the timer is reset. As relay LRCK operates, it picks up the ground from the allotter cut-out switch and applies it to the allotter request circuit. When the allotter indicates the time for the receiving position to make connection to the selected sending position or positions, ground is sent back through front contacts of relay LRCK to operate relay LASC. This relay then applies a ground to operate relay LAS, which locks up and when the LAS relay operates it removes ground from the sixty-second timer network 4–17 associated with the allotter alarm relay LAAL. If one of the selected sending positions is busy the above operation is held up until the position becomes idle.

By operating the allotter cut-out switch, no request is made for the allotter and the ground which normally initiates a request is diverted to light the lamp 4–18.

*Cross Office Line Selecting and Connecting Circuits*

Following the connection to the allotter the transmission sequence switch steps to stud 6 and the line receiving position equipment proceeds to initiate a cross office connection to the selected sending position or positions. Reference is made to FIGS. 5A and 5B which illustrates the circuits involved in this operation. For each operated LRB relay a ground is sent to operate the route initiate relay XRI at the selected sending position.

With the transmission sequence switch on stud 6, a ground through the A level from the master reset switch operates relay LRTI. If at this time relay LRB–1 is operated a circuit is completed to the grid of vacuum tube 5–11. If the selected sending position is idle positive battery is applied to the grid causing it to conduct and operate relay LRT–1. At the same time that relay LRT–1 operates a ground applied from the left hand back contacts of relay LRR and through front and back contacts of various other relays, causes relay LRS–1 to operate. As this relay operates it locks up to a holding ground and a ground is applied to the grid circuit of vacuum tube 5–16. The tube thereupon cuts off releasing relay LRT–1. At the same time this ground is also applied through the marked studs of switches LRSWB–1 and LRSWA–1 over the route lead to operate the XRI relay at the selected sending position. This initiates the cross office line connection process.

*Cross Office Line Selecting and Connecting Circuits*

As a result of the operation of relay XRI the XLCD relay at the selected sending position is operated as will be described. The involved circuits of the sending position are shown in FIGS. 6A, 6B, and 7 and when relay XLCD operates it sends an assigned code to mark the studs of the two line switches associated with each receiving position. The line switches thereupon hunt for the marked studs and when they are reached the associated line busy relay LLB is operated to complete the cross office connection.

If only one cross office connection is required, indicating that only LRB–1 is operated, line switches LLSWA–1 and LLSB–1 are positioned to operate relay LLB–1 indicating a single cross office connection. If two cross office connections are required relay XLCD at the second selected sending position sends its code back first which positions the other set of line switches to operate relay LLB–1.

When relay XLCD at a selected sending position operates, it ends two identical switching codes to mark the line switches associated with each receiving position. The position of the code group switches determines which one of the two sets of line code leads will be used.

With the code group switch 6–11 in its No. 1 position, it connects the line code control lead from the code group No. 1 and the J level is used to stop the line switches on the marked studs. With the switch in its other position the control lead from code group No. 2, and the K level is used to stop the line switches.

The two grounds that comprise the cod are applied to both the J level and K level studs of line switches LLSWB and LLSWA. Ground from relay LRR operates the step magnet associated with the operated LRS relay until it reaches the marked stud. In conjunction therewith relay LLFB operates and the step margnet of the other switches then steps until its marked stud is reached whereupon relay LLFA operates.

Once both relays LLFB and LLFA are operated relay LLFS operates, which results in the operation of the appropriate line busy relay LLB. Relay LLB locks up and when this occurs the cross office connection to the selected sending position is complete. A 30 millisecond timer 7–15 provides an interval for the operated LLB relay to lock up before the operating ground is removed. The same ground is used to operate relay LRRC and the timer circuit checks that the operated LLB relay is locked up before the second line connection cycle, if required, is initiated. If two cross office connections are required both LRB relays are operated and ground from relay LLFI would cause the ground from relay LRR to release relay LRB–2.

After the line connection circuits are reset the sequence switch is stepped to stud 7 and relay LRTI releases. Associated with the above described circuits are a pair of timers 6–17 and 6–18 and the former will fire its associated tube provided that relay LLFI is operated for more than two seconds or that relay LLFI is released for more than ten seconds with relay LRTI operated.

*Cross Office Allotter Release Circuits*

When the transmission sequence switch steps to stud 7 the cross office connection between the line receiving position and the selected position or positions is completed and the connections are checked to insure that the sending positions are not busy. The circuits for these functions are shown in FIG. 8 and the check is made by detecting the absence of the number 1 and the number 2 control pulses on the connected line or lines. If the check is satisfactory the number 1 pulse is transmitted to busy the selected sending position or positions and an answer back in the form of the number 2 control pulse from the selected sending position or positions that have been busied is detected at the line receiving position. A correct check results in the stepping of the transmission sequence switch to stud 8 where the allotter is released. The manner of transmitting and detecting the above mentioned pulses is described elsewhere herein in connection with the description of the electronic transmitter and receiver. With the sequence switch on stud 7 ground from the master reset switch ground through the A level will operate relay LLTI. When this relay operates a ground is applied to the first and second absence tubes 1A and 2A of the electronic transmitter. If the number 1 control pulse is absent tube 1A fires to operate relay LLIT and if both pulses are absent tube 2A fires to operate relay LPIT.

*Route Busying Operation*

With the operation of relay LPIT ground is applied over the No. 1 key lead to the No. 1 pulse keying transistor and as a result the No. 1 pulses are sent over the cross office lines to the electronic receiver associated with each selected sending position. The detection of this pulse fires a vacuum tube which operates a route busy relay XRBY to busy the sending position. The operated XRBY relay provides a ground which causes the No. 2 pulse to be sent back to the receiving position, indicating that the sending position has been busied. The detection of this No. 2 pulse at the receiving position fires the 2P vacuum tube to complete a circuit through stud 7 of the K level of the sequence switch to operate a step magnet to advance the switch to stud 8. This removes the ground holding relay LLTI operated to initiate an allotter disconnect process.

*Center Routing Transmission Circuits*

When the transmission sequence switch steps to stud 8 and no center routing information is to be transmitted across office, relay LRBR remains unoperated and the sequence switch steps to stud 9. If the message is routed to a spillover, supervisory, or multiple address position, indicated by the operation of certain relay, center routing information is required and is sent cross office at this time. FIGS. 9A to 9B disclose the circuits involved and with the sequence switch on stud 8 and with no transmission of center routing sequence a ground on the A level causes the switch to step to stud 9.

If there is center routing sequence transmission, the sequence switch on stud 8 completes a ground for the operation of relay LRXI. This indicates that the center routing sequence set up on certain studs of a rotary switch in the message cancellation switch is to be inserted into the message at this point. The center routing information will be determined by the settings of the center routing control switches to establish a pattern of grounds on the studs of the rotary switch included in the message cancellation circuit. The message cancellation switch is stepped by the auxiliary step circuit from the electronic transmitter and it is so arranged that after sending center routing sequence information its steps the sequence switch to stud 9.

*Message Number Transmission*

When the sequence switch steps to stud 9, a message numbering machine is activated through suitable control circuits similar to those described in the above-mentioned copending application to insert certain information into the tape at its associated sending position. This information includes identification characters and a message sequence number and when the sequence switch steps to stud 10, a sequence number indicator starts stepping to send certain information to the electronic transmitter depending upon the particular line receiving position. The above operation includes the operation of relays LNXI and LNCI, and after these operations the sequence switch steps to stud 11.

*Cross Office Message Transmission*

When the sequence switch steps to stud 11, the tape transmitter resumes stepping and the information in the tape storage loop followed by the message text is sent to the electronic transmitter to be transmitted across office. With the sequence switch on stud 11 ground is applied through the A level to operate relay LTXI which completes the circuit to step the tape transmitter. Each time the transmitter steps, the sensing pins read the character punched in the tape and sends this information to the electronic transmitter which sends this character in the form of electronic pulses across office to the electronic receiver associated with each of the selected sending positions. When the end-of-message code is read, the end-of-message thyratron fires to step the sequence switch to stud 12.

If relay LLXC has previously been operated when the sequence switch steps to stud 11, a message cancellation unit is activated to automatically transmit a message cancellation notice. A message cancellation notice can be initiated manually by the operation of the message cancel key and in both cases an end-of-message sequence is included which steps the sequence switch to stud 12.

If the end-of-message sequence is not present in the tape or if the message is to be terminated before its completion, the operation of the message end key causes an end-of-message sequence to be transmitted and thereby terminate the message that has been or is in the process of being transmitted. This operation includes the stepping of a rotary switch in the message cancellation unit and causing it to send only the end of message code set up on certain of the studs thereof.

*Cross Office Line Disconnection*

When the sequence switch steps to stud 12, the line receiving position circuits initiate the cross office transmission of the No. 5 control pulse. At the sending positions this causes the numbering machine rotary switch to resume operation and five successive blank characters are sent to the associated electronic receiver. The five blank characters permit the last message character to be read for a parity check. After the punching of the five blanks the numbering machine at the sending position keys the No. 4 control pulse and its detection at the line receiving position initiates a disconnection operation. The detailed circuits for the disconnecting operations are shown in FIGS. 10A and 10B, and include relay LLRI which operates through the A level of the sequence switch when it reaches stud 12. In conjunction therewith the No. 5 control pulses are sent from the electronic transmitter to the electronic receiver associated with each connected sending position to step the main rotary switch of respective numbering machines from stud 19 to stud 25. Thereupon the No. 4 pulses are sent back to the line receiving position causing operation of relay LCNE which in turn operates relay LCNR. All relays that are locked up to relay LCNR are now released and it completes a circuit for stepping the sequence switch to stud 13.

The LCNE relay closes the necessary circuits to energize the message waiting subtract magnet and the sequence number indicator.

*Cross Office Line Trouble Circuits*

FIGS. 11A to 11D show the circuits for detecting trouble on the cross office lines and should trouble occur at a selected sending position after the cross office connection has been established, the connection to the troubled sending position is released.

An alarm circuit is used to detect abnormal delay in the operation of the sequence switch LSQSW and it initiates a test on each line busy relay circuit. If the sequence switch remains on stud 7, 9, 10 or 12 for longer than 3 seconds the tube in the plate circuit of relay LLAL fires to operate the relay. As relay LLAL operates it applies a ground to the cathodes of a pair of vacuum tubes in the electronic transmitter associated with relays LLB–1 and LLB–2 respectively. If either of the connected lines is in trouble the grid of the appropriate tube is biased so that it will conduct when its cathode is grounded. Either of these tubes in conducting energizes the release winding of their associated LLB relay to disconnect the troubled line.

A 30 millisecond interval is provided for the troubled line disconnect process. As soon as relay LLAL operates this timing network in the circuit of relay LLTE is activated and operates after this 30 millisecond interval. Relay LLTE in operating breaks the operate path for relay LLAL which resets the timing networks.

Should failure occur with the sequence switch on stud 7, 9 or 10 the operation of relay LLAL operates relays LRSW and LLXC. These relays in operating bring up visual indications by lighting lamps associated therewith and results in the automatic transmission of a message cancellation notice when the sequence switch reaches stud 11. Control circuits are also activated to prevent the message waiting indicator subtract magnet from being energized and from preventing advance of the sequence number indicator.

Relay LLXC in operating activates control circuits to prevent the position in trouble from being cleared out and reset and it therefore can not accept another message. In order to clear the trouble the manual stop switch is thrown to its stop position and after resetting the tape in the transmitter to the beginning of the message that caused the troubled condition the switch is returned to its normal position so that the message is processed again.

If the failure occurs with the sequence switch on stud 12 and the reswitch relay LRSW has not been operated the operated LLAL relay operates relays LSSW and LLXC and as before these relays prevent certain operations from occurring and light the supervisory switch lamp. At this time the attendant can be punching a new copy of the message with a notation that it is a suspected duplicate, cause the message to be reprocessed at the line position. The attendant may also direct the message to the supervisory position by depressing a "route to supervisor" push button.

When relay LLXC operates it locks up to a ground at the manual stop switch. As soon as the receiving position is ready to be cleared out and reset for the next message, relay LCNE operates which in turn operates relay LCNR. However, with relay LLXC operated relays LCNE and LCNR are not permitted to release. Consequently, the receiving position is prevented from being cleared out and reset and it will not accept another message.

*Route Lead Circuits*

Since only one cross office connection can be made to a line sending position at a time, a route test is made by each receiving position which has a message for the line sending position. This test determines whether the sending position is idle, busy or closed out and its conditions are determined by the application of positive battery, no battery or negative battery respectively to the route lead.

The circuits associated with the route leads are shown in FIGS. 12 and 13 and if in conjunction with a route test the line sending position is found to be idle, the positive potential operates relay XRI. The operation of this relay operates relay XNMS, which locks up and operates relay XLCD. This relay is held operated by the ground applied from the receiving position to the line code lock lead. As relay XLCD operates it establishes 2 identical line switching codes which appear over the code group multiples at all receiving positions. The 2 group multiples are provided so that one may be used as a spare if trouble occurs on the other.

When the receiving position line switches reach the studs marked by the operated XLCD relay the cross office connection between the two positions is made in the manner hereinbefore described. Thereupon the electronic receiver receives the No. 1 control pulse, resulting in the operation of the associated XRBY relay. This relay opens the line sending position portion of the route lead circuit and if another receiving position requests this sending position it will receive a no battery or busy indication over the route lead circuit.

Any abnormal delay in the operating sequence of relays XNMS and XLCD is detected by a pair of timer tubes 12–11 and 12–12 which are arranged to fire after 660 milliseconds and 130 milliseconds respectively to cause operation of relay XRCO. In addition to lighting a signal lamp and activating an alarm circuit, relay XRCO closes out the line sending position by placing negative potential on the route lead.

*End of Message Disconnect*

The end of message is indicated by the characters, figure shift, H, letter shift and the automatic message numbering machine is stepped to its home position. This releases all relays associated with the line sending position and when the route busy relay XRBY is released, the normal idle route lead circuit is established. Thus the next requesting receiving position will find positive battery when it makes the route test.

If desired a line sending position can be closed out manually by operating its close-out switch. The close-out switch when operated applies negative battery directly to the route lead and, in addition, a ground is applied to a signal light to indicate the closed out condition. Furthermore, another ground is applied to the clear-out button which, if operated at this time, extends the grounds for the operation of relay XCNE. This initiates the release of the line sending position by starting a disconnection cycle.

As described in connection with the electronic receiver, all information sent across office through the electronic receiver from the electronic transmitter is in the form of electronic pulses. The five intelligence pulses for a character are applied to associated thyratron circuits which conduct if the signal is marking and remains nonconducting on spacing signals. The five thyratrons control associated selector magnets and in conjunction therewith a sixth pulse trips the clutch magnet of the reperforator to punch a representative character in the tape.

The reperforator has associated therewith various control circuits and includes a set of readback pins which operate in conjunction with the parity comparison circuit whereby the stored characters are checked. Also included in the reperforator control circuits is an open line alarm circuit which operates when the electronic receiver fails to receive the No. 1 control pulse and a reperforator tape feedout circuit which controls the reperforator to feed out automatically a predetermined length of blank tape to enable the last intelligence character therein to be advanced sufficiently for a parity check by the readback pins.

Associated with each reperforator at a sending position is a sending distributor which converts the character stored in the perforated tape to serial pulses and transmits the same over the associated outgoing circuit.

*Pulse Generator*

An electronic pulse generator is the basic timing unit which serves as a distributed pulse source for both the line receiving and line sending electronic units employed in cross office transmission. The circuits of a pulse generator are shown in FIGS. 14A and 14B, and it operates to generate 12 sequentially distributed pulses for transmitting signals and 12 distributed probe pulses for detection. The detector probes are arranged so as to fall in the center of their corresponding transmitting pulses. The complete sequence of 12 pulses occurs during the period of one complete cycle of a 60-cycle per second timing source and repeats continuously. All pulse generators at a switching center are synchronized by a phasing circuit driven by one common phasing transformer. Thus, the No. 1 pulse will occur simultaneously in all units and the No. 2 likewise, etc.

One of the basic elements of the pulse generator is a 6-stage transistor ring counter 14–11 which is used to distribute the twelve pulses. Another component of the pulse generator is a 720 cycle per second start-stop local oscillator 14–12 which together with a correcting network accurately keeps the local oscillator frequency at twelve times the 60-cycle line synchronizing frequency. The ring counter 14–11 is driven by the local oscillator and is started by a trigger pulse from the phasing circuit and stopped on the final count of the ring counter. Two synchronizing pulses are derived from each cycle of the timing source and the ring counter counts up to six twice for each cycle of the timing frequency. The twelve distributed pulses are derived by gating the six counts of the ring counter with each of the two half cycles of the timing source. The output of the 720 cycle oscillator is corrected by sampling the final pulse of the ring counter and changing the frequency accordingly. If the oscillator frequency is too high the sixth pulse is too wide and when the oscillator frequency is too low the sixth pulse is too narrow. This variation of pulse width is converted to a voltage variation used to control the frequency of the driving oscillator in a direction opposite to that which caused the error.

The secondary of the common transformer 14–13 is multipled to the pulse generators at a switching center and at each generator the outputs thereof are rectified and applied to the base of a transistor 14–14. The control circuits of this transistor are so arranged that when the rectified voltage falls to near ground potential the transistor conducts. The outputs thereof are substantially narrow square pulses going to ground substantially 200 microseconds in width and there are two such pulses for each cycle of the 60-cycle timing source.

The output of transistor 14–14 serves three functions (*a*) when the power is first turned on in an office, it is possible that the ring counter stages may be in any random condition. If a positive pulse is applied to the base of the conducting transistor of a binary, this transistor will be cut off and the other transistor of the binary will go to full conduction. To insure the proper condition of the ring counter at its beginning of operation, a positive pulse is derived from the sync pulses of transistor 14–14 by passing it through a differentiating network. This pulse is applied to the right hand side of the first stage of the counter and to the lefthand side of the five remaining stages. Thus the first sync pulse will properly prime the ring counter or put the first stage on and all other stages off. (*b*) The sync pulse output of transistor 14–14 is also fed to the base of transistor 14–16 of the oscillator 13–12. This insures that the oscillator will start at once when the stop gate is removed from the base of its transistor 14–17. When the oscillator is stopped transistor 14–16 is conducting and transistor 14–17 is cut off. The application of the sync pulse to transistor 14–16 cuts it off and the oscillator starts running, causing the ring counter 14–11 to make one cycle of operation. (*c*) The sync pulse output of transistor 14–14 is also applied to the input circuit of a binary of flip-flop 14–18 including transistors 14–19 and 14–20. The binary 14–18 will switch from one state to the other for every sync pulse applied thereto. The sync pulse is steered to the base of the conducting transistor through diodes and will cut this transistor off causing a transition to take place. Since there are two sync pulses for each cycle of the timing voltage, binary 14–18 will make two transitions per timing cycle. By gating the output of either transistor 14–19 or 14–20 with the outputs of the ring counter a count of 12 from the sixth stage counter can be obtained. Since it is not certain in which state binary 14–18 will be in when power is first applied, transistor 14–21 is provided which insures that transistor 14–20 will be conducting during the first negative cycle of the timing voltage. Associated diode 14–22 passes the negative half cycle and as this negative potential rises it will overcome the positive 5 volt bias on the base of transistor 14–21 causing it to conduct and go to saturation. The collectors or transistors 14–20 and 12–21 are directly connected and thus transistor 14–20 is also caused to conduct. Thus transistor 14–20 will always conduct during the first negative half cycle of the phasing voltage. After this the state of binary 14–18 will be switched only by the sync pulses from transistor 14–14.

The voltage divider at the base of transistor 14–14 is arranged to give a sync pulse of 200 micro-seconds. If this pulse is less than 200 micro-seconds the ring counter may not be primed when power is first turned on. This sync pulse attempts to put the right side of the ring counter binary of the first stage off and the left side of the last five binaries off. Whenever the right side of a binary makes a transition from off to on it sends a positive pulse onto the right side of the following binary attempting to cut it off. Thus a positive pulse is being applied simultaneously to the left and right side of the binaries. Which ever of these pulses persists the longest will predominate and if the predominating pulse should be the coupling pulse the ring counter will not be primed. To eliminate this condition resistors such as 14–23 are provided. These resistors have a value of 100K and allow only the narrow portion of the coupling pulse to reach the base of the transistors. As this pulse will not exceed the length of the sync pulses the latter will always predominate and correctly prime the ring counter.

*Ring Counter*

The ring counter 14–14 is primed by the sync pulse output of transistor 14–14 as pointed out. Therefore, with the No. 1 count being made the right side of stage 1 will be off and the right side of all other stages will be on. The sync pulse which primed the ring counter also starts the oscillator 14–12 which simultaneously supplies positive pulses to all stages of the ring counter except the last stage through a buffer amplifier transistor 14–24. These positive pulses are applied to the left sides of the ring counter stages. If at this time any stage has its left side conducting this positive pulse will cause the stage to change.

The collector of the right hand transistor of each stage of the ring counter with the exception of the last is coupled through an R–C network to the base of the right hand transistor of the next succeeding stage. Diodes such as 14–26 in this connection allows only the positive pulse to effect the base. This positive pulse will cause this right side to be cut off and the left side to conduct.

The ring counter advances its count as follows. Let it be assumed as explained that the sync pulse has turned the first stage on and the other stages off, thus stage one is making its count by being on. The sync pulse also started the oscillator and after it has made one complete cycle the collector of transistor 24–17 has gone from non-conduction to conduction. The collector of this transistor is capacitive coupled to all stages of the ring counter except the last through buffer amplifier 14–24. The coupling capacitor 14–27 in conjunction with its coupling resistor such as 14–28 will form positive going pulses from the output of transistor 14–24 only when resistor 14–28 is terminated at ground. From the assumed conditions when the number 1 stage is making its count this will be true. Thus a positive pulse will be applied to the conducting side or left hand transistor of the number one stage which immediately cuts it off. The right hand transistor now goes into conduction and will generate a positive spiked pulse which is passed into the base of the conducting or right hand transistor of stage 2. This cuts this transistor off. Therefore, stage 2 is now making its count. At the completion of the next cycle of the oscillator the above procedure is repeated with respect to stage 2 which switches stage 2 off and puts stage 3 on. This sequence is repeated until the last stage is reached. This stage is not switched by a pulse from the local oscillator but rather by a sync pulse from transistor 14–14. This provides for the proper phasing of the local oscillator with the sync pulse. The binary 14–18 gates the outputs of the ring counter to give the required count of 12.

*Oscillator and Corrective Circuit*

The oscillator which drives the ring counter is a free running multivibrator which is started and stopped after each count of 6. The frequency of the oscillator is determined by condensers 14–29, resistors 14–31 and the voltage applied from the emitter of transistor 14–32 included in the corrective network.

The oscillator is stopped during the interval that the sixth stage of the ring counter is making its count. At this time the collector of the right hand transistor of the sixth stage will be negative and when the collector of transistor 14–17 goes negative at the beginning of the second half of the count period, diodes 14–33 and 14–34 in the base circuit of transistor 14–36 will be blocking. Thus negative potential will be applied to the base of this transistor through the associated voltage divider and it will conduct. If either transistor of the sixth stage is conducting, then either diode 14–34 or 14–33 will conduct and the negative potential will not be impressed upon the base of transistor 14–36. This will render transistor 14–36 non-conducting and the oscillator will run normally. During the first 5 counts of the ring counter the right hand transistor of the last stage of the counter is conducting and therefore transistor 14–36 is not conducting. However, during the sixth count the right hand transistor of the last stage is non-conducting and transistor 14–36 will conduct as soon as transistor 14–17 goes non-conducting. The collector potential of transistor 14–36 is applied to the base of transistor 14–17 and when the former is conducting it will clamp the base of the latter to ground and thus prevent the oscillator from running. When the next sync pulse is received it will switch the count from the last stage to the first stage. The right hand transistor of the last stage is now conducting and transistor 14–36 is switched off to remove the clamping ground from transistor 14–17. The sync pulse also applied to the base of transistor 14–16 cuts it off to start the oscillator instantaneously.

The oscillator frequency is corrected when required by an amount proportionable to the width of the final pulse of the counter. If the oscillator is running fast the sixth pulse will be too wide and if too slow the sixth pulse will be too narrow. The sixth count with any accumulated error is coupled to an inverter amplifier transistor 14–37. The output of this transistor is coupled through a capacitive network to the base of transistor 14–38. This network has a long time constant such that it couples an almost perfect length signal from the collector of transistor 14–37. The arrangement is such that there will be a voltage drop in the collector resistor of transistor 14–38 and thus the voltage of the collector will vary with the base input voltage. If the width of the sixth count varies the average level of the voltage applied to the base of transistor 14–38 will also vary due to the averaging effect of the coupling capacitor. The voltage at the collector of transistor 14–38 is applied to the base of transistor 14–37 through an integrating circuit. The relatively large time constant of this circuit causes the voltage at the base of transistor 14–32 to slowly change in accordance with the voltage at the collector of transistor 14–38. Any variation of the sixth pulse will be reflected as a change in the emitter potential of transistor 14–32. This voltage is applied to the oscillator 14–12 to control its frequency in such a manner that narrowing of the sixth pulse causes lowering of the voltage to increase the oscillator frequency and widening of the sixth pulse increases the voltage to decrease the oscillator frequency.

*Detector Pulse Forming*

The detector probe pulses which are in the form of short pulses or spikes are produced by differentiating circuits in the inputs of transistors 14–41 and 14–42. These transistors are used as switches and are cut off when the positive spikes from the differentiating circuits are passed by associated diodes 14–43 and 14–44. Transistor 14–41 will provide 6 of the required probe pulses and transistor 14–42 will provide the other 6. The bases of these transistors through the associated diodes and suitable resistors are connected to the collectors of transistors 14–20 and 14–19 respectively. This arrangement is such that if the collector of transistor 14–20, for example, is at ground potential or conducting, transistor 14–41 will have output spikes and transistor 14–42 will not. This condition is reversed by the reversal of the condition of the flip-flop 14–18. The input of the differentiating circuit is taken from the collector of transistor 14–16 of the oscillator. This collector goes to ground when transistor 14–17 is being cut off and this occurs at the center of the transmitting pulses. Thus the produced detector pulses or spikes will occur at the center of the transmitting pulse. Transistors 14–46 and 14–47 are arranged to invert and amplify the detector pulses or spikes and they are applied to the 12 detector pulse leads 1D through 12D. The two groups of 6 pulses each are gated with the outputs of the ring counter so as to provide 12 sequential individual detector probe pulses.

The collectors of the right hand transistors of each stage of the ring counter 14–11 are connected through individual diodes, such as 14–49, to a pair of output pulse leads. There are twelve of these pulse leads A1 through A12 and to each one or the other of a pair, a pulse is applied as determined by the condition of the flip-flop 14–18. The gating action by flip-flop 14–18 is such that each of the pulse generator output leads have a pulse applied thereto in sequential order once for each period of the 60-cycle timing source. Accordingly, transmission of the complete pulse sequence of twelve pulses requires 16⅔ milliseconds.

*Delegations of Pulse Functions*

Each of the twelve pulses is assigned to perform a distinct function when detected on the cross office line.

Pulse No. 1: The No. 1 pulse is used to test for an idle line condition. When a line receiving position makes its line connections, it checks for the No. 1 pulse absence before proceeding with the cross office transmission. The absence of this pulse signifies an idle condition which allows the transmission sequence to proceed. Following the absence check the No. 1 pulses are transmitted by the line receiving position during the entire cross office transmission sequence and this prevents any other line receiving position from making an idle test on the line at this time. The No. 1 pulse also serves as a connection indication for the line sending position. After a line connection, the line sending position continuously looks for the No. 1 pulse absence. If its absence is detected in the midst of a cross-office transmission, it is interpreted as a line disruption and will establish an alarm condition. The detection of the No. 1 pulse absence during the end-of message disconnection sequence will cause the line sending position to clear itself and be conditioned for a new cross office connection thereto.

No. 2 pulse: The No. 2 pulse is used to make the position idle test (route busy test). The absence of this pulse causes the No. 1 pulse to be put on the cross office line. After the No. 1 pulse is put on the line, the No. 2 pulse is sent back over the line to indicate the reception of the No. 1 pulse at the line receiving position. When sending a multiple address message all the involved line sending positions must send back a No. 2 pulse to indicate that their position is ready for cross office transmission. In such cases the No. 2 pulse being sent back releases an allotter for use by other line receiving positions.

No. 3 pulse: The No. 3 pulse is the connection indicator pulse. It is transmitted and received by either the line receiving or the line sending positions and is manually keyed by a push button at a connection indicator panel. When this pulse is keyed for a particular receiving position, a connection indicator lamp glows for each sending position ot which the receiving position is connected over a cross office line. Likewise, when the pulse is keyed for a particular sending position, an indicator light glows for any receiving position to which the sending position is connected.

No. 4 pulse: The No. 4 pulse is put on the cross office line by the line sending position when the outgoing number from the numbering machine has been inserted in the tape at the line sending position. This pulse is detected at the line receiving position and checks that this function has been performed and causes the transmission sequence switch to advance to its next position. This function is the sequence number indicator transmission and it is thereupon transmitted cross office. Following this transmission the line receiving position looks for the absence of the No. 4 pulse which indicates that the SNI number has been perforated in the outgoing line position tape. The No. 4 pulse is used again in the end-of-message transmission sequence and its presence instructs the line receiving position that the end-of-message characters have been punched and checked at the line sending position and that a disconnection function can proceed.

No. 5 pulse: The No. 5 pulse steps the rotary switch of the numbering machine which puts outgoing message numbers in the tape at the line sending position. It also inserts five blank characters into the outgoing tape to permit checking of the end-of-message transmission characters by the readback pins of the reperforator. The main rotary switch of the numbering machine at appropriate points serves to key the No. 4 pulses in making the various checks.

No. 6 pulse: The No. 6 pulse is used to trip the clutch release magnet of the reperforator at the line sending position.

No. 7 through 11 pulses: These five pulses are employed to control the operation of the reperforator selector magnets in various combinations to determine the code punched in the tape.

No. 12 pulse: The No. 12 pulse is the parity check pulse. It checks parity on line transmission into any line sending position. The No. 12 pulse is transmitted when the accompanying five intelligence pulses are composed of an odd number of marking conditions. It is not transmitted if the accompanying character contains an even number of marking pulses. Any character received at the line sending position with a parity that does not correspond with the one in the tape will bring up an alarm and prevent further transmission to the involved receiving position. Blocking line reception prevents further checks from being made and this will be detected at the line receiving position during the end-of-message transmission sequence.

*Electronic Transmitter*

Each receiving position is equipped with an electronic transmitter that transmits received information over the cross office lines to the electronic receiver or receivers at the line sending or other positions, such as supervisory positions and MX positions. Included in each electronic transmitter is a tape transmitter through which the tape from the printer perforator is adapted to feed. Preferably the tape transmitters are of the type disclosed in the U.S. Patent 2,816,161, granted December 10, 1957, to H. W. Glaser et al. which enables certain selected sections of the tape to be sensed a plurality of times so that the routing indicators preceeding the message can be sent along with the message after controlling the switching equipment at a central office.

The output of the tape transmitter causes the electronic transmitter circuits to convert the output of the associated pulse generator into serial pulses which represent the 5 elements of each character read. In addition to transmitting the character selection pulses, the electronic transmitter sends control pulses to the cross office line and it also includes circuits to permit a parity check of all information transmitted across office, to read for certain control characters that initiate local control functions at the receiving position and to make route lead checks during the cross office route selecting process.

Before the signal pulses are applied to a cross office line they are keyed and combined into a single conducting channel with each transmission channel containing 2 groups of pulses, a control group and the group called the character selection block. The control pulses are transmitted at the 60 cycle per second rate, while the character selection block are transmitted at a 20 cycle per second rate.

The pulse generator associated with the electronic transmitter is similar to the pulse generator associated with the electronic receiver and outputs from the pulse generator are applied to the electronic transmitter over various ones of the detector probe pulse and transmitting pulse leads.

The electronic transmitter circuits are shown in FIGS. 15A to 15D and include a set of 10 so-called keying transistors such as 15–1, 15–2 etc. associated with output pulse leads A1, A3, A5 to A12, as indicated of the pulse generator. Control grounds are applied to the emitters of these keying transmitters in order to transmit the required pulses cross office. In order to put a marking pulse on the cross office line the emitter of the keying transistor must be at ground at the same time that the pulse generator produces a transmitting pulse.

Keying transistors 15–3 through 10 have their collectors connected through diodes such as 15–11 to a signal line 15–12 and an example will now be given of how one of these transistors, such as 15–10 is operated to apply a pulse to this line. The emitter of this transistor is connected to minus 20 volts and also through the No. 1 conductor of cable 15–13 to the No. 1 contacts of the tape transmitter 15–14. The transmitter applies grounds to the 5 conductors of cable 15–13 in various combinations in accordance with the character being read. Transistor 15–10 can not conduct as long as its emitter is negative since its base is positive with respect to the emitter. Consequently, as long as the No. 1 contacts of the tape transmitter remain open, which is the spacing condition, transistor 15–10 remains cut off. When the No. 11 pulse from the pulse generator, which is the No. 1 selection pulse is present, the base of this transistor becomes negative. The transmitting pulses from the pulse generator are negative going pulses of minus 20 volt amplitude and of 1.39 milliseconds in width. When the emitter of transistor 15–10 is held negative no conduction will take place and the output voltage at the collector remains at a negative value.

If the No. 1 contacts of the tape transmitter are closed to apply a ground to the emitter of transistor 15–10, a marking condition, the transistor will conduct when the No. 11 pulse from the pulse generator is present, since the base is dropped to a lower potential than the emitter. Transistor 15–10 conducts for the duration of this pulse and a marking condition or ground is applied to the signal line 15–12.

The emitters of keying transistors 15–6 through 10 are returned to minus 20 volts through a 1 K-ohm marking resistor. The emitter of the sixth pulse transistor 15–5 is connected to the collector of a transistor 15–16 while the emitter of transistor 15–4 is connected by conductor 15–17 to the output of the parity comparison circuit 15–15.

Transistors 15–1, 15–2 and 15–3 are keyed by grounds applied to condutcors 15–19, 15–21 and 15–18 respectively.

*Line Pulse Gate Circuit*

By a gating arrangement the basic 60 cycle frequency applied to the electronic transmitter from the pulse generator over conductor A13 is divided by a two stage counter 15–23 and a flip-flop 15–24 to supply a ground output to conductor 15–26 at a 20 cycle per second rate. This ground output every third cycle of the 60 second timing source is gated with the collectors of the transistors 15–3 through 15–10 applied over conductor 15–12 by a pair of diodes 15–27 and 15–28 forming an "And" gate. When the inputs of these diodes are both at ground potential, transistor 15–29 is cut off. A message supression diode 15–31 is also in the base circuit of transistor 15–29 and as long as the conductor 15–32 is grounded, transistor 15–29 is driven into conduction. This holds the cross office line spacing and no transmission can take place. The emitter of transistor 15–29 is connected to the collector of transistor 15–33 and these two transistors function as an "Or" gate. Thus, transistor 15–29 may be cut off by the non-conducting condition of transistor 15–33 as well as by the input applied through diode 15–31. The base of transistor 15–33 receives the output of transistors 15–1 and 15–2 and since these pulses are not gated their representative signals are sent to the cross office line at the basic 60 cycle rate.

Transistor 15–29 drives the output circuit consisting of transistors 15–34 and 15–35 to apply signals to the two output lines No. 1 and No. 2.

*Tape Transmitter Step Circuit*

The step magnet of the tape transmitter 15–14 is connected over conductor 15–38 to the plate of step thyratron 15–39. This thyratron is triggered by positive pulses from the counter 15–23 and is extinguished after approximately 16⅔ milliseconds by the knock out thyratron 15–41. An auxiliary step thyratron 15–42 shares the grid circuit of the step thyratron and is fired when its grid receives a positive pulse and its plate lead is closed through conductor 15–43. This auxiliary step thyratron is used to step the sequence number indicator main switch or the message cancellation switch and at such times the tape transmitter is auto-stopped. The knock out thyratron 15–41 is triggered by the flip-flop 15–24, which is subject to keying from various control circuits.

To auto-stop the tape transmitter suitable control circuits are employed to prevent the triggering of the knock out thyratron 15–41. In addition to stopping the tape transmitter during auto-stop, it is necessary to disable other electronic circuits. During such times the No. 6 selector pulse must not be transmitting to the line. This is the clutch trip pulse of the reperforator and if sent during an auto-stop condition it will cause blank punching at the selected sending position. The character reading probe pulse from transistor 15–48 must also be inhibited during auto-stop.

By means of a manual step switch 15–44 the tape may be stepped one character at a time through the tape transmitter when the manual stop switch 15–46 is in its stop position or to the left. With the switch 15–46 to the left, the auto-stop control lead is transferred to the manual step switch and each time the manual step switch is operated the control circuits permit the tape transmitter to step once for each operation thereof.

*Character Reading Probe Pulse*

The output from the collector of transistor 15–48 is a positive-going pulse that is produced once for each character transmitted. In order for this character reading probe pulse to be transmitted, transistor 15–16 must be conducting, the right hand transistor of the second stage of counter 15–23 must be nonconducting and the eighth transmitting pulse must be present. Transistor 15–16 conducts only when the knock-out thyratron 15–41 has been fired and when this transistor conducts, the ground at its collector is applied to the emitter of transistor 15–5. This gates the sixth transmitting pulse.

The collector of transistor 15–16 is connected to the emitter of transistor 15–48 and therefore the former must be at ground potential before the latter can conduct. The base of transistor 15–48 is connected to the emitter of transistor 15–49 and when the latter conducts, −20 volts are applied to the base circuit of transistor 15–48. This permits transistor 15–48 to conduct provided its emitter has been grounded. The base of transistor 15–49 is coupled through diodes 15–51 and 15–52 forming an "And" gate to the No. 8 transmitting pulse and to the collector of the right hand transistor of stage 2 of counter 15–23. When the output of the latter circuit is negative and the No. 8 transmitting pulse occurs, −20 volts is applied to the base of transistor 15–49 causing it to conduct. If either of these two inputs should be at ground, transistor 15–49 will not conduct and its emitter will be at ground potential.

The output from ithe collector from transistor 15–48 is coupled to the control grid of the director probe thyratron 15–53. When the plate of this thyratron is connected by conductor 15–54 to an external circuit, it will fire upon the receipt of the character reading probe pulse. This feeds the characters from the tape transmitter into the director's storage register.

The output of transistor 15–48 is also carried via conductor 15–56 to the sequence number indicator circuits where it is used for a number of purposes. In addition, the output of transistor 15–48 via conductor 15–57 is used to proble the character reading circuits.

*Control Circuits and Alarms*

During cross office transmission, any transmitting pulses on the cross office lines that are not part of the character selection block serve to perform various control functions. When a receiving position makes its line connection, it checks for the absence of the No. 1 pulse which indicates an idle condition. The absence of the No. 1 pulse is detected by the 1A thyratron 15–58. In order to fire this thyratron, its cathode must be keyed by an external relay circuit applied over conductor 15–59 and transistor 15–61 must be conducting when the No. 1 detector probe pulse occurs. These conditions are detected by diodes suitably arranged in the control circuits. Transistor 15–61 is connected via conductor 15–62 to the cross office lines and inverts any signals that may be present on the line. The collector of transistor 15–61 is connected to the control grids of thyratrons 15–58, 15–63 and 15–64. Each of these thyratrons is gated to fire when it detects the absence of its assigned pulse on the line.

The No. 2 pulse functions in the position idle test and the absence of the No. 2 pulse is required before the No. 1 pulse is put on the cross office line. After the No. 1 pulse is put on the line, the No. 2 pulse is sent back to the receiving position to indicate the reception of the No. 1 pulse at the sending position. Thyratron 15–66 detects the presence of the No. 2 pulse, and diodes in the grid circuit gate the line and No. 2 detector pulse respectively. If the line is grounded and the No. 2 detector pulse occurs while the cathode of thyratron of 15–66 is grounded through conductor 15–61, it will fire to indicate the presence of the No. 2 pulse on the line. Thyratron 15–63 tests for the absence of the No. 2 pulse. When this pulse is absent from the line, transistor 15–61 conducts and causes the thyratron to fire if its cathode is grounded via conductor 15–60.

When the outgoing number from the numbering machine has been inserted in the outgoing tape at the sending position, the No. 4 pulse is sent back over the cross office line. The presence of this pulse from every sending position is detected at the receiving position to check this function and advances the transmission sequence switch to its next position. Next the sequence number indicator number is transmitted across office and then the receiving position tests for the absence of the No. 4 pulse. Its absence at the sending positions indicates that all numbering machines have stepped. The No. 4 pulse is also used in the end-of-message transmission sequence. Thus, it is necessary to check for the absence as well as the presence of the No. 4 pulse on the line. Thyratron 15–64 detects the absence of the No. 4 pulse on the line and it will fire if the No. 4 pulse is absent when the No. 4 detector pulse occurs if its cathode is at ground potential through conductor 15–71. The presence of the No. 4 pulse is detected by thyratron 15–72 if its cathode via conductor 15–73 is at ground potential.

The No. 3 pulse is transmitted and received by either the receiving or the sending position and is manually keyed by a push button at a connection indicator panel. When this pulse is keyed for a particular receiving position, a connection indicator lamp glows for each sending position to which the receiving position connects over a cross office line. When the pulse is keyed for a particular sending position, a connection indication lamp glows for the receiving position to which the sending position is connected. Thyratron 15–74 tests for the presence of the No. 3 transmitting pulse on the line. When the line is grounded and the No. 3 detector probe pulse occurs, thyratron 15–74 fires if its plate is grounded over conductor 15–76.

A trouble detection circuit functions to identify any cross office line that indicates a trouble condition so that the line can be released from the current transmission process. This circuit includes thyratrons 15–77 and 15–78 for respective lines 1 and 2 together with associated control circuits. The control circuits include transistors 15–50 through 15–85 and operate the thyratrons once the cathodes thereof have been keyed through conductor 15–86.

*Character Reading Circuits*

In order to perform certain control functions, it is necessary that the electronic transmitter be able to recognize certain characters when they appear in the message tape at the receiving position. These characters include:

(1) "Space," which separates each of the routing indicators in the routing line;

(2) "Line feed," which proceeds the first indicator in the routing line;

(3) "Line feed and carriage return," which when occurring consecutively between routing indicators indicates that the routing line extends to another line;

(4) "Figure shift," which is the first character in both the end-of-routing sequence (figure shift, M, letter shift) and the end-of-message sequence (figure shift, H, letter shift);

(5) "Letter shift," which is the last character in the end-of-routing and the end-of-message sequence;

(6) The character "M" of the end-of-routing sequence, and (7) The character "H" of the end-of-message sequence.

Each of these characters and combinations thereof are recognized by a character reading diode matrix 15–86 which has inputs thereto over conductors of cable 15–13 from the tape transmitter and a set of outputs 15–88. This diode matrix operates in the manner similar to other matrices described elsewhere herein.

Adapted to be controlled by an output of the matrix 15–86 is a restart initiate thyratron R1C or 15–89 and it is enabled through its control circuits and relay circuits to stop the tape transmitter after a control character has been read.

Also controlled by the martix is a line feed thyratron LF or 15–91 which is fired upon the reading of the second line feed character of every message and certain other conditions exist.

The end-of-message thyratron EOM or 15–92 is fired by the end-of-message signal to initiate the disconnect process.

*Parity Comparison Circuit*

The parity comparison circuit 15–15 is connected to the output of the tape transmitter and operates in a manner similar to that of a parity circuit described elsewhere in such a manner that its output lead 15–17 has negative potential thereon when a character containing an even number of marking pulses is sensed, and ground when an odd number of marking pulses is sensed. The parity comparison circuit controls the transmission or no-transmission of the No. 12 pulse. A No. 12 pulse is not transmitted across office whenever characters having an even number of marking pulses are read and transmitted. A No. 12 pulse is transmitted when an odd number of pulses is read.

The presence or absence of the No. 12 transmitting pulse provides the means by which the electronic receiver checks the parity of the character punched at the sending position with the parity of the character transmitted by the electronic transmitter at the line receiving position.

*Route Lead Testing and Checking*

Every receiving position is provided with electronic circuits which operate to make route lead checks for the 200 route leads that terminate in sending positions. Before a cross office connection can be established, checks are made on the route leads to determine the condition of request sending positions. If a positive potential is present on the route lead at the requested sending position, it signifies that the position is idle and not closed out and, therefore, available for connection. An open or a ground on a route lead indicates that the requested sending position is busy and a negative potential on a route lead signifies that the requested sending position is closed out and not available for connection. The equipment at the receiving position detects each of these four conditions.

*Electronic Cross Office Receiver*

An electronic cross office receiver is employed at each outgoing line sending position, for example, a way sending position, a supervisory sending position, a multiple address or MX sending position as well as single line or trunk sending positions. Each electronic cross office receiver detects the signals sent cross office over a cross office channel from the electronic transmitter of a line receiving position. Detection of these signals involves a method of synchronous scanning that recognizes and identifies by time position the signals that appear on the cross office line or channel. Synchronism is established by using a common 60 cycle timing source and the same type of pulse generator, such as that disclosed in FIGS. 14A and 14B, is employed at both ends of the cross office line. A detector pulse is provided for each line signals with each detector pulse assigned to scan a particular line signal and to occur at the center of the transmitted pulse.

*Reperforator Character Selection*

The circuits of the electronic cross office receiver are shown in FIGS. 16A to 16D and associated therewith is a reperforator indicated generally by reference numeral 16–1. The reperforator includes a set of five selecting magnets 16–2, a clutch trip magnet 16–3, a cam controlled contact 16–4, a set of five readback contacts 16–6 and a readback common contact 16–7. The five selector magnets and the clutch trip magnet are connected individually over conductors of cable 16–8 to the plates of six thyratrons 16–9 through 16–14. The five thyratrons 16–9 to 16–13 are sometimes referred to as the selection thyratrons and 16–14 as the step thyratron.

Thyratron 16–14 is the first to fire in the selection sequence and it operates the clutch magnet 16–3 to initiate a perforating and readback operation of the reperforator. The character selection occurs next and causes selected ones of the selection thyratrons to be operated or rendered conducting in the combination representative of a character to be perforated, and results in the selecting magnets 16–2 being operated in a corresponding combination before the punching operation takes place. Following the punching or perforating operation by the reperforator, the contacts 16–4 open which breaks the plate circuits of all the conducting thyratrons permitting them to de-ionize and thus be prepared for the next selection sequence.

The manner of operating one of the selection thyratrons, for example thyratron 16–9, will now be given and it will be understood that the other thyratrons of the group operate in a similar manner. The line signals over line 16–16 pass through transistors 16–17 and 16–18 to the cathode of diode 16–19. Upon receipt of a No. 1 pulse over the line, the output of transistor 16–18 is at ground. The No. 1 detector pulse from the pulse generator is applied over conductor 16–21 to the cathode of diode 16–22. This detector pulse is a sharp positive pulse and is sensed at diode 16–22 during the middle of the received No. 1 pulse. At this instant of coincidence the cathodes of both diodes 16–19 and 16–22 are at ground and negative voltage is taken off the grid of thyratron 16–9. Thereupon, the grid goes positive and the tube fires energizing the No. 1 selector magnet 16–2 of the reperforator. In this manner the diodes 19 and 22 form an "And" gate whose inputs are respectively the line signals and the first detector pulse from the pulse generator. The capacitor 16–23 which has a value of .001 microfarad functions to cause the grid of the tube to attain a higher positive potential than it would without the capacitor. In the case where the No. 1 pulse is not received, the output of transistor 16–18 is negative which holds the grid of thyratron 16–9 negative through diode 16–19. Accordingly for this condition, when the No. 1 probe pulse over conductor 16–21 is received, the grid of thyratron 16–9 is held negative to prevent the tube from firing. In a similar manner, the others of the thyratrons 16–10 through 16–14 are conditioned to fire or not to fire in accordance with a pulse received over the line 16–16 as timed by the detector pulse from the pulse generator.

Under normal operating conditions, each message perforated in the tape issuing from perforator 16–1 will have a message number and other identifying signals appended thereto. The message number originates in an automatic numbering machine and the output thereof is applied to the grid circuits of the selector thyratrons 16–19 through 16–14 via conductors 16–24. The reception of the output from the numbering machine occurs after a cross office connection has been made and the proper line checks have been processed. This is evidenced by the detection of the presence of the No. 5 pulse by the so-called numbering machine control thyratron 16–26 which operates the step magnet of the numbering machine. At each step of the numbering machine rotary switch, potential is applied to various points on the rotary switch bank. These points are strapped with character selection combinations and as the switch wipers step thereover 120 volt positive potential is applied through suitable resistance in various combinations to the selection thyratrons 16–9 to 16–14. These positive voltages are sufficient to overcome the negative grid bias voltage so that the grids are driven positive causing the tubes to fire. Thyratron 16–26 steps the numbering machine through all points with the exception of point 18. Thyratron 16–27 performs the function of stepping the numbering machine control off point 18 and detects the presence of a sixth pulse during sequence numbering indicator cross office transmission.

*Disconnect and Alarm Output*

The line sending position electronic receiver such as that shown in FIGS. 16A to 16D must be able to recognize the loss of a cross office line at any time after a connection is made thereto. A loss of line may indicate a normal disconnect procedure or a line failure, depending upon the part of the transmission sequence in which it occurs. The line receiving position transmits the No. 1 pulse for every cycle of the 60 cycle timing source during the entire message transmission sequence. A particular level of the rotary switch in the numbering machine connects the No. 1 pulse absent detector thyratron 1A or 16–28 to either an alarm circuit or a disconnect control circuit, depending upon the point at which the rotary switch is resting. The No. 1 pulse when received over the cross office line 16–16 is applied through transistor 16–17 and over conductor 16–29 through diode 16–31 to the control grid of thyratron 16–28. Transistor 16–17 inverts the pulse and, since its absence is a non-marking or negative line condition, transistor 16–17 converts the non-marking condition to a marking condition. Once this inversion is accomplished the absence of the No. 1 pulse is detected by thyratron 16–28 in the same manner as other pulses are detected. Depending upon the sequence in the message transmission that this detection occurs, an alarm will be operated or if in the normal disconnection sequence the disconnection will proceed.

When a line connection is made the first pulse, in addition to being applied to the thyratron 16–28, is detected by the No. 1 present thyratron 1P or 16–32. This detection occurs in the manner above described to cause the firing of thyratron 16–32 and energize the route busy relay in the plate circuit thereof.

*Connection Indicator*

A connection indicator panel located at a supervisory position provides an arrangement to determine what cross office lines are connected and to what particular position a given line receiving or line sending position is connected. There is an indicator light and push button for each operating position and each electronic line receiving and line sending unit is equipped with a connection indicator pulse keying circuit and a detector, such that a connection indicator pulse can either be sent to the line or received on the line.

A connection indicator pulse is keyed to the line whenever the emitter of transistor 16–33 is grounded by means of a push button via conductor 16–34. Transistor 16–33 is normally nonconducting because of the negative potential on its emitter and as a result, negative potential is applied to the base of transistor 16–36, causing it to conduct. The emitter of transistor 16–36 is connected to the base of transistor 16–37 and the collector thereof is connected via lead 16–38 to the base of transistor 16–39, which has its collector connected to the line. The ground from the transistor 16–36 thus results in a ground output at transistor 16–37, causing transistor 16–39 to be nonconducting. Under this condition the line is not effected. However, when the emitter of transistor 16–33 is grounded, it will conduct during the third pulse interval. Transistor 16–36 then becomes non-conducting, causing the output of transistor 16–37, which is arranged as an emitter follower to be negative. This in turn causes transistor 16–39 to conduct and thereby grounds the line during the interval of the third pulse.

Thyratron 16–42 fires at the coincidence of the third detector pulse and the line signal to light an indicator lamp in the plate circuit thereof. Diodes 16–43 and diode 16–44 form an "And" gate for the firing of this thyratron. Diode 16–43 is connected directly to the line instead of to the collector of transistor 16–18 as in the case of the character selection diodes so that thyratron 16–42 may fire during a parity alarm even though the line connection at the output of transistor 16–18 is blinded. Since diode 16–43 is connected to the collector of transistor 16–39 and this transistor is not conducting during a parity alarm indication, thyratron 16–42 will fire at the coincidence of the third detector pulse and the line signal.

The connection indicator circuit not only detects its own transmitting pulse, which results in the lighting of its own indicator lamp, but also detects the transmitting pulse of other positions connected to the same line. This indication is used as a check on the keying circuit showing that the pulse is being transmitted.

*Keying*

The basic function of the electronic receiver is to receive intelligence from the line receiving position electronic transmitter. In addition, circuits are provided for the transmission of two control signals back to the electronic transmitter. These two control signals are the No. 2 and No. 4 pulses.

Transistors 16–46 and 16–47 are keyed respectively by the second and fourth pulses from the pulse generator and this results in the transmission to the line of the No. 2 and 4 pulses. The operation of these two transistors is similar to the operation of transistor 16–33 previously described.

*Auxiliary Stepping Circuit*

The electronic receiver contains a local stepping circuit for advancing the tape of the reperforator during a tape feedout operation as well as for stepping the message disregard rotary switch. This equipment includes a two stage counter 16–53 driven by a 60-cycle square wave obtained from the pulse generator via conductor 16–54. The input circuit for the counter 16–53 includes a pulse steering network to insure that the binary will change its state every time a positive going pulse is applied.

Normally a 2-stage binary counter connected in a chain without feedback will divide the number of input pulses by a factor four. However, the counter 16–53 is arranged to obtain a count of 3 by recycling the same through a feedback path from the last stage to the first stage. The action is such that, as the second stage of the binary counter is being switched by the first binary stage, it is immediately switched again by a feedback pulse which advances the count by one and results in the counter having a final count of 3 instead of 4.

The positive voltage rise appearing at the collector of the first transistor of the first stage is coupled to the grid of thyratron 16–56 which fires the tube. A resistor divider network is connected to conductor 16–57 and when this control lead is grounded the tube is allowed to fire by the trigger pulses from the counter. Thyratron 16–58 detects the presence of the fifth pulse in the conventional manner and the firing of this thyratron controls a way circuit selection character switch.

*Parity Check Circuit*

The equipment of FIGS. 16A to 16D also contains a parity check circuit to insure that the character being punched into the tape by the reperforator 16–1 is the same character that was sent across office from the electronic transmitter. Every odd character (those containing 1, 3 or 5 marking pulses) sent from the electronic transmitter to the electronic receiver is followed by a character parity check pulse to indicate that the character just transmitted is an odd character. Assuming that an odd character is punched in the tape, its associated odd pulse is stored in the first stage of a sixth stage shift register indicated generally by reference numeral 16–59. The shift register delays the intelligence character parity or check pulse until five additional characters have been punched by the reperforator. This is necessary as this amount of tape is required for a punched character to reach the readback pins operating the contacts 16–6 in the reperforator. The parity pulse associated with the character being punched is stored in the first stage of the shift register while the parity pulse associated with the character under the readback pins is stored in the sixth stage. A sixth stage register is required since punching and reading do not take place simultaneously but are separated by a 5-character interval.

The next 5 characters, odd or even, advance the first odd character through the remaining five stages of the shift register where the pulse is then applied to the parity comparison circuit. During this interval the associated odd character will have been stepped through the reperforator and positioned over the readback pins. The parity comparison circuit reads the output from the readback pins, determines that the character is odd and compares this character with the odd condition from the shift register. In this case since both the character and the shift register output are odd, a correct comparison is made, and the reperforator steps to the next character. There is no identifying pulse to indicate an even character and for this condition no pulse is stored in the shift register. Therefore, when an even character is compared, it is the absence of a pulse that indicates that the character positioned over the readback pins is even. A correct comparison, either odd or even, causes the reperforator to step and it continues to receive intelligence from the electronic transmitter. Upon an incorrect comparison, the receiver stops and no further transmission is received until the proper adjustments are made. However, all other sending positions, if any, connected to the same electronic transmitter will continue to receive transmission.

*Comparison Circuit*

The comparison circuit of the error detector included transistors 16–61 through –65. By way of example the operation of one of these such as the first, will be described. When both the No. 1 and 2 readback contacts 16–6 indicate a marking condition, these contacts will be closed to apply ground through diodes 16–66 and 16–67 to the emitter of transistor 16–61. The voltage divider action of resistors 16–68 and 16–69 puts the base of transistor 16–61 at a positive potential thereby cutting the transistor off. If both the No. 1 and No. 2 readback contacts 16–6 are open, indicating a spacing condition for their respective pulses, a negative voltage will be present at the anodes of the diodes. In this case the emitter of transistor 16–61 is more negative than its base due to the voltage divider action and this causes the transistor to be nonconducting. When the No. 1 readback contact is marking and the No. 2 readback contact spacing the emitter of transistor 16–61 is grounded through diode 16–66. Diode 16–67 is reverse biased. The base of transistor 16–61 is negative with respect to its emitter and the transistor conducts causing its collector to be at ground. Likewise when the No. 1 readback contact is spacing and the No. 2 readback contact marking transistor 16–61 conducts. Thus, the output of transistor 16–61 is ground when the inputs are different and is negative when the inputs are alike. Transistor 16–64 operates in a similar manner from No. 3 and No. 4 readback contacts and transistor 16–65 compares the condition of the No. 5 contact with the result of the comparison of the condition of Nos. 3 and 4. Transistor 16–62 compares the results of the comparison of Nos. 1 and 2, and 3 and 4 and 5. When the number of marking pulses at the readback contacts is odd, such as there being 1, 3 or 5 marking pulses, the output of transistor 16–62 will be ground whereas when the readback contacts indicate an even number of marking pulses, the output of transistor 16–62 will be negative. The output of transistor 16–62 is then compared with the last stage of the shift register by means of the comparison circuit of transistor 16–63.

*Shift Register*

The shift register 16–59 includes a pair of transistors for each of its six stages and as pointed out functions to store the parity check pulses received from the electronic transmitter for 5-character intervals to enable the parity of character read by the reperforator readback contacts 16–6 to be compared with its parity check pulse. A pulse from the output of transistor 16–71 supplies the shift pulse to the register and is coupled to the input of each of the register transistors except transistor 16–72 of the first stage. Resistors, such as 16–73 function as pedestal circuits and are connected from the output of each stage, except the last, to the input circuits of the following stage. Transistor 16–71 and 16–74 make up a one-shot multivibrator which is triggered when the step thyratron 16–14 conducts. When thyratron 16–14 is nonconducting a high positive potential is present at its plate and the base of transistor 16–76 is positive. Under this condition transistor 16–76 is cut off and is caused to conduct when thyratron 16–14 conducts. When transistor 16–76 conducts the rise in voltage at its collector appears at the base of transistor 16–74 as a positive pulse triggered the one-shot multivibrator and turning transistor 16–71 on.

This results in the positive pulse being sent to the input of all the transistors in the register except transistor 16–72. With no input applied to conductor 16–77, the anode of diode 16–78 is held negative and because of this negative voltage at diode 16–78, the pulse from transistor 16–74 may be neglected at this time. The shift pulse is initiated by the firing of thyratron 16–14 to insure that the register is cleared when blanks are being fed out. The positive pulse from transistor 16–71 then turns transistor 16–79 of the first stage off, if it was not already off. Transistor 16–72 conducts and conditions the next stage. The next positive pulse from transistor 16–71 keeps transistor 16–79 of the first stage off and turns the lefthand transistor of the second stage off, if it was not already off. The cleared out stage of the register is such that all the right hand transistors of each stage are conducting and the left hand transistors nonconducting.

When the electronic transmitter ends an even character or one having none, two or four marking pulses, no twelfth pulse is sent to the electronic receiver. On the other hand, the sending of an odd character, one having one, three or five marking pulses, the twelfth pulse is also transmitted. Let it be assumed that the shift register has been cleared and that an odd pulse character has been transmitted to the electronic receiver over line circuit 16–16. This character contains the presence of the No. 12 pulse and the line reads a ground during this time which causes transistor 16–17 to go off and transistor 16–18 to go on. The output of transistor 16–18 is also connected through a diode to the base of transistor 16–82. The twelfth detector pulse is also connected to the base of transistor 16–82 through a diode and these diodes form an "and" gate. At the coincidence of the twelfth line pulse and the twelfth detector pulse transistor 16–82 causes transistor 16–72 to be turned off and transistor 16–79 to be turned on.

With transistor 16–79 on, a ground pedestal is present at the anode of the diode in the base circuit of the right hand transistor of stage 2. Thus, on the next shift pulse from transistor 16–74 the condition of the first stage of the register is shifted to the second stage. Also the first stage will have resumed its cleared state and be ready to store the next parity check character. If no parity pulse is received on the line for the next character the first stage of the register will remain in its initial stage. The next shift pulse shifts the contents of stage 1 to stage 2 and the contents of stage 2 to stage 3. In a similar manner the contents of the register stages are shifted so that after the receipt of 5 shift pulses the initial contents of the first stage are stored in the last or sixth stage. At this time the reperforator readback contacts 16–6 are sensing the character whose parity state occurs the last stage of the register. By means of comparison circuits and including transistor 16–63 it is determined if the parities of these characters correspond and the output of transistor 16–63 is negative if the parity of the two compared characters is correct and is at ground if the parity does not check. An incorrect parity check results in the firing of thyratron 16–83.

Concurrently with the punching of characters generated locally and applied to the receiver via conductors 16–24 an associated parity pulse is stored in the shift register. In this manner locally injected characters are also checked for parity.

*Parity Alarm Circuit*

The parity alarm thyratron 16–83 is activated in the event of an incorrect comparison by a probe pulse from the common contacts 16–7 of the reperforator and is arranged so that the pulse has no effect when the comparison is correct.

The parity alarm circuit includes a one shot multivibrator 16–84, a first flip-flop 16–86, a second flip-flop 16–87 and transistor 16–88, along with thyratron 16–83. Initially, as part of the clear-out procedure, the manual feed-out button 16–89 is operated to apply a ground to the collector of the right hand transistor of the flip-flop 16–86. This turns the right hand transistor on and the left hand transistor off if not already in that condition. The latter transistor biases thyratron 16–83 off. The closure of the common contacts 16–7 of the reperforator, once for each cycle, results in a pulse being coupled to the input of the multivibrator 16–84. This pulses the flip-flop 16–86. This pulse of approximately 5 milliseconds is one-half the period of a marking readback signal. A correct parity comparison produces a negative output from the comparison circuit including transistor 16–63 during the readback sensing interval. The output of transistor 16–63 is the pedestal for the probe pulse from the multivibrator 16–84. If the parity check is correct the flip-flop 16–86 remains in its normal state and thyratron 16–83 remains off. In the case of a wrong comparison the output of transistor 16–63 is ground and the coincidence of this ground pedestal and the positive probe pulse from the multivibrator 16–84 reverses the flip-flop 16–86 to fire the thyratron 16–83.

At the same time that thyratron 16–83 is fired, the negative potential from the right hand transistor of flip-flop 16–86 causes transistor 16–17 to be held conducting and transistor 16–18 to be cut off. Transistor 16–18 prevents any of the character selection thyratrons from firing at this time. Thyratron 16–28 is prevented from firing because of the presence of negative voltage from the right hand transistor of flip-flop 16–86. This transistor also applies negative potential through a diode to the base of transistor 16–36. As a result, transistor 16–39 is non-conducting and the condition of the line is not effected. The transmission of the No. 2 and 4 pulses by transistors 16–46 and 16–47 is thus prevented during a parity alarm.

The common contacts 16–7 of the reperforator generate the probe pulse for the parity alarm circuit and, therefore, stoppage of the reperforator motor or loss of connection to the readback contacts requires circuits to indicate that parity checks are not being made. The closure of readback common contacts 16–7 causes the left hand transistor of flip-flop 16–87 to be non-conducting and the right hand transistor to conduct. The right hand transistor of flip-flop 16–87 controls transistor 16–88 connected to the base of the left hand transistor of flip-flop 16–86. Normally transistor 16–88 has no effect on the left hand transistor of flip-flop 16–86. Whenever a character selection pulse or clutch trip magnet pulse is received either locally or cross office, the right hand transistor of flip-flop 16–87 is turned off. Its left hand transistor couples a positive pulse into the base circuit of transistor 16–88, keeping the output of the latter at a positive voltage. Diode 16–89 is now non-conducting and the R-C network at the base of transistor 16–88 is such that the output of this transistor will remain positive for more than the interval between pulses from the common contacts 16–7. The left hand transistor of flip-flop 16–87 is cut off at receipt of the next readback pulse, the right hand transistor is turned on and ground applied through diode 16–89 to keep the output of transistor 16–88 slightly positive. Thus the output of transistor 16–88 has no effect on the flip-flop 16–86 and the state of thyratron 16–83 will depend upon the state of the parity comparison circuit. If, however, there is no readback pulse a negative output from transistor 16–88 will cause tube 16–83 to fire.

During local insertion of selection characters, the presence of the No. 6 pulse or any intelligence pulse will trigger the right hand transistor of flip-flop 16–87. During cross office reception, pulses 7 through 12 are utilized as a pedestal for a probe pulse consisting of the inverted line signals. Since this pedestal pulse is positive the coincidence of it and a transmitting pulse will trigger the right hand transistor of flip-flop 16–87. Another input to this transistor used the pulse generator pulse as a probe pulse and the uninverted transmitted pulses as a pedestal. The presence of the sixth pulse then triggers this transistor and in no case is it triggered by the No. 1 pulse. The inclusion of the intelligence pulses as trigger pulses for this transistor is a safety factor in case there is trouble with the sixth pulse.

*The Director*

The function of the director is to initiate route connections between a requesting line receiving position and the line sending position or positions that serve the address or addresses specified by the routing indicators of an incoming message. The director is connected to the requesting line receiving position during the time necessary to process the routing segment of the message.

In accordance with the principals of the present invention the line receiving positions are divided into groups of 10 positions each and the control circuits are arranged so that there may be as many as 10 such groups. By obvious arrangements a greater number of receiving positions may be accommodated.

As pointed out elsewhere, the receiving positions are characterized in accordance with the function thereof. Some may be identified as line receiving positions, some as way receiving positions, others as supervisory receiving positions, multi-address receiving positions or way intercept positions.

In accordance with the disclosed arrangement the 10 position groups may be served by a maximum of 4 independently operable directors. A director is activated to initiate the connection between a requesting position and the sending positions which transmit to the particular destinations that the message at the receiving position specifies, or to connect the receiving position to a supervisory or multi-address position. The latter two positions may then be connected under the control of the director to the appropriate sending position.

FIGS. 17A to 17F disclose the arrangement of the position selection and director selection control circuits and each director contains ten director position group connect relays DPGCN, 1 through 10, each one of which is associated with its correspondingly numbered position group. When one of these relays is operated the respective director is connected to the position group containing the requesting receiving position. Such a connection is effected through position group control circuits common to all the directors at a switching center. The group control circuits include director position group initiate relays DPGI, 1 through 10, select relays DPGS, 1 through 10, and busy relays DPGB, 1 through 10 corresponding to respectively numbered position groups.

When activated by the routing information in the tape at the requesting receiving position the connected director sends back a switching code to cause the appropriate route connection to be established between the receiving position and the indicated sending position. The director selection control circuits connect the position group containing the requesting receiving position to the lowest numbered idle director. The position selection control circuits connect the requesting receiving position within this position group to the director so that the routing information preceding the message in the tape at the requesting position may be read into the director.

The routing segment of the message tape may include routing indicators for any number of single destinations and/or any number of group code destinations. Each group code routing indicator represents a predetermined group or pattern of destinations. Since the routing segment of a message includes a routing indicator for each intended destination, a switching center must identify any indicator that may have previously been processed by another switching center. Accordingly local circuits at a switching center are arranged to inhibit such routing indicators from being acted upon. This avoids duplicate message transmission. The routing segment of an incoming message may include any number of routing indicators in any combination. All routing indicators are put into a storage register and the director recognizes each separate indicator and initiates route connections to the appropriate sending position in accordance with the routing indicator. In accordance with the present invention, certain requesting receiving line positions can be connected to a maximum of two sending positions simultaneously and messages requiring more than two sending positions are automatically routed to a multi-address position which is adapted for transmission to a greater number of sending positions.

The address character reading circuits read all the characters of a stored routing indicator out of storage simultaneously and apply them to the address reading control circuits. The address reading control circuits recognize certain routing indicators and produce the appropriate switching code. For messages routed for 1 or 2 particular destinations each switching code is sent back to the requesting receiving positions. These circuits recognize any routing indicator representing a destination which should have receive the message through a switching center that previously processed it, and they provide an arrangement of preventing the duplication of the message at that destination. An alarm arrangement is provided to indicate the improper functioning of the director or the attempt to process an invalid routing indicator.

Establishing a Director Connection

Two operations arc involved in establishing a director connection. First, a connection is made between a director and the position group containing the requested receiving position. Then the receiving position making the request is connected to the director.

The connection of a director to the position group is effected by the position group control circuits common to all directors at a center and operate in such a manner as to permit only one connection to be established at a time. Once a position group is connected to a director the position group control circuits are free to make another connection. All requests for connection to a director, while the position groups control circuits are busy, are stored by these circuits. When free the position groups control circuits process such stored requests one at a time in a predetermined order.

When power is first turned on at a director, the director select control relay DSC operates. There is one such relay for each director and each locks up through its associated director busy switch and released relays DFB, BSB and DGR to ground. The operated DSC relay completes a circuit for the operation of the director group select control relay DGSC. The latter relay is slow to operate which allows sufficient time for all the DSC relays to lock up before it opens their operating circuits. Once a DSC relay is locked up, each of the directors is ready to be activated by a requesting receiving position.

As described elsewhere, when a requesting receiving position is ready to send the routing indicators to a director for processing its associated director initiate relay, such as relay LDI for position No. 1 is operated. The other positions have similar arrangements of relays, position 10 having relay WDI, position 91 having relay MDI and position 100 having relay SDI. For the time being it will be assumed that position No. 1 is the one making the request for a director as evidenced by the operation of its initiate relay LDI. When this relay operates, ground is applied over the conductor 17–11 through the associated group busy switch, back contacts of relay DPGB–1 to the coil of director position group initiate relay DPGI–1. This circuit operates the latter relay which locks up and completes a circuit to operate the associated director position group select relay DPGS–1. This relay also locks up and completes a ground circuit for the operation of the director position group control relay DPGC, the latter relay is slow to operate permitting the operated DPGS relay time to lock up before the operate circuit for all the DPGS relays is opened. When this operate circuit is broken the position group containing the requesting receiving position is ready to select the available director. When relay DPGS–1 is operated, a circuit is completed from ground through front contacts of relay DPGC and back contacts of relay DPGR to cause the director group select initiate relay DGSI to operate. At the same time that relay DPGC completes a circuit for relay DGSI, it also completes a locking ground circuit from back contacts of relay DPGR to the operated DPGS relay which in the assumed case will be relay DPGS–1.

When relay DGSI is operated, the following occurs:

(1) The timer circuit indicated generally by 17–12 for the director group alarm circuit is activated.

(2) The timer circuit 17–23 for the director position group alarm group is activated.

(3) The director select relay DS and the director select busy relay DSB in the available director are operated by a circuit from ground through back contacts of relay DPGR and front contacts of relays DGSI, DGSC and DSC, and (4) Another locking ground is supplied to the DSC relay associated with the operated DS relay through back contacts of relay DGPR and front contacts of relays DGSI and DGSC.

Connecting To a Director

Figure 17F:
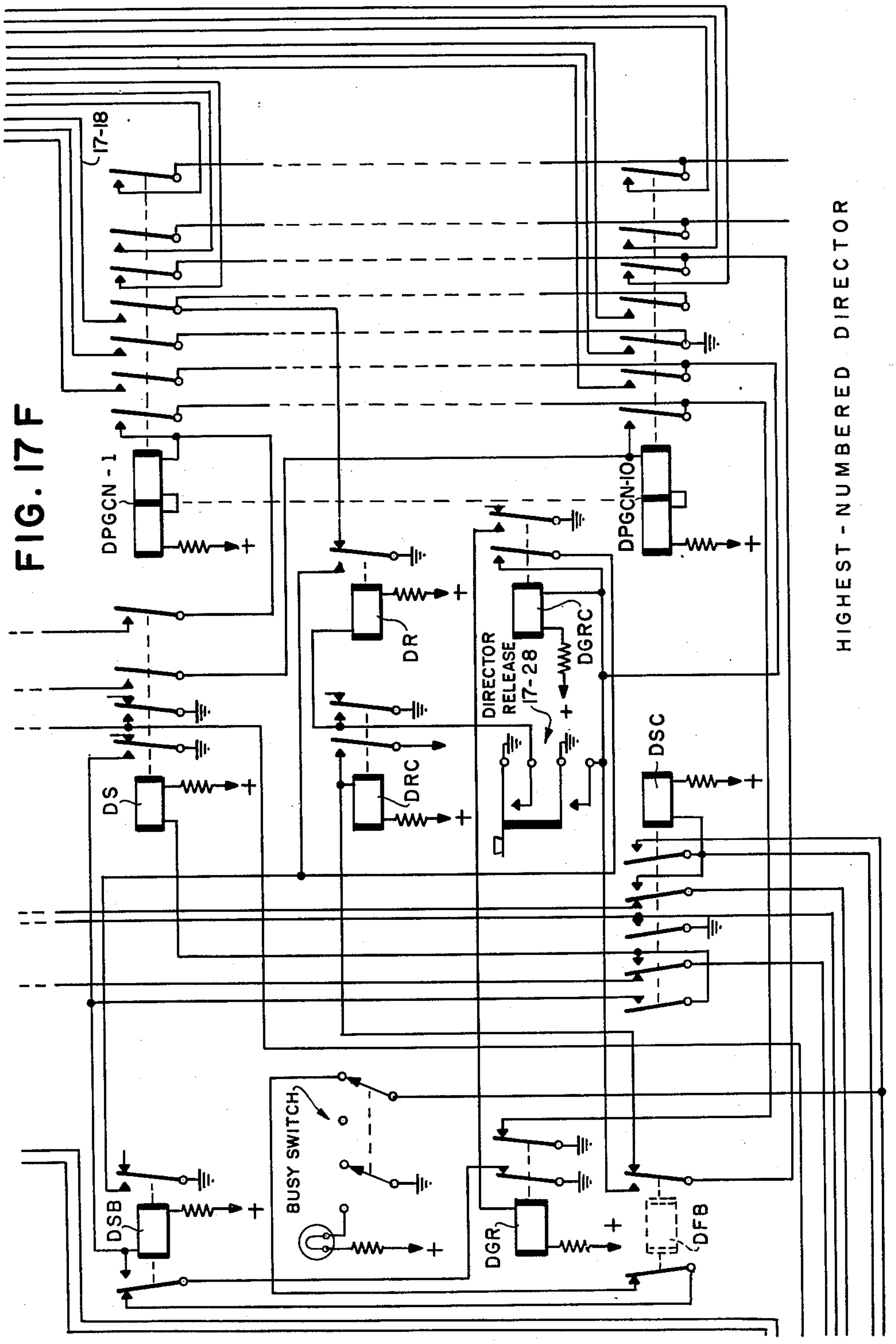

The operating DS relay, which may be assumed as the one of FIG. 17F, locks up through its associated DSC relay and completes a circuit to operate the director select busy relay DSB. The latter relay locks up through back contacts of relay DGR and it removes the locking ground from its associated DSC relay. The latter relay however, remains locked up through contacts of relays DGSC and DGSI.

The operation of relay DS completes 10 individual circuits from the coils of the associated 10 DPGN–1 through 10 to front contacts of respective DPGS relays 1 through 10. At this time only one of the DPGS relays, the No. 1 in the assumed case, is operated and the operating circuit for only its associated DPCN–1 relay will be completed to ground at the back contacts of relay DPGR. This circuit operates the DPGCN relay which locks up to ground at a back contact of relay DGR. Thus the director is connected to the position group that contains the requesting receiving position. The operation of relay DPGCN–1 completes a circuit for the operation of its associated DPGB relay and when this relay operates it indicates that the position group is busy and no other position within the group can activate any of the position groups control circuits until this relay is released.

The operation of relay DPGB–1 for example indicates that its position group is connecting to a director and the position groups control circuits must be released so that another calling position group may call in the next available director. The operated DPGB relay applies ground through its associated DPGS relay to operate relay DPGRC. The latter relay locks up by the operated DS relay. Relay DPGRC completes the circuit for the operation of relay DPGR. When this relay operates it causes release of relays DGSI, DSC and DPGS. When relay DSC releases, relay DS is released and as relay DPGS releases, relay DPGC is released. Relay DGSC remains operated as long as the DSC relay, in one or more of the other directors is operated. Relay DPGRC is released as relay DS opens its locking circuit and it in turn releases relay DPGR.

At this point all the common relay circuits in the position groups control circuits are released and another position group may activate them to initiate connection to the next director. However, the director initiate relay such as LDI in position No. 1, the requesting receiving position in the assumed case, its associated director position group initiate relay DPGI and relay DPGB in the position groups control circuits and relay DSB as well as the director position group connect relay DPGCN in the connected director associated with the requesting position group remain operated.

Should the position groups control circuits be busy when 2 or more position groups initiate a call for a director the operated DI relay in each requesting position group operates its associated DPGI relay. This assures that these calls will be served before any subsequent calls are served. Although each selected DPGI relay remains operated it can not operate its associated DPGS relay until the director completes its current function and releases relay DPGC which indicates that the position groups control circuits are available. As soon as relay DPGC releases, it furnishes the operate path for the DPGS relay associated with each operated DPGI relay. The appropriate DPGS relays operate simultaneously and cause relay DPGC to operate and when once operated the position groups control circuits are busy and additional DPGS relays can not be operated.

In the manner described the called in director goes through its connecting sequence and the appropriate DPGCN relay is operated by the ground supplied through its associated DPGS relay. This ground from relay DPGR through the series connected chain of the unoperated DPGS relays which precede the operated DPGS relay. If more than one DPGS relay is operated at a time the first one to break the series path diverts the ground to operate its associated DPGCN relay. Once the DPGCN relay for the highest numbered requesting position group has been operated the position groups control circuits serve the other operating DPGS relays and the one corresponding to the next highest requesting position group causes its associated DPGCN relay to be operate in the next available director. Each of the operated DPGS relays is permitted in sequence to apply the ground to operate its associated DPGCN relay in the available director until all of them have been served.

At each center the directors are connected so that they operate in sequence from the first to the last. An available director is selected as soon as its DS relay is operated by relay DGSI. In order for a DS relay to be operated, its associated DSC relay must be operated to complete the path for the DS operate ground from relay DGSI. When all the directors are idle the DSC relay in each is operated and each of these relays applied the ground to operate relay DGSC. As a requesting receiving position causes relay DGSI to to be operated, the DS relay of the first director is operated through its associated DSC relay. Following the connecting function the DSC and DI relays release. The next call for a director from relay DGSI passes through the released DSC relay in the first director to operate the DSC relay in the second director. Accordingly the second director is selected to serve the next call. The same sequence of operation is followed for subsequent calls until all directors have had a turn. When the DSC relay of the last director is released signifying that the last director is being selected relay DGSC releases and the DSC relay in each of the other directors is operated and locked up causing relay DGSC to reoperate.

*Connecting Requesting Receiving Position to Director*

Once a position group has been connected to a director through an operating DPGCN relay, the requesting receiving position of the group must be located and connected to the director. In order to establish this connection, the director connect relay DCN such as relay LDCN for position No. 1 and relays WDCN, MDCN and SDCN for positions Nos. 10, 91 and 100, respectively, have to be operated. These relays can not be operated unless the associated relays, such as LDI and LDS for position No. 1 have been operated.

As soon as the position group has been connected to the available director and for this phase of the operation it will be assumed that the highest numbered director, or the one shown in FIG. 17F, is involved and that the associated DPGCN-1 relay of this director has been operated. The operation of the latter relay provides an operate path for the director select relay LDS at the No. 1 position since it is assumed that the No. 1 position is the requesting receiving position. The operate path for relay LDS is through the coil thereof, front contacts of its associated LDI relay, its control switch, conductor 17–14, front contacts of relay DPGI–1, normally closed contacts, 17–17 of relay LDS, other contacts of its control switch and normally closed contacts 17–17 and the control switches at the remaining nine positions in the position group, conductor 17–18 and through the front contact and No. 58 tongue of relay GPDCN of the highest numbered director and back contacts of the associated DR relay to ground. When relay LDS operates, it locks up and opens the operate path for the corresponding relays at each of the other positions in the position group which precludes other positions of this group from being connected to the director until the connected one has been served. Relay LDS also completes a circuit for operating the associated director connect relay LDCN. Relay LDCN is a multiple contact relay with some sixty tongues and its operation effects the connection between the position involved and the director. At this time, as will be more fully described elsewhere, the transmitter at the requesting receiving position is directly connected to the address character storage circuits in the director and the transmitter can send its routing information to the director.

The connection is established between an available director and the calling position group regardless of the number of requesting positions within the group once the appropriate DPGCN relay is operated. If two or more relays, such as LDI within the connected position group are operated, the lowest numbered requesting position is connected to the director first.

*Supervisory Controls*

When relay DGSI operates it removes ground from the timing circuit associated with timer 17–12 to start its timing action. The timer is adapted to operate after an interval of approximately 60 seconds to energize relay DGAL which brings up an alarm condition including the illumination of signal light 17–21. If all directors are busy when relay DGSI operates at least one should become available for connection within the timing interval and it is re-set by the release of relay DGSI as each director connection is completed.

The operation of any DPGS relay removes the ground from the timing network associated with timer 17–13. This timer has a timing interval of approximately ⅔ of a second and operation of any DPGS relay should be followed by the operation of relay DGSI within this time interval to re-set the timer. The completion of a director connection causes operation of relay DPGRC which releases the common connection control circuits as well as to remove ground from the timer 17–13. This release should occur within the allotted time interval and re-set the timer. Failure to perform the required function within the time interval results in operation of relay DPGSAL to bring up an alarm which includes the illuminaion of signal light 17–22.

Operation of any DPGB relay removes the ground from an associated timing network, such as 17–23 having a timing interval of approximately ⅔ of a second. Operation of one of these relays should be followed almost immediately by the operation of the DCN relay for the first receiving position to be served in the associated group. This re-sets the timer 17–23 and release of the operating DCN relay re-starts the timing interval. This should be followed by the operation of another DCN relay or by disconnection of the group from the director and the release of the associated DPGB relay.

Each director is provided with a busy switch such as 17–24 which when thrown to the busy position releases the associated DSC relay if it has already operated or will prevent it from operating when the director becomes idle. However, if the director has just been selected the director connection will be completed.

Each receiving position group is also provided with a busy switch such as 17–26. Operation of such a switch releases its DPGI relay if operated or prevents it from operating when ground appears on its control lead. Automatic switching functions for any receiving position in the group to which a director is connected will be completed and the disconnection function will occur in the normal manner. However, with relay DPGI released no other position in the group can be served.

Each receiving position is provided with an automatic and manual switch such as 17–27. This switch determines whether the message switched from its associated position will be effected manually or automatically. In the manual position the chain circuit through its associated DS relay is shunted. A director release button such as 17–28 when operating causes the associated director to be completely disconnected from the receiving position and the receiving position group.

*Processing Routing Indicators*

When a DCN relay, such as relay LDCN of FIG. 17A, is operated at a requesting receiving position a DPGCN relay in the director will also be operated to complete various circuits including six individual circuits between the tape transmitter of this position and the address character storage circuits. These six circuits include tongues numbered 50 to 55 of the involved DCN and DPGCN relays. The address character storage circuits consist of a reading circuit which feeds the five intelligence elements of each routing indicator character from the pins of the transmitter into the storage register, a storage circuit which receives each of the routing indicator characters from the reading circuit and a ring counter to open in sequential order the files of the storage register. All of these circuits and units will be described more fully hereinafter.

Each routing indicator in the tape associated with a message indicates a particular destination or in the case of group code routing indicators a predetermined pattern of destinations to which the accompanying message is to be sent. As described herein each routing indicator may contain a maximum of seven characters with each character comprising five elements each one of which may be a mark or a space. The storage register contains thirty-five thyratron tubes and each corresponds to a particular element in the characters comprising a single routing indicator. The thyratrons are arranged in seven vertical files of five tubes each.

Figure 18B:
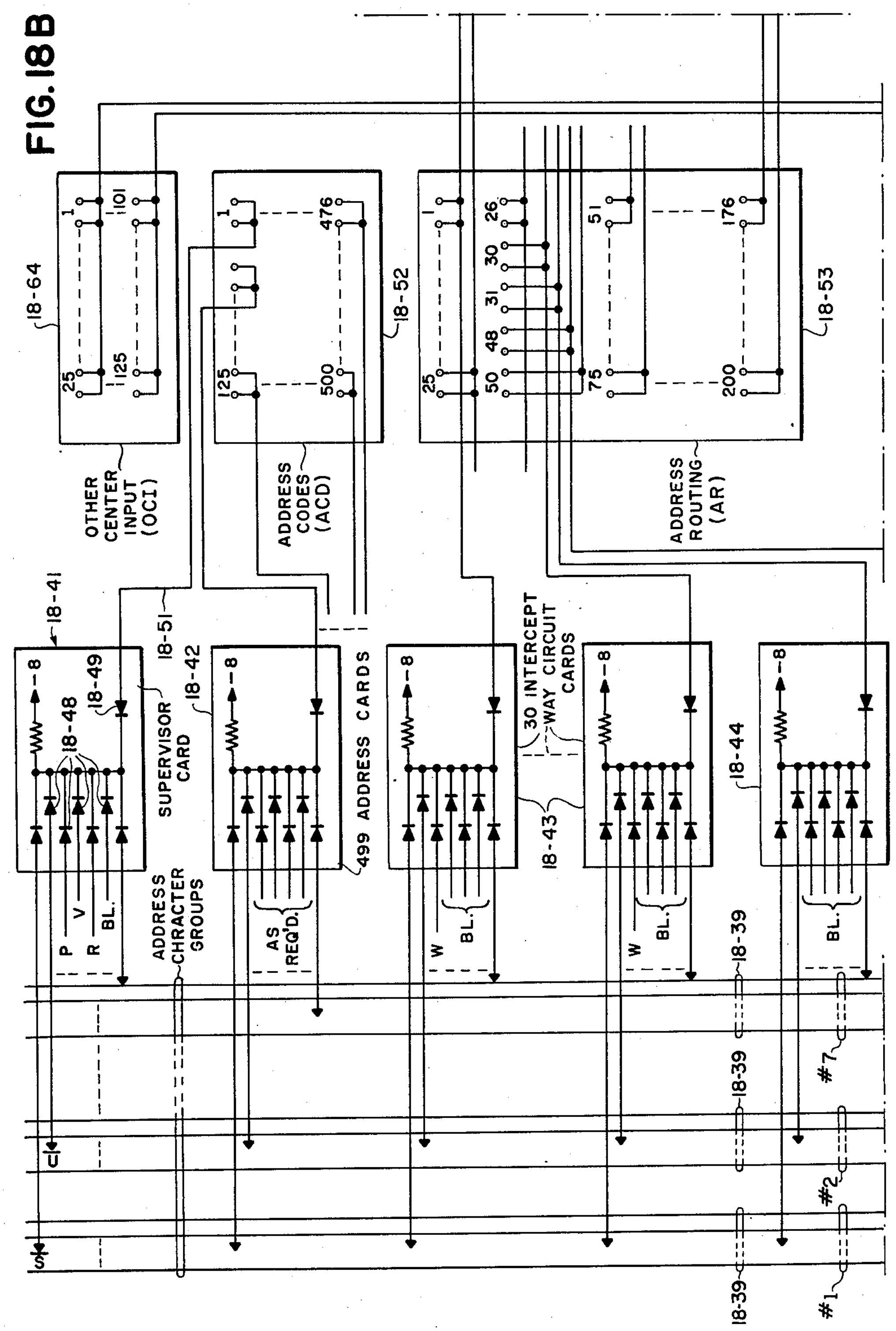
Figure 18C:
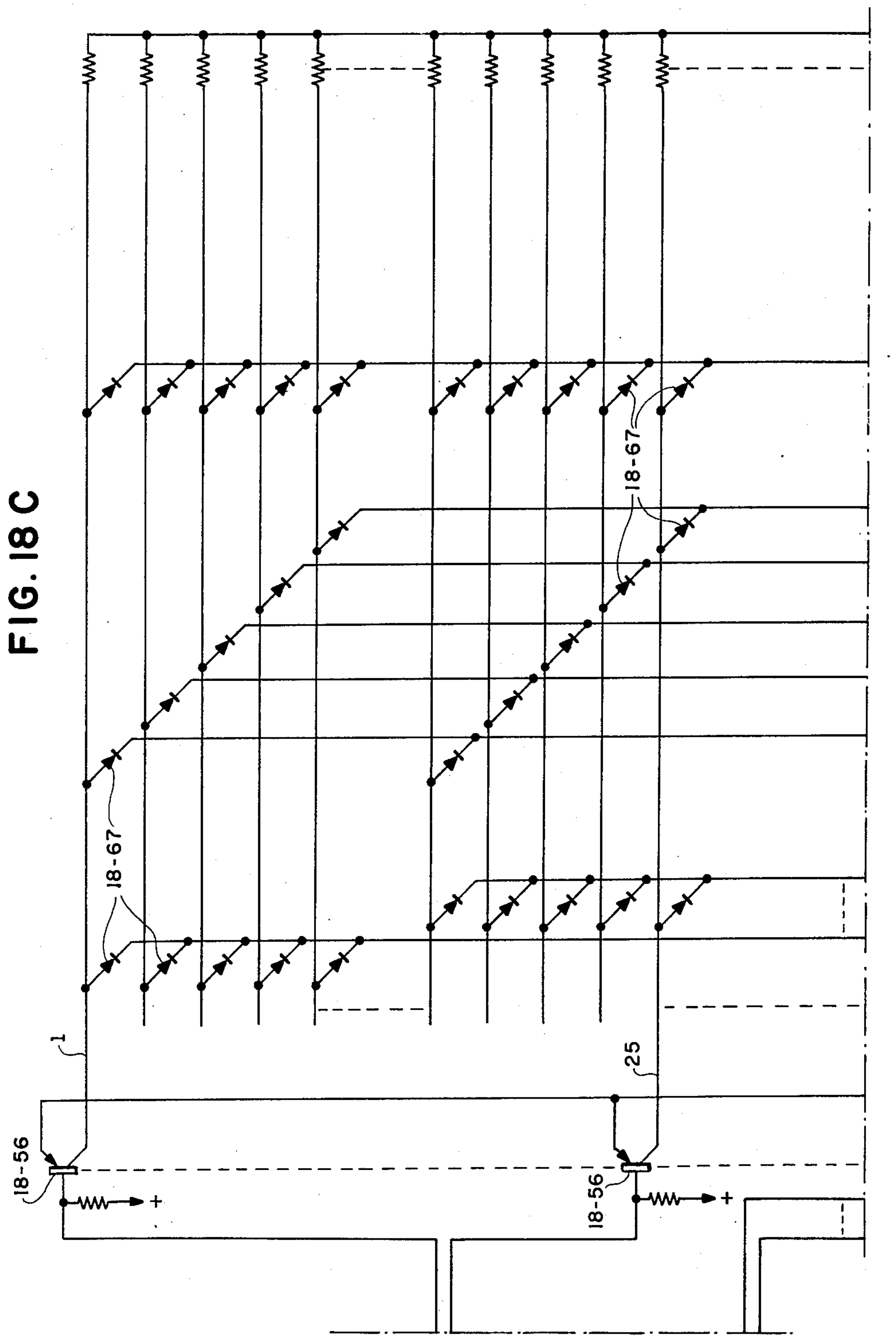
Figure 18D:
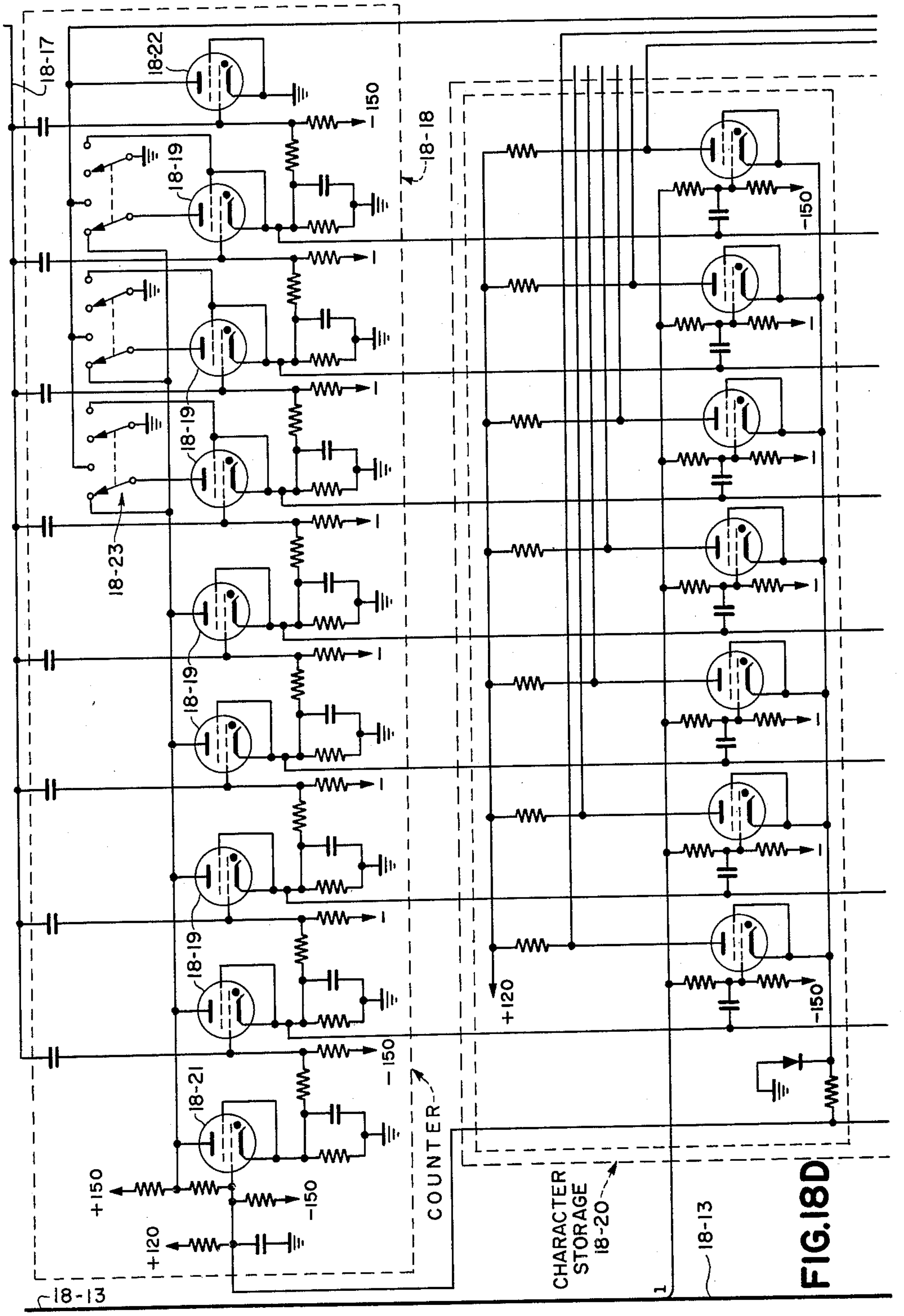
Figure 18E:
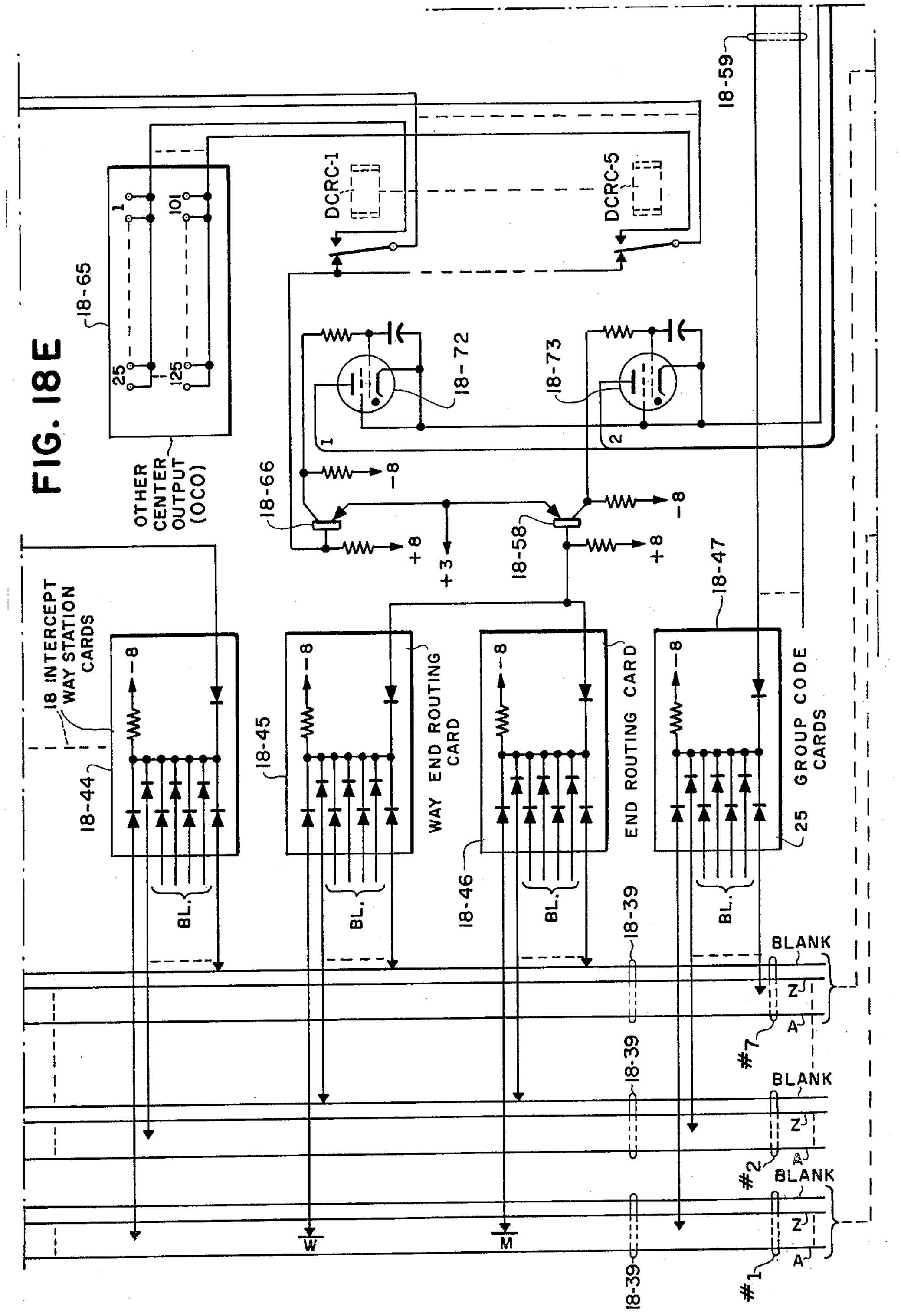
Figure 18F:
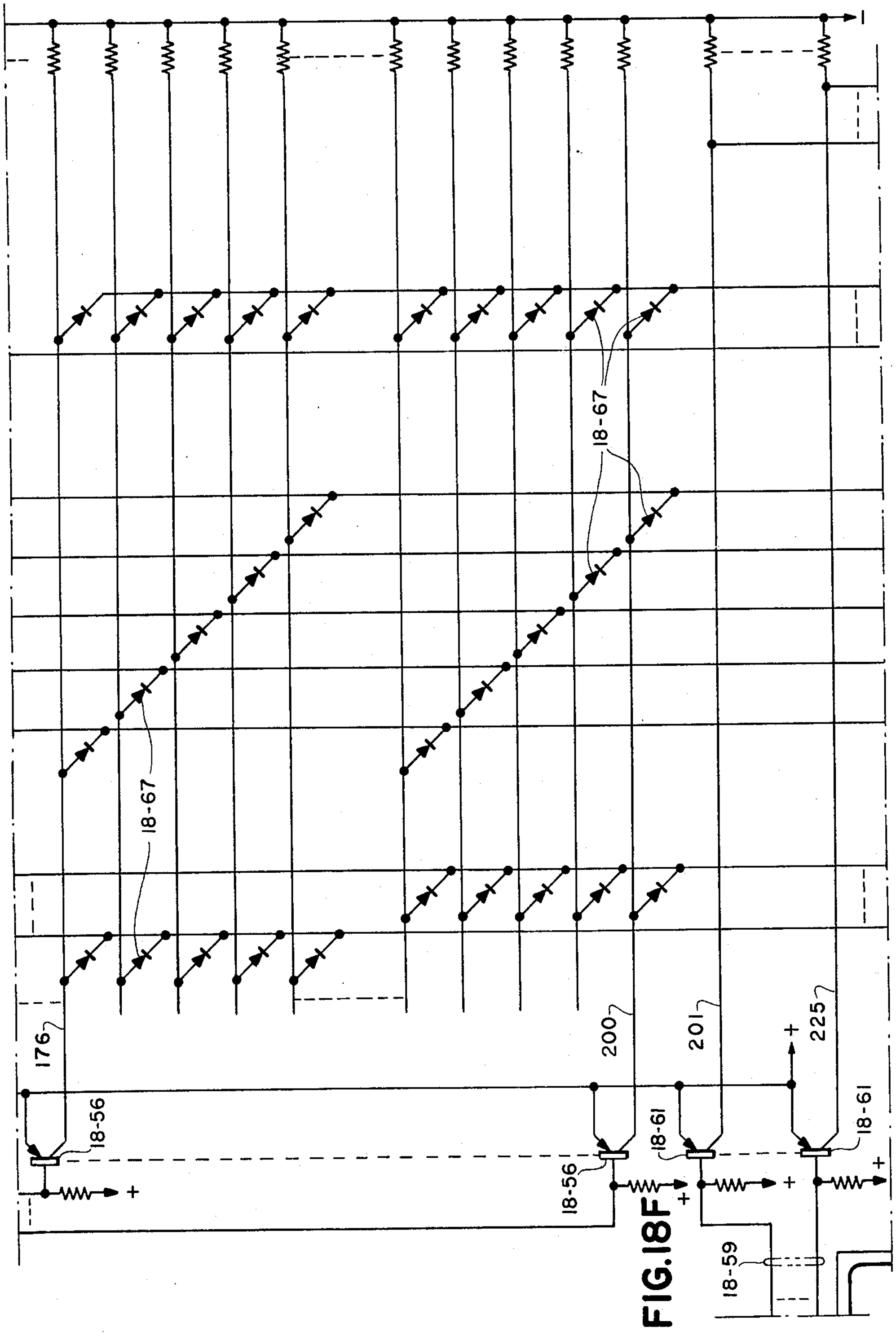
Figure 18G:
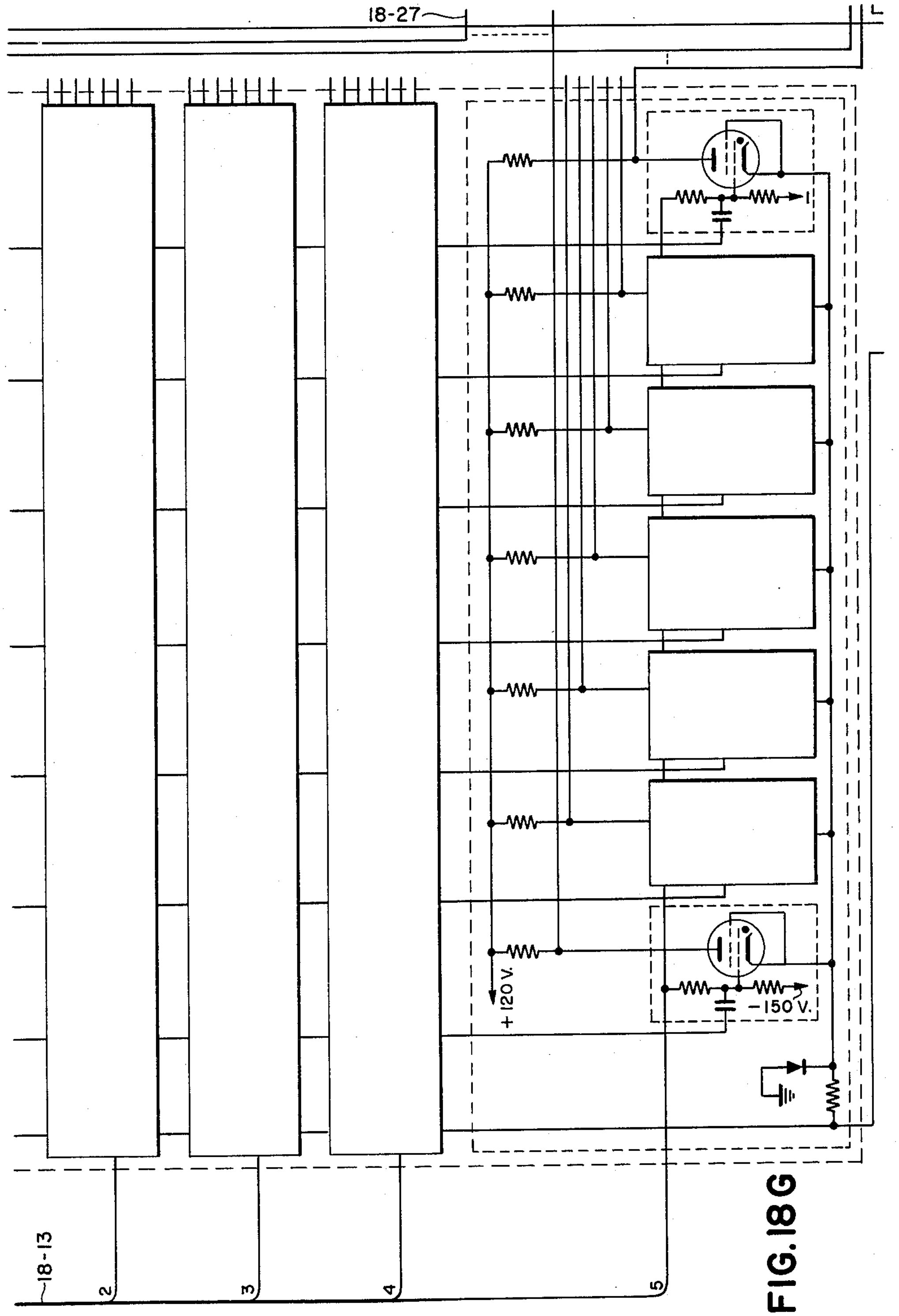
Figure 18I:
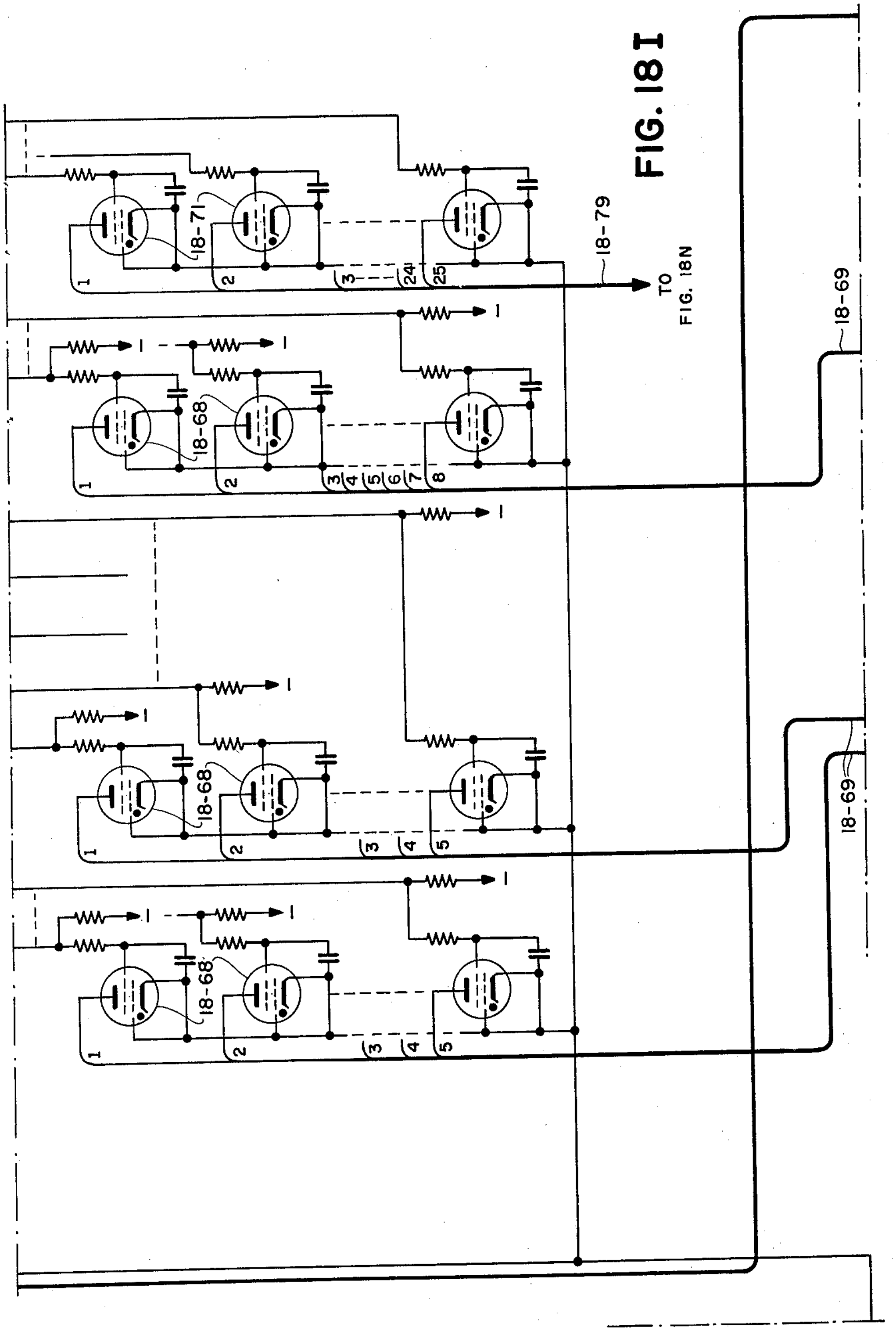

Referring now to FIGS. 18A to 18O, which disclose the reading circuit, the storage register, the ring counter together with a number of other sections of a director, reference will be made in particular to FIGS. 18A, 18D and 18G. The reading circuit receives each of the routing indicator characters in sequence from the tape transmitter and applies them in turn to the storage register. The reading circuit also contains a gating circuit that blocks all control characters from the storage. Circuits completed through front contacts numbered 51 to 55 and associated tongues of an operated DPGCN relay extend to control grids of associated tubes 18–11. The plates of tubes 18–11 extend to the control grids of associated tube 18–12 and outputs thereof are connected over conductors 18–12 and outputs thereof are connected over conductors of cable 18–13 to the inputs of five horizontal rows of thyratrons comprising the storage register.

A pin in the tape transmitter reacting to a mark element in the tape presents a ground input to the control grid of its associated tube such as 18–11. This raises the potential on the grid from negative which normally holds the tube cut off to one that causes it to conduct. When this occurs, its plate voltage drops to approximately ground potential causing the grid circuit of its associated tube 18–12 to drop and thereby cut the associated tube off. When a tube 18–12 is cut off, its full plate voltage of approximately 150 volts is applied over its respective conductor of cable 18–13 to its respective horizontal row of thyratrons in the storage register. A pin reacting to a space element maintains the full negative bias of the grid of its respective tube 18–11 holding it cut off. For this condition, the plate and the grid of the associated tube 18–12 will be at a high positive potential. This causes the tube to conduct and drop the potential at its plate to almost ground which is likewise applied to the respective horizontal row of thyratrons in the storage register.

When the transmitter starts processing the routing indicator the five elements of the first character are applied simultaneously to the grids of the tubes 18–11. As described, the action of tubes 18–11 and 18–12 are such that each marking element produces a positive output which is applied to its respective horizontal row of thyratrons in the character storage. This positive output constitutes a pedestal as applied to a row of thyratrons and conditions the same for firing as will be pointed out. Each spacing element, on the other hand, in the code results in an output to the associated thyratrons at approximately ground potential. Accordingly, the selected horizontal rows of thyratrons are conditional for firing in accordance with the particular character being sensed by the pins of the transmitter and the particular thyratron in each horizontal row that is fired is determined by the ring counter as will be explained.

After the first character of a routing indicator has set up the output conditions of the tubes 18–12, a ground director probe pulse is received through the front contacts and number 50 tongue of the operated DPGCN relay. This ground cuts off the diode 18–14 to drop the bias on the control grid of tube 18–16 to a negative value cutting the tube off. This causes the plate voltage of the tube to rise to a positive value and a positive pulse is thereby applied over a conductor 18–17 to the control grids of the 8 right hand thyratrons of a ring counter 18–18. At the end of the director probe pulse tube 18–16 restores to tis normal condition and the positive pulse produced by this tube triggers the ring counter.

The ring counter 18–18 has 7 thyratrons 18–19, one for each stage thereof, a starter thyratron 18–21 and a thyratron 18–22 adapted to operate when the number of characters in a rounting indicator exceeds the number of stages the ring counter is adapted to accept. The last 3 stages of the counter are equipped with switches such as 18–23 to disconnect the associated tube and those following it from the normal operation of the counter. Such switches determine the maximum number of routing indicator characters that the counter is to accept. With all the switches 18–23 in the positions shown the ring counter is adapted to accept 7 characters for each routing indicator and the number may be decreased to 6, 5, or 4 by operating the switches to their other positions.

If the director is idle the starter thyratron 18–21 is conducting and indicates a zero count. When this tube is conducting it conditions the grid of the next thyratron or the No. 1 stage so that it will fire when a positive pulse is applied thereto over conductor 18–17. When the first tube 18–19 fires it conditions the next so it will fire on the next pulse over conductor 18–17. Each subsequent thyratron of the ring counter is thus prepared by the stage which precedes it. The trigger pulses are applied to the counter every time a character is fed into the reading circuit. As soon as the final tube in the counter circuit fires, the final tube depending upon the condition of the switches 18–23, the counting cycle ends and the starter tube must be fired again before the ring counter can be reactivated. The plates of all the thyratrons in the ring counter receive their positive supply through a common 12K plate load from plus 150 volts.

When the characters are to be removed from the storage unit, relays DCDI and DCDT operate which removes the ground from the grid circuit to tube 18–21 so that a positive pulse is applied thereto. This causes tube 18–21 to fire again, and reset the counter to a zero count ready to accept the first character of the next routing indicator sent into the reading circuit.

*The Ring Counter*

When thyratron 18–21 fires in the manner pointed out it establishes a grid potential on the adjacent thyratron 18–19 of the one constituting the first stage of the counter. This grid potential or pedestal makes the tube susceptible to a positive pulse coming in from the tube 18–16. This pulse comes in with the first character sent into the reading circuit and since the tube of the first stage of the counter is the only one having a pedestal it is the only one that fires. As the first tube 18–19 fires, tube 18-21 cuts off and a pedestal for the subsequent firing of the thyratron of the second stage is established in conjunction with the director probe pulse of the second routing indicator character. In a similar manner, the remaining stages of the counter are fired as other characters of the routing indicator are processed.

Each of the cathodes of the seven thyratrons 18–19 are connected to a respective vertical file of five thyratrons in the five horizontal rows of thyratrons in the character storage unit 18–20. When one of the thyratrons 18-19 fires, it opens each of the tubes in its respective file to the reading circuit. Thus, the seven vertical files are each in turn opened to receive a character from the reading circuit.

When the reading circuit receives the five character elements of a routing indicator, marking conditions set up positive pedestals on respective grids in a vertical file thyratrons in the character storage 18-20 and those associated with spacing elements are kept negative. The vertical files in the character storage unit are conditioned one file at a time and at the end of a counter cycle, the character storage will have all the characters of a routing indicator stored therein. Subsequently relays DCDI and DCDT operate and remove ground from the cathodes of all the thyratrons in the register which prepares it to receive the next routing indicator.

*Control Character Rejection*

Three control characters (space, figure shift, and letter shift) allow the requesting receiving position to perform certain functions while it is being served by the director. Other control characters such as carriage return and line feed serve the page printer at the final destination of the message. The space character separates each of the routing indicators when more than one is present in the routing segment of a message and it stops the transmitter at the requested position to allow the director sufficient time to process one indicator before the following one is applied. In the end-of-routing indicator the figure shift stops the transmitter to permit the final routing indicator to be processed by the director before the end-of-routing is read into storage. The letter shift character stops the transmitter so that the director may process the end-of-routing indicator.

Since the director is not concerned with the control characters they are kept out of the storage register. This is accomplished by a shunting network of diodes 18-26 associated with the reading circuit. This network contains a gating circuit for each of the control characters. When any of the control characters is applied to the director, it is read by the reading circuit but for these characters the positive potential is maintained on the grid of the tube 18–16. Consequently, the director probe ground pulse can not trigger this tube and the ring counter is not advanced thereby preventing the incoming character from being placed in the character storage unit.

When the end of routing indicator which is a character combination of figure shift, M or W, followed by a letters shift is read by the pins of the transmitter into the reading circuit, the figure shift character is shunted to prevent its storage. The transmitter is stopped to permit the director to process the previous routing indicator. As soon as the character storage is cleared out the character M or W is put into the first vertical file of the storage register thyratrons and each of the remaining files register a blank. The following character letter shift is also shunted from storage and stops the transmitter permitting the director to continue processing the end-of-routing character and to disconnect in the normal fashion.

*Reading Routing Characters Out of Storage*

As the characters of a routing indicator are stored in the character storage unit 18–20 they are read out in sequence by address character reading circuits and translated into routing indicator characters. Each of the 5 thyratrons in a vertical file of the storage unit duplicates the marking and spacing conditions of the character that is read from the transmitter pins. Each thyratron is capable of storing either a mark or a space element and its associated reading circuit is provided with 2 output buses. The condition set up on these output buses may represent the 5 elements of any one of the 26 characters of the alphabet plus a blank. Each one of the characters is recognized by an associated diode reading circuit and when a character is recognized its reading circuit sets up an output condition for the corresponding character.

The plate of each thyratron in the character storage unit 18–20 is connected by an individually associated conductor such as 18–27 through a resistor 18–28 to the base of a respective transistor 18–29. The transistors 18–29 are arranged in groups of 5 each, with each such group of 5 transistors associated with a respective vertical file of thyratrons in the storage unit. Each transistor 18–29 which is a PNP type has an associated pair of transistors 18–31 and 18–32 of the NPN type. The collectors of transistors 18–31 are connected to what is termed marking output buses 18–33 and there are 5 buses for each group of 5 transistors 18–29. The collectors of transistors 18–32 of a group are connected to what is termed spacing buses 18–34. Thus for each vertical file of 5 thyratrons in the character storage unit there are 5 marking output buses 18–33 and 5 spacing output buses 18–34.

When a storage register thyratron is non-conducting as conditioned by a spacing element the base of its associated transistor 18–29 is biased so that the transistor can not conduct. With transistor 18–29 cut off the bias established on the base of the associated spacing transistor 18–32 is more negative than the emitter and it is held inoperative. This applies a plus 20 volts to its respective spacing output bus 18–34. At this time the bias on the base of the marking transistor 18–31 is raised to a positive value permitting it to conduct and accordingly a ground is applied to the associated marking output bus 18–33.

A marking condition registered on a character storage thyratron during which the thyratron is conducting drops its plate potential to nearly ground. For this condition the bias on the base of the associated transistor 18–29 is more negative than that on the emitter. The transistor therefore conducts and as a result the bias on the base of the associated spacing transistor 18–32 is sufficient to force the transistor into conduction. The collector of the spacing transistor 18–32 approaches ground which is applied to its space output bus 18–34 and through the voltage divider that controls the bias on the associated marking transistor 18–31. Thus the marking transistor 18–31 can not conduct and its collector puts a plus 30 volt output on its associated marking output bus 18–33.

Accordingly the marking and spacing output buses 18–33 and 18–34 respectively have either a ground or plus 20 volt output applied thereto in a combination representative of the character stored in its respective vertical file of thyratrons in the character storage unit.

Associated with each of the seven sets of ten output buses, five marking 18–33 and five spacing 18–34, are a number of character reading circuits 18–36. There may be as many as twenty-seven of these character reading circuits 18–36 associated with each set of ten output buses, one for each character of the alphabet and a blank. The character reading circuits, 18–36, each include a set of five diodes 18–37 and a transistor 18–38. The cathodes of the diodes 18–38 are individually connected to the marking and spacing output buses 18–33 and 18–34, and the anodes are connected to the base of the associated transistor 18–38. The diodes 18–37 are connected in such a manner to the output buses that when the respective character appears on the associated marking and spacing buses that the diodes will not conduct. Accordingly, the base of the transistor 18–38 will for this condition be at a potential more positive than its emitter and the transistor will be held nonconducting. With the transistor nonconducting the −8 volt collector bias is applied to its respective one of the twenty-seven output character leads 18–39.

There are as many as twenty-seven leads 18–39 in a character output group and only one of the leads at a time is adapted to have the −8 volt potential applied thereto. When one character reading circuit is applying a —8 volt bias to its respective conductor, at least one or more of the diodes in the reading circuits for each of the remaining character reading circuits are conducting. This drops the base bias of the associated transistors whereupon they conduct and the +8 volt emitter bias is applied to their character buses.

There is a group of twenty-seven character output buses 18–39, for each of the seven characters or each of the seven vertical files of thyratrons in the character storage 18–20. A conductor in each of the groups of character buses will have a —8 volt condition applied thereto as the various characters of the routing indicator are read into storage. If a routing indicator in storage contains less than seven characters, the vertical files of thyratrons which are empty causes a —8 volt output to be applied to the respective blank character bus. When reading the end of routing indicator, the letter M or W is read out of storage onto the M or W bus of the first set of character buses 18–39 and each of the remaining sets of character buses registers a blank.

*Translating Routing Indicators Into Switching Codes*

For the purpose of translating routing indicators into switching codes, address control circuits are employed which contain a group of code cards, each of which is connected by means of its associated plug-in card to a particular set of character buses in such a manner that each coding card recognizes a specific routing indicator. Each recognized routing indicator initiates the production of a switching code by activating a respective switching code transistor. Each director is supplied with a number of identical coding cards and in the system as described herein there may be as many as 575 of these cards. As indicated in FIGS. 18B and 18E, one of these cards 18–41 is a supervisory coding card. 499 of the cards such as 18–42 are address coding cards, 30 of the cards 18–43 are intercept way circuit coding cards, 18 of the cards 18–44 are intercept way station coding cards, a single card 18–45 is a way end routing coding card, a single card 18–46 is an end routing coding card and 25 cards such as 18–47 are group coding cards. Each of the coding cards 18–41 to 18–47 contains a set of 8 diodes, 7 input diodes 18–48 and 1 output diode 18–49. In the preferred embodiment of the invention the coding cards are arranged on printed circuit plug-in arrangements whereby the various input diodes 18–48 thereof are connected with one character conductor of each of the 7 character bus groups 18–39. For example, the supervisor coding card 18–41 is so arranged that when it is plugged in to the address character group buses that the anode of one diode 18–48 is connected with the 8 conductors of the first or No. 1 address character group bus, another to the U conductor of the second character group and the third, fourth, fifth, sixth and seventh to the P. V. R, blank and blank character conductors of the third, fourth, fifth, sixth and seventh groups respectively. The cathodes of the input diodes 18–48 of a card are connected to the anode of the output diode 18–49 and to an 8 volt negative potential. The cathode of the output diode 18–49 is connected to an output lead 18–51. Accordingly with the above arrangement there will be an output on the output conductor 18–51 when a routing indicator is stored having the characters S, U, P, V, R, blank, and blank. In a similar manner any one of the other coding cards at a time will have an output on its respective output conductor when its respective routing indicator is stored.

The output conductor 18–51 on the supervisory coding card 18–41 terminates in a pair of jacks of a so-called address code patch board 18—52 or ACD and each of the outputs of the address coding cards similarly terminates in jack pairs in this patch board. The outputs of the thirty intercepting way circuit coding cards 18–43 and the eighteen intercept way station coding cards 18–44 are connected to jack pairs in the address routing patch board 18–53 or AR and also extend to the bases of associated switching code transistors 18–56. Patch board 18–53 has some 200 jack pairs and the others are patched to the ACD board and each of the 200 jack pairs has a respective switching code transistor 18–56. The outputs of coding cards 18–45 and 18–46 are joined together and applied to the base of transistor 18–58. The outputs of the 25 group code coding cards 18–47 are applied over conductors 18–59 to the bases of respective transistors 18–61. Each of the 200 switching code transistors 18–56 assigned to the 200 jack pairs of board 18–53 represents one of the possible 200 destinations to which a message may be sent. Patching between the board 18–52 and the other center input board 18–64, or OCI and the other center output board OCO, allows control of routing indicators for messages received from other centers that may have been acted upon at other centers. Accordingly, such messages are not processed by the local equipment and at such times when one of these routing indicators is recognized as one that should not be processed locally transistor 18–66 is activated to produce a no-code indication as will be explained.

Associated with each one of these 200 switching code transistors 18–56 are 3 individual diodes such as 18–67. Each set of 3 diodes 18–67 when conducting sets up a definite pattern in a group of switching code thyratrons that eventually causes a switching code for the destination specified by the routing indicator to be sent to the requesting receiving position. This switching code prepares the receiving position so that it will be connected to the sending position that serves the destination represented by the routing indicator.

The switching code thyratrons 18–68 are arranged in 3 vertical files. There are 5 thyratrons in the first or left hand vertical file, 5 in the center file and 8 in the right hand vertical file. The 3 vertical files of thyratrons are controlled by the first, second and third diodes respectively associated with the switching code transistors 18–56. Whenever one of these transistors is caused to conduct it biases one and only one thyratron in each of the files of thyratrons 18–68 so that it may be fired. With such an arrangement the switching code thyratrons 18–68 under the control of diodes 18–67 can produce a total of 200 output configurations, one for each of 200 destinations.

The plates of thyratrons 18–68 are connected by conductors of cables 18–69 to the coils of respective relays DCDA1 through 5, DCDB1 through 5 and DCDC1 through 8 respectively. The output conductors 18–59 of the 25 code group coding cards which control associated transistors 18–61 have the collectors thereof connected directly to control grids of respective thyratrons 18–71. Thyratron 18–72 is under the direct control of transistor 18–66 and supplies the no-code indication while transistor 18–73 with its associated transistor 18–58 produces the end-of-routing and way-end-of-routing indication.

*Other Center Routing*

As explained, the routing segment in every message contains a routing indicator for each destination that the message is to reach. Some of these destinations may be served directly through another center and some may require processing through several other centers. Also the center associated with the originating station will serve the destinations local thereto. Each receiving center receives the message with the complete routing indicator and each must determine the rounting indicators which it should process and which of them it should ignore as having been already processed by another center in the system. The indicators which need local processing require that an address code produced in the director be sent to the requesting receiving position. Routing indicators that are not to be processed locally require that a no-code indication be sent by the director to the requesting receiving position. A no-code indication notifies the receiving position that it will receive no switching code for this routing indicator and that it should proceed with the next item of information in the tape.

In the arrangement disclosed each director at a switching center contains five director center routing control relays DCRC1 to 5. Each of these relays is controlled by center routing information from the requesting receiving position connected to the director. Each DCRC relay has an associated director center routing test relay DCRT and its condition is always opposite to that of its associated DCRC relay. These relays function according to the patching arrangement set up on the other center input patch board 18–64 and the other center output board 18–15 and distinguish which of the routing indicators require a legitimate switching code and which require a no-code indication.

Each of the five horizontal rows of twenty-five jack pairs in the patch board 18–64 is connected to a tongue of a respective DCRC relay, the make contact of which is connected to a respective horizontal row of jack pairs in the patch board 18–65. Each pair of jacks in the patch board 18–65 is patched to a pair of jacks in the patch board 18–53, the latter as explained, extending to respective ones of the switching code transistors 18–56. The output from every coding card that reads a routing indicator specifying a destination served by another center is patched from the patch board 18–52 to the appropriate jack pair on the board 18–64. The horizontal row of the board 18–64 to which this patch is made depends upon which of the other centers serves the destination.

*Director Center Routing Check*

The back contacts of the DCRC relays associated with the tongues connected to the patch board 18–64 are all connected to the base of transistor 18–66 which in turn controls the no-code thyratron 18–72. When this thyratron is fired a no-code indication is produced that indicates that the destination represented by the routing indicator being read is not to be included in the pattern of selected destinations. Any routing indicator read from the patch board 18–64 to the tongue of a DCRC relay may be directed to the address routing patch board 18–53 via the patch board 18–65 to produce a legitimate switching code or to the base of transistor 18–66 to produce a no-code indication. The alternate paths are determined by the condition of a DCRC relay and they are in turn governed by center routing information for the requesting receiving position to which the director is connected. As long as a DCRC relay is released a no-code indication is produced for every routing indicator whose coding card is patched to the patch board 18–64 associated with that DCRC relay. When operated, a DCRC relay with output from the selected coding card is applied to the address routing board 18–53 to cause an appropriate switching code to be sent to the requesting receiving position.

The center routing information from a requesting receiving position determines the pattern of DCRC relays which will operate when connection to a director is established. The associated DCRT relay for each released DCRC relay is always operated when the director is called in. Should a DCRC relay be operated, its associated DCRT relay is released. The operating ground for the DCRC relays is applied to the director over leads termed center routing control leads 1 to 5 through front contacts and tongues of the operated DPGCN relays and conductors 18–74 to the coils of the DCRC relays. The DCRT relays are operated by grounds applied to center routing test leads 1 to 5, front contacts and tongues numbered 45 to 49 of the operated DPGCN relay and conductors 18–76 to the coils of the DCRT relays. The conditions of the DCRC and DCRT relays determine the operate path for the DCDI relay, which in turn applies the cathode ground for the switching code thyratrons. The operate path for the DCDI relay includes back contacts of relays DCDT and DCDR through either a back and front contact or a front and back contact of each pair of DCRC DCRT relay pairs and the number 38 tongue and front contact of the operated DPGCN relay to the code initiate lead. This provides a check on the operation of the DCRC relays and when a pattern of DCRC relays is operated the complementary pattern of DCRT relays must operate to produce a switching code. If the complementary pattern of DCRT relays does not operate an alarm is activated.

When the grids of the selected switching code thyratrons 18–68, one in each of the 3 vertical files, or thyratrons 18–72 and 18–73, are positive biased, the cathodes must be grounded before the tube can fire and operate the associated switching code relays. The plate of every switching code thyratron receives its positive supply through the winding of its switching code relay DCDA, DCDB and DCDC. The cathodes of these thyratrons are held at either plus 120 volts or ground depending upon the condition of relay DCDI. Once the grids of the selected thyratrons are positive biased and the cathodes grounded the tubes can conduct. The cathodes of these thyratrons are held at 120 volts as long as relay DCDI is released. After routing indicator characters are put in storage and the control character (space, letter shift or figure shift) is read at the receiving position, transmission is stopped and ground is sent over the code initiate lead to operate relay DCDI. As relay DCDI operates, it applies ground to the cathodes of all the switching code thyratrons and the selected ones conduct. The conducting thyratrons apply ground to their associated switching code relays which operate and lock up by a circuit through released DCDR relay and released relay DR to ground. The conducting thyratrons are extinguished as the locking grounds are applied to their plates.

When one of the group code routing cards is activated, the corresponding thyratron 18–71 fires. The plates of thyratrons 18–71 are connected by conductors of cable 18–79 to respective coils of relays TGCD1 to 25. These relays operate and lock up and when operated complete a circuit over conductor 18–81 for the operation of relay DGCD. If more than one TGCD relay operates at a time a circuit is completed over conductor 18–82 for the operation of relay DCDF which sets up an alarm condition.

*Code Testing*

As soon as the 3 selected coding relays the activated TGCG, the DGCD, the DNCD relay or the DECD relay is operated and locked through its own contacts, the director code test relay DCDT is operated. The latter relay operates only when the switching code relays are functioning properly. Otherwise its operate path is not complete. Once operated relay DCDT releases relay DCDI thereby removing ground from the cathodes of the switching code thyratrons to prepare them for the next routing indicator. The relays associated with the selecting thyratrons remain locked up. Relay DCDT is operated while relay DCDI operates and for a short period of time ground is removed from the cathodes of all the storage register thyratrons to reset it for reception of the next routing indicator. At the same time, the removal of this ground causes the zero count tube of the ring counter to fire and reset the ring counter. In the normal sequence of producing a switching code only one relay in each of the 3 sets of code relays DCDA, DCDB and DCDC must be operated or one of the 25 TGCD relays must be operated before relay DCDT can operate. For a no-code or an end-code indication only relay DNCD or DECD can be operated for relay DCDT to operate. If any one of these 4 conditions are not met relay DCDF is operated to activate an alarm condition at the director and at the requesting receiving position.

When the switching codes have been received and processed at the requesting receiving position a ground is sent over the code release line through the front contact and number 39 tongue of the operating DPGCN relay, conductor 18–83 to operate the director code release relay DCDR. The operation of this relay breaks the locking path for the operated switching code relays to release them and they in turn release relay DCDT. At this time the code circuits are prepared to receive the next routing indicator read from the character buses by the coding cards.

*Sending Switching Code to Receiving Position*

Each of the DPGCN relays, contacts 1 through 36 carry address routing switching code information. The first thirty-three of these tongues are assigned to switching codes while tongues 34, 35 and 36 are assigned to no-code, group-code and end-of-routing information respectively. The switching code consists of two grounds, one of which is sent over one of the first twenty-five tongues and a second ground sent over one of the tongues numbered 26 to 33. These groups are termed the A and B groups, respectively. The ground for the A group is produced through the operation of a DCDA relay and a DCDB relay. By operating these relays in various combinations, a circuit may be completed therethrough to any one of the twenty-five switching code leads. The B code lead has a ground applied thereto by the operation of any one of the eight DCDC relays. The combined outputs of the twenty-five A leads and the eight B leads allows two hundred possible switching codes with each representing a particular destination.

The ground for the switching codes originates at the tongue and back contact of relay DRRI, continues through a back contact of relay DCDI, conductor 18–84, the front contact of relay DCDT, the operated DCDA, DCDB and DCDC relays to a pair of switching code leads passing through tongues numbered 1 to 33 of the operated DPGCN relay. The switching code at the receiving position enables it to connect to the desired sending position. In a similar manner relays DNCD, DECD and DGCD apply ground to leads through contacts 34, 35 and 36 of the operated DPGCN relay to the no-code, end-code and group code leads, respectively.

*Connecting to a Multiple Position*

The routing segment of an incoming message read into the connected director may include one or more code group indicators or three or more separate routing indicators or any combination of these indicators. Each line or way receiving position is equipped to handle two switching codes, each for single destinations, and any message routed for more than two addresses is sent to a multiple address or MX position. When one of the twenty-five code group coding cards 18–47 reads its code group routing indicator, the appropriate TGCD relay operates and causes relay DGCD to operate. As the latter relay is operated, ground is sent over the group code lead to inform the receiving position that its message should be sent to the MX position for processing. Once this occurs, the director is disconnected and reset so that it is available for subsequent calls and an allotter reestablishes the final connection between the two positions.

When the MX position is ready to process the routing segment of the message, it is connected to the available director. The requesting MX position then sends the routing information to the director. If the routing information contains a group code indicator, a group code control circuit is activated which enables the director to cause the appropriate operation of MRB relays.

Figure 18J:
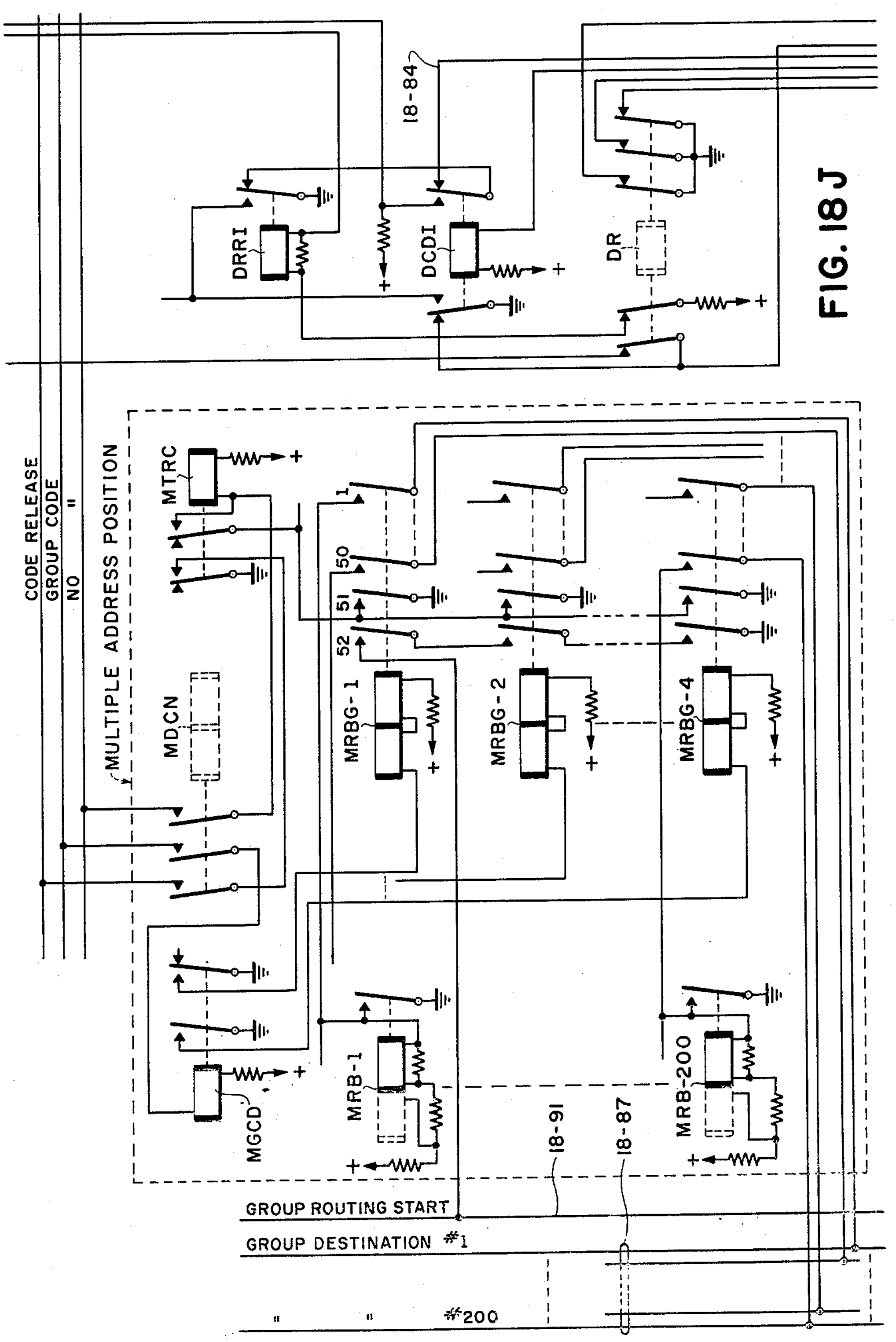
Figure 18K:
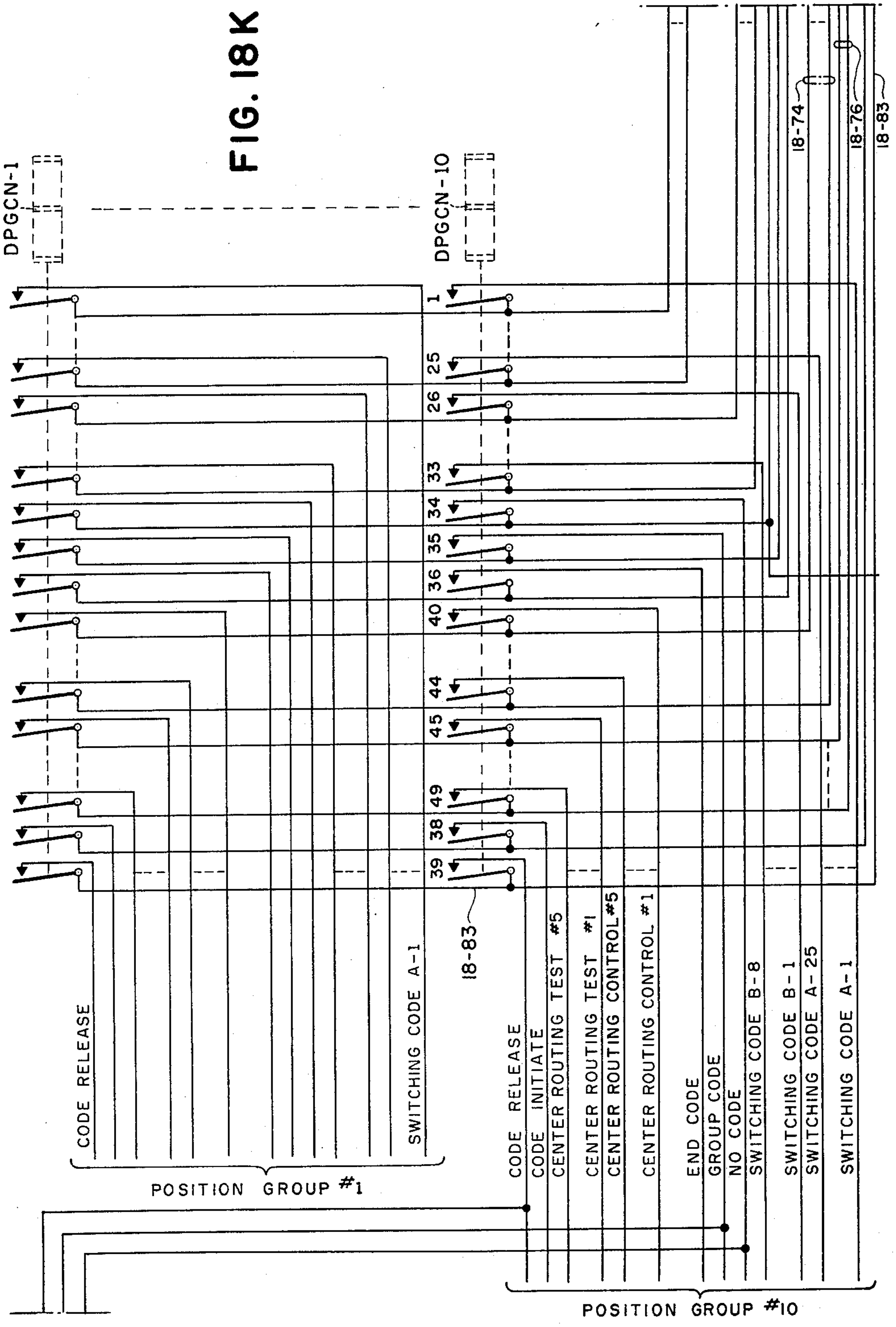
Figure 18L:
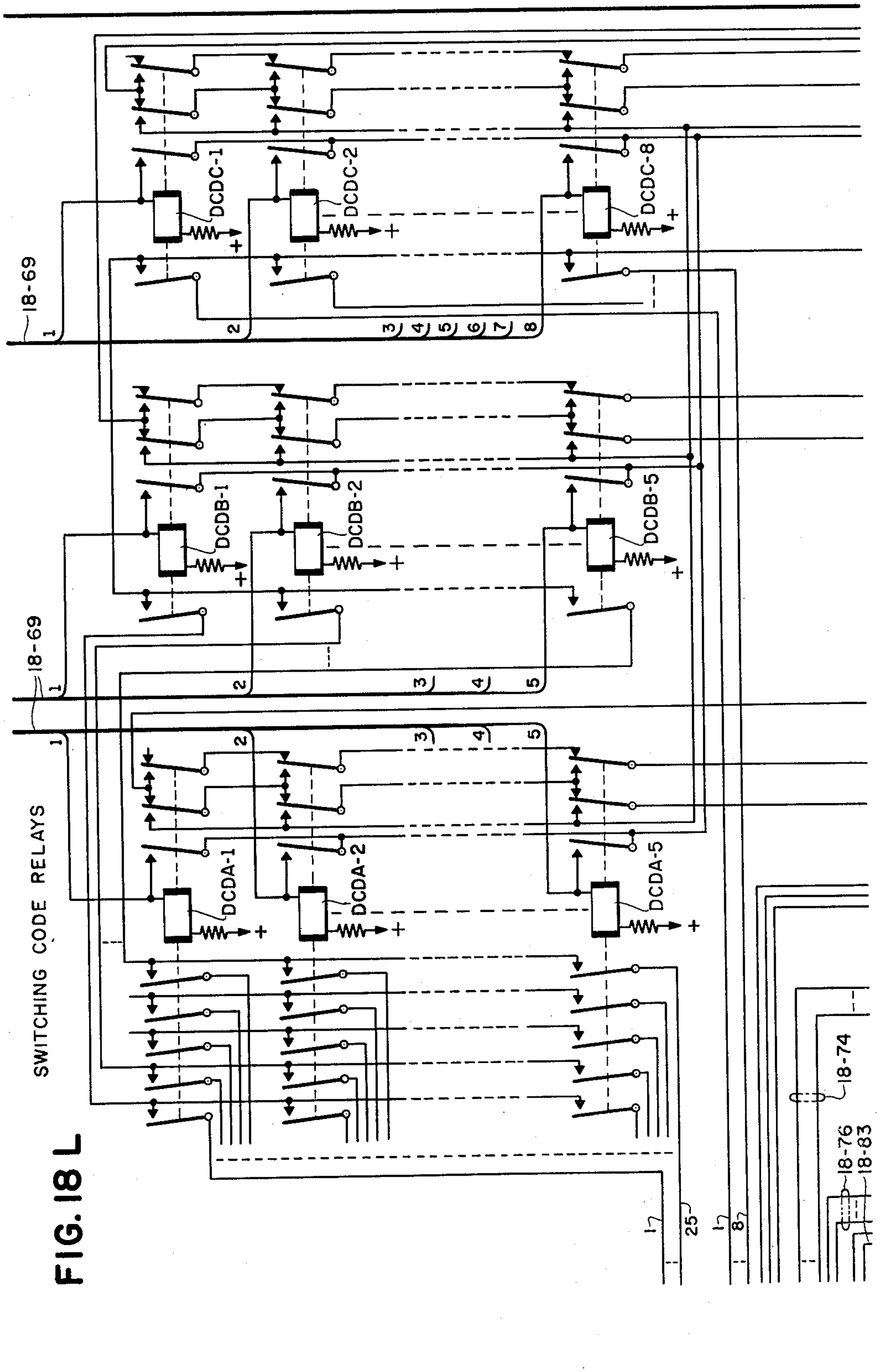
Figure 18M:
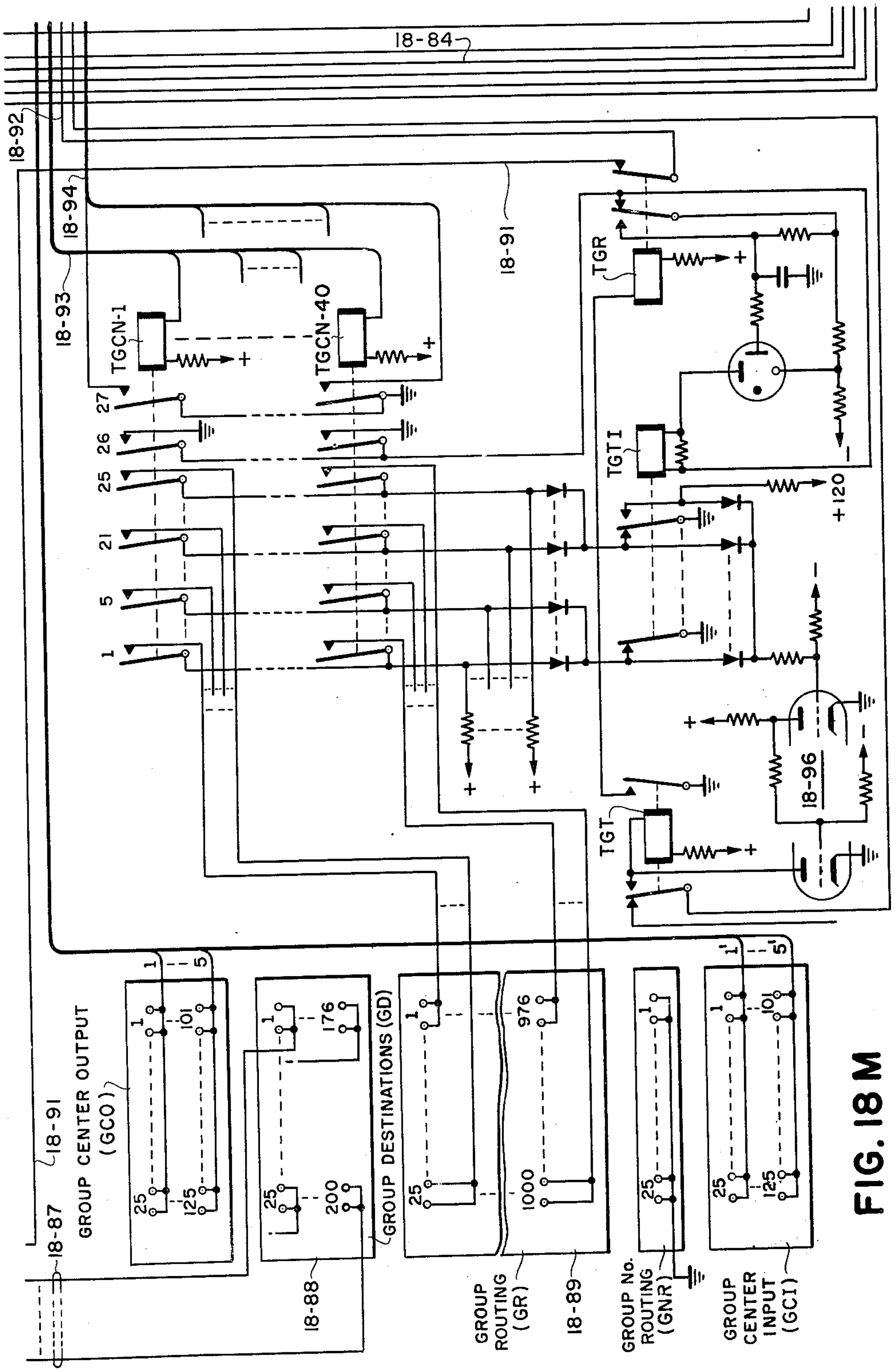

At each multiple address position, each of the 200 possible destinations that a message may be switched to is represented by an MRB relay, FIG. 18J. Associated with each group of 50 MRB relays is one of 4 MRBG relays. The coil of each MRB relay is connectable through its respective MRBG relay to its respective group destination lead, such as 18–87 and to its respective jack pair on the group destination board GD or 18–88. In order for any of the MRB relays to be operated because of a group routing indicator read in the director its associated MRBG relay must be operated.

The output of the group code control circuits is applied to the group routing board GR or 18–89 and the jacks of this board are patched to those of the GD board 18–88. Any group code that is read by the director circuits sets up certain conditions at the GR board jacks which, through the patching to the GD board, eventually operates the appropriate MRB relays. The patching between the GR and GD boards is arranged so that each group code routing indicator operates its associated predetermined pattern of MRB relays.

Once one of the TGCD relays is operated, in the manner set forth and the director group code relay DGCD operates, ground is applied to operate the MX group code relay MGCD over a circuit including the group code lead and front contacts of relay MDCN. Relay MGCD operates relays MRBG which extends the operate circuit of each MRB relay to its associated jack on the GD board. Although all the MRB relays are now connected to the GD board, only those which receive a ground via the patching from the GR board will operate. Which of the jacks on the GR board supplies this ground depends upon the group code being processed by the group code control circuits.

Figure 18N:
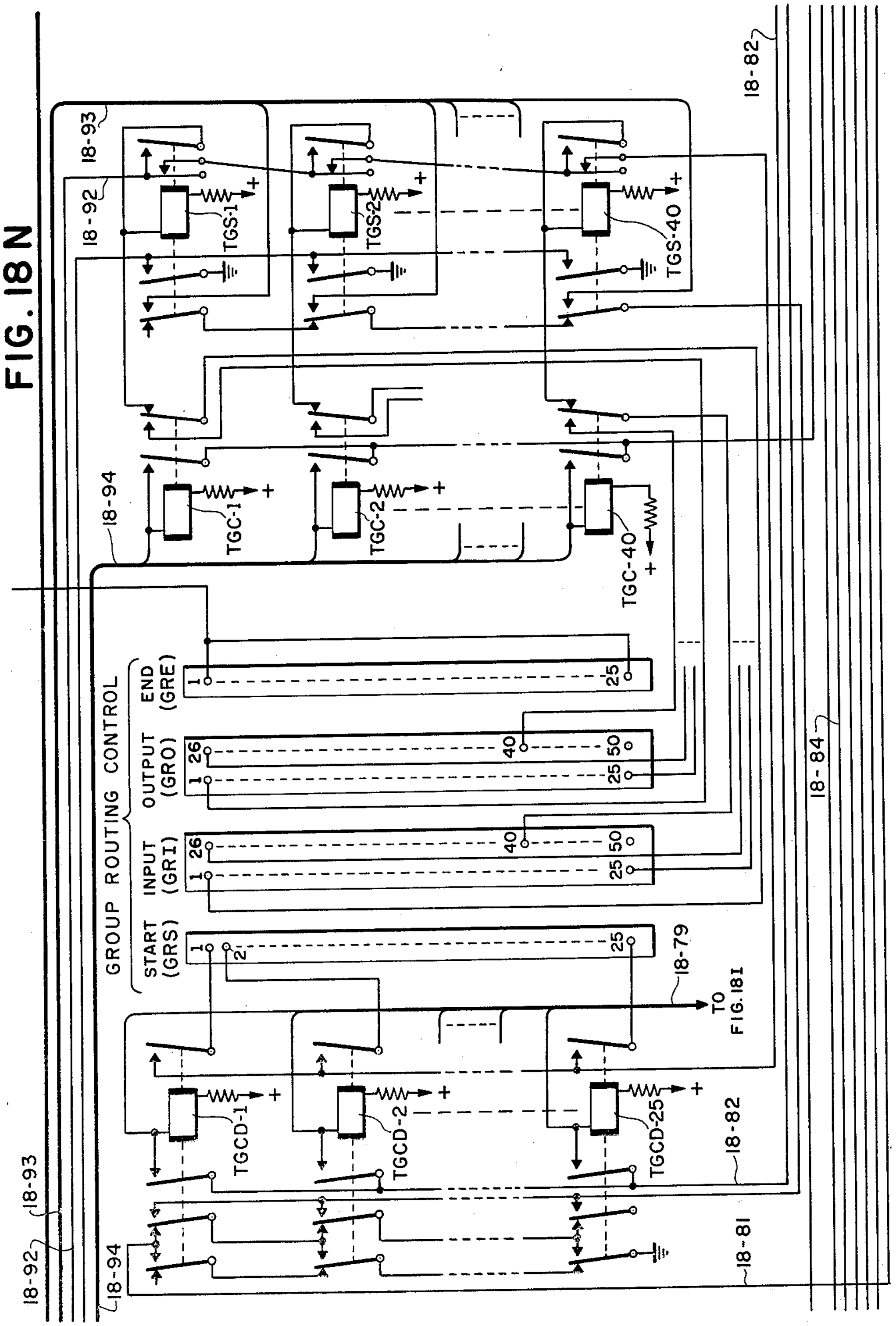

Each of the TGCD relays has a tongue wired to an associated jack on the group routing start board GRS, FIG. 18N. These jacks are patched to any one of 40 jacks on the group routing input board GRI. Associated with each of these 40 GRI jacks is an associated translator group control relay TGC, a translator group select relay TGS, a translator group connect relay TGCN and a group routing output jack of the group routing output board GRO. Although there are 25 possible code groups in the arrangement disclosed, the use of the specified components in groups of 40 establishes 40 different basic patterns, each comprising a maximum of 25 destinations. One group code indicator can be used to activate any fixed combination of these 40 basic patterns. If a group routing indicator is used to activate only one of these 40 basic patterns its associated output jack on the GRO board is patched to its corresponding jack on the group routing control board GRE. If a group code routing indicator is required to activate more than one basic pattern its associated jack on the GRO board is patched back to a jack on the GRI board, the jack on the GRI board being determined by which additional basic pattern is desired. After the last basic pattern has been selected by such patches the final GRO jack is patched to a jack of the GRE board. Thus it is possible for one group code indicator to attain any pattern of destinations including the total 200.

At the time the 4 MRBG relays operate a ground is applied through these relays in the group routing start line 18–91. This ground extends through back contacts of relay TGR a conductor 18–92 closed contacts of the 40 TGS relays, the operated one of the TGCD relays to the respective jack on the GRS board. This starts the operation of the group code control circuits.

The group routing start ground applied from the GRS jack and the back contacts of the associated TGC relay operates the associated TGS relay. When operated relay TGS locks up to the group routing start ground, and it applies a ground from the unoperated DR relay through unoperated ones of the TGS relay and over a conductor of cable 18–93 to operate the associated TGCN relay. The TGCN relay that is operated controls the MRB relays that serve the destinations requested by the group code indicator. As soon as a TGCN relay operates, an operate path is supplied to all the MRB relays that are connected via the patches between the GR and the GD boards to the contacts of the TGCN relay. Each of the appropriate MRB relays is operated by grounds from the back contacts of relay TGTI. At the same time that an operated TGCN relay provides the operate paths for the appropriate MRB relays, it also operates the associated translator group control relay TGC via a conductor of cable 18–94 and triggers the RC circuit of the timer tube that initiates the group code testing action. Relay TGTI and its associated tube together with relay TGT check that all the selecting MRB relays are locked up before the translator group release relay TGR is operated to initiate the release of the group code control circuits.

When relay TGCN operates, it applies a ground through back contacts of relay TGR to relay TGTI and an associated timing tube adapted to fire after 66 milliseconds and operate relay TGTI. The timing interval allows the selected MRB relays to lock up before relay TGTI breaks the operate circuit therefor. If the MRB relays have locked up when relay TGTI operates, the ground through the inner lefthand tongue of relay TGTI causes the normally conducting righthand section of tube 18–96 to cut off. Thereupon the lefthand section conducts, causing relay TGT to operate which locks up over a circuit including contacts of the operated TGS relay. Relay TGT in operating causes relay TGR to operate.

If any one or more of the selected MRB relays have not locked up when relay TGTI operates, the absence of its locking ground permits the 120 volt positive potential at the anode of its associated diode to pole the diode into conduction. Accordingly, the normal positive bias is maintained on the righthand section of tube 18–96 and the lefthand section thereof will not conduct. Thus relay TGT will not operate to initiate the release of the group code control circuits.

Any of the jacks of the GR board associated with a TGCN relay that are not patched through the GD board to an MRB relay must be patched to one of the jacks of the group no-routing board GNR whereby the local ground for the testing circuit is supplied.

*Other Center Routing*

The director must be able to distinguish between those of the destinations requested by a multiple address routing indicator which are to be locally processed and those which have been processed at a previous center. Any MRB relay representing a destination that has been served by a previous center must not be operated when the TGCN relay provides an operate path to each of the MRB relays it controls. The patching pattern between the group center output board GCO and the destination board GD and that between the routing board GR and the group center input board GCI determines whether or not an MRB relay is to operate. An MRB relay that is not to operate is patched from its corresponding jack in the GD board to the appropriate jack in the GCO board and from its appropriate jack in the GR board to the appropriate jack in the GCI board. This patching pattern places a DCRT relay in the operating path of the MRB relay. Whether or not the MRB relay will be energized depends upon the condition of the DCRT relay.

When the requesting receiving position is connected to the MX position, each of five relays at the MX position duplicates the center routing information from the calling position. After the MX position has connected to the available director, these relays determine the condition of the five DCRC relays in the director which in turn set up the condition of their associated DCRT relays. For any DCRT relay that remains unoperated, a direct path is provided through the patches to operate the appropriate MRB relay. When a DCRT relay is operated, it opens the operate path for the MRB relay which represents a destination served through a previous center and the DCRT relay supplies locking ground for the testing circuit.

*End of Group Code Recordings*

The appropriate TCG relay which is activated when the selected MRB relays and the timer circuit for relay TGTI were energized, locks up to ground over a circuit including back contacts of relays DCDR and DR. When the appropriate TGC relay operates, it removes the group routing start ground from the operating circuit of the appropriate TGS relay and effects the connection between the corresponding jacks in the GRI and GRO boards. As explained, relay TGT operates when the testing circuit finds that all the selected MRB relays have locked up within the allotted time and it, in turn, operates relay TGR. When relay TGR operates, it removes the group routing start ground from the operated TGS relay which releases. When relay TGS releases it removes the locking ground from relay TGT which remains operated through the conducting left hand section of tube 18–96, and it removes the holding ground from the associated TGCN relay so that it may release.

When relay TCGN is released:

(1) The operate ground for the selected TGC relay is removed, however, it remains operated by a circuit through relays DCDR and DR;

(2) The selected MRB relays which are now locked by their individual locking grounds, no longer connect via the patch boards to the director; and (3) The ground which holds relay TGTI operated is removed and the timer tube extinguished.

As relay TGTI releases, the +120 volts at the contacts of the inner left hand tongue of this relay poles the associated diode into conduction and, through the diodes connected to the other tongues of relay TGTI, causes a positive bias to be present on the grid of the right hand section of tube 18–96 so that this section conducts and the left hand section cuts off.

The release of relay TGR, permits the group routing start ground to find a complete path through the end-routing circuits and over the no-code lead to operate relay MTRC at the requesting MX position. When this relay operates, it sends ground through the front contacts of relay MDCM over the code release lead and front contacts of the operated DPGCN relay to operate relay DCDR. When the latter relay operates, it removes the holding ground from the operated TGC relay, which releases and it removes the locking ground from the operated TGCD which also releases. When the latter relay releases relay MGCD releases which in turn releases the four MRBG relays. The group routing start ground is removed as soon as the four MRBG relays are released. When the MTRC relay is operated, the tape transmitter at the requesting MX position is restarted and the next routing indicator can now be sent into the director.

*Releasing Director*

After all the routing indicators in the routing segment of the message have been processed the end-of-routing code card reads the end-of-routing characters to cause firing of thyratron 18–73. This thyratron when firing operates the end-code relay DECD which sends a ground over the end-code lead back to the requesting receiving position to initiate disconnection thereof from the director. The DI relay such as relay LDI at the requesting receiving position No. 1 is released and sends ground through tongues No. 57 of the operated DCN and DPGCN relays and back contacts of relay DFB to operate the director release control relay DRC. When relay DRC operates it in turn operates relay DR which opens the operate path of the DS relay at the requesting receiving position. At this time all the relays which received their locking grounds through the unoperated DR relay are released. As the DS relay releases relay DGRC is operated which in turn operates relay DGR. The latter relay removes the locking ground from the operated DPGCN relay which releases and disconnects the requesting receiving position from the director. Relay DRC remains operated until all the relays which supply its locking grounds are released and relay DR is not released until relay DRC releases. When relays DRC and DR are released the director is conditioned for the next call.

*Trouble Condition Release*

For certain trouble conditions the director may be automatically disconnected from the requesting position by the operation of relays DRRI, DCDF, DFRI, in conjunction with the consecutive failure circuit of relay DFB. The circuit arrangements for this function are disclosed in FIGS. 19A and 19B and each of these relays operates in response to a particular trouble condition. When any one is operated a ground is applied to the code failure lead to inform the requesting position that the director was not able to give normal routing instructions. A ground appearing on the code failure lead causes the position to disconnect itself from the director in the normal disconnect sequence. Once it is disconnected the director may go through its normal release and reset cycle so that it is available for other calls or it may be left in an alarm condition requiring the services of an attendant. Which one of the two conditions the director is left in depends upon whether or not the relay responding to the trouble operates relay DFB in the director. The operation of relay DFB opens the operate path of relay DRC to prevent normal release and resetting of the director.

Relay DRRI is operated when a routing indicator read from a requesting position contains more characters than the ring counter is set to accept for storage. In such a case the position disconnects itself from the director and the director is released and reset for the next call and no alarm circuit is activated at the director.

Relay DCDF is activated whenever an erroneous pattern of switching code relays is operated. In such a case the director is disconnected but is not reset and relay DFB is activated and operates an alarm.

Relay DFRI is operated (1) whenever relay DCDI does not operate to fire the selected switching code thyratrons within 20 seconds after relay DSB operates, (2) whenever relay DCDT does not release relay DCDI within 1 second after the latter is operated which indicates that the routing indicator read from the character buses failed to produce a valid switching code or (3) whenever relay DCDR fails to release within 1 second after it was operated to release the selected switching code relays, indicating that the requesting position was not able to process the switching codes correctly. Each time relay DFRI operates it registers a count in the consecutive failure circuit of relay DFB at the same time it causes the director to be disconnected. However, if relay DFRI operates 3 times successively relay DFB is activated. This causes the director to be disconnected but it is not reset and also brings up an alarm condition.

*Office Alarm Circuit*

The office alarm circuit is activated by relay DALI whenever the services of an attendant are required. Alarm relays such as APGAL, DPGAL, DGAL, DGPSAL, DRF or DFB associated with the malfunctioning circuit are operated and this supplies the ground to operate the DALI relay. Manual operation of the release key activates relay DALC which locks to ground through relay DALI; when relay DALC is operated, it opens the circuit between the operated DALI relay and the alarm. Before relay DALC can be released relay DALI must be released. When the trouble is cleared the operation of the release button releases relay DALI.

The director failure busy relay DFB is operated to activate the office alarm circuit whenever its lefthand winding is energized by the operation of relay DCDF or by its righthand winding when relay DFRI counts the third successive failure in the consecutive failure circuit. Relay DCDF operates whenever an erroneous pattern of switching code relays is operated and lights the switching code failure lamp.

As soon as relay DFRI is operated by either of its associated timer tubes 19–11 and 19–12, it initiates a counting cycle of the consecutive failure circuit. This circuit includes relays DF-1, DF-2, DFRI and DFC and operates in such a manner that the third consecutive failure causes the office alarm to be operated. If the director operates normally, after one or two failures, relay DCDR operates in the normal manner and releases the counting relays to reset the consecutive failure counting circuit.

The director release failure relay DRF is operated to activate the alarm circuit whenever (1) either relays DRRI and DFRI is not released within one second after it operates to send the ground over the code failure lead in order to cause the requesting position to disconnect from the director; or (2) relay DRC is held operated for longer than one second after it operates relay DR. Unless the alarm circuit has been activated the director should be completely disconnected and reset within the one second interval. If the director does not disconnect, within the one second interval after either one of relays DRC, DRRI or DFRI operates, the timer network biases the tube 19–13 into conduction to operate relay DRF. This also activates the office alarm circuit.

*Allotter*

An allotter is employed to permit only one cross office connection to be made at a time and prevents more than one receiving position from being connected to the same sending position at any one time. A receiving position requests the allotter as soon as the routing connection has been established and the required sending positions have been checked and found idle. The allotter circuits are associated with the director and are shown in FIGS. 20A and 20B.

When the requesting receiving position has processed all the routing information and has established the routing connections to the selected sending positions relay such as LAS at the No. 1 receiving position is operated. The connected route leads are checked and if the selected position or positions are idle, relay LRCK is operated to request the services of the allotter. If one of the selected positions is busy relay LRCK does not operate until all the selected sending positions are idle. If the requesting receiving position has to wait more than thirty seconds before the busy positions become idle the allotter preference or priority control circuits are activated. The preference control circuits seize the allotter as soon as it becomes idle to prevent other receiving positions from obtaining its services and the allotter is held until all the selected sending positions become idle.

When the route check relay such as LRCK is operated to request the allotter, a ground circuit is completed over conductor 20–14, a back contact of relay APGNG and through the coil of relay APGN to operate the same. Relay APGN locks up and connects the position group containing the requesting receiving position, position No. 1 in this case, to the allotter. Relay APGNG is slow to operate and permits the selected APGN relay to operate and lock up before the operate path for all the APGN relays is interrupted. This prevents any other position group from activating the allotter until the connected position has been served. At the same time that relay APGN operates relay APGNG, it sends a ground from relay APGP over conductor 20–16 to the requesting receiving position. This ground operates the allotter select control relay, such as relay LASC, at the receiving position. When this relay is operated the receiving position in the connected position group is ready to be directly connected to the allotter.

If the requesting receiving position is not connected to the allotter within 30 seconds after its select initiate relay such as relay LAS for position number 1 is operated, a timer tube fires at the receiving position and operates its relay LAPC. This relay activates the preference circuits of the allotter to prevent other receiving positions from obtaining the services thereof and thereby assures that the original position will connect to the desired sending positions that are busy as soon as those positions become idle. The operation of relay LAPC applies a ground over conductor 20–17 through back contacts of relay APGPG to operate relay APGP. As relay APGP operates it locks up directly to the ground and in turn operates slow relay APGPG to open the operate path of the other APGP relays. The operated APGP relay applies a ground to conductor 20–18 through front contacts of relay LAPC to operate relay LASC. When relay LASC operates, the position in the connected position group is ready to connect directly to the allotter.

When an APGN or APGP relay associated with the requesting position group operates the appropriate APGC relay is operated by a ground that originates at the back contacts of relay APRC and extends through one or the other of two parallel paths and a back contact of relay APGS to the coil of relay APGC. The latter relay locks to ground directly from its associated APGN or APGP relay and it closes the operate path and its associated APGS relay through all 10 released APGS relays, the allotter busy switch, all released APGC relays which precede the operated APGC relay, the operated APGC relay and the winding of the APGS relay to ground. The selected APG relay locks up and opens the operate path for the remaining 9 APGS relays and also operates the allotter select relay, such as LAS, through the operated LASC relay at the requesting receiving position. The operate path for relay LAS is through the allotter cut-out switch and unoperated similar relays at each of the 10 position in the group, or directly through each switch in its cut-out position, the operated APGC relay and its associated APGS relay and the 9 released relays such as LASC or associated cut-out switches. This circuit is only completed when its associated LASC, APGC and APGS relays are operated and the relays corresponding to relay LASC at every other position in the position group is released. If the appropriate LAS relay is not operated within a 66 millisecond interval relay APGAL operates and a warning indicator 20–19 is lit. When the LAS relay at the receiving position operates, it is connected to the allotter and cross office connections are begun.

*Disconnecting the Allotter*

After the receiving position is connected to the allotter the select initiate relay such as LAS releases which in turn releases its associated relay LRCK. This in turn releases relay APGN or APGP, its ASC relay and relay APGC. As these relays release the other operated relays are also released.

At the receiving position, checks are made on the connected lines to ascertain that all the selected sending positions are in an idle condition. When this check is completed, a ground is sent through relays such as LAS to operate the allotter position release control relay APRC. This relay in turn operates relay APR to release the initiate relay such as LAS at the receiving position. Thus the allotter is released and is conditioned to be operated by another requesting receiving position.

Operation of the selected APGS relay removes ground from the timer network of an associated timing tube such as 20–21 and if the relay such as LAS at the receiving position is not operated within ⅔ of a second thereafter the tube fires and operates relay APGAL. This activates the office alarm circuit.

The allotter circuits are provided with an allotter busy switch 20–23 whereby the allotter may be busied. Each receiving position is provided with an allotter cut-out switch such as 20–24. When thrown to the right or its cut-out position the associated receiving position can not initiate a call to the allotter circuits and circuits that normally pass through all the positions in a position group pass through the cut-out switch and bypass the associated position circuitry.

While the invention has been described in but a single preferred embodiment thereof, it will be obvious that various modifications can be made therein without departing from the spirit or essential attributes thereof, and it is desired therefore that only such limitations be placed thereon as are imposed by the appended claims.

We claim:

1. In a telegraph switching system, a switching office, a plurality of incoming lines and a plurality of outgoing lines terminating at said switching office, each of said lines having respective individual message signal storage means and transmitting means, switching means for establishing paths of transmission from any one of said incoming line transmitting means to any one of said outgoing line storage means for the sequential transmission of signals representing message character code groups, means for also transmitting over an established path a parity check signal along with each character code group, and means for comparing the transmitted parity check signal with the parity of its representative character code group stored by said outgoing line storage means.

2. In a telegraph switching system, a switching office, a plurality of incoming lines and a plurality of outgoing lines terminating at said switching office, each of said lines having individual message signal storage means and transmitting means, switching means for establishing paths of transmission from the transmitting means of any one of said incoming lines to storage means of any one of said outgoing lines for the sequential transmission of signals representing message code groups, means for also transmitting over an established path a parity check signal along with each character code group, means for determining the parity of character code groups stored by the storage means of a line sending position and means for comparing the parity of the stored character code groups with respective transmitted parity check signals.

3. In a telegraph switching system, a line receiving position including means for storing and transmitting received telegraph signal code groups, a plurality of line sending positions including means for storing received telegraph signal code groups, individual signal transmission paths from said line receiving position to each of said line sending positions, means including said paths for transmitting signals stored at said line receiving position to the storage means at a selected one or more of said line sending positions, said transmission occurring simultaneously to all selected line sending positions when more than one is selected, parity code group checking means at said line sending positions and means including said checking means for checking the parity of each stored code group with the parity of its representative transmitted code group.

4. In a telegraph signal transmission system, a transmission circuit, means for transmitting over said circuit individual permuted groups of a predetermined number of two different line conditions representing message characters, means for determining the odd and even number of one of said line conditions for each character group transmitted over said circuit and means for accompanying each transmitted character representing code groups with a line condition indicative of the odd or even number of its respective line conditions.

5. In a telegraph switching system, a switching office, a plurality of incoming line positions each including means for storing received message character code groups of signals with associated transmitting means, a plurality of outgoing line positions each including means for storing received message character code groups of signals and associated transmitting means, means for selectively establishing transmission paths from the transmitting means of said line receiving positions to storing means of said transmitting positions for the transfer of stored messages, one code group at a time, said transfer including the sequential transmission of permuted code group of marking and spacing pulses, means for accompanying each code group with a parity checking pulse, parity code group checking means at said positions and means including said parity checking means for checking the accuracy of the transfer of the code groups from the line receiving positions to the line sending positions.

6. In a telegraph switching system, a switching office, a plurality of incoming line positions each including means for storing received message character code groups of signals with associated transmitting means, a plurality of outgoing line positions each including means for storing received message character code groups of signals and associated transmitting means, means for selectively establishing transmission paths from the transmitting means of said line receiving positions to storing means of said transmitting positions for the transfer of stored messages, one code group at a time, said transfer including the sequential transmission of permuted code groups of marking and spacing pulses, means for accompanying each code group with a parity checking pulse, means for generating parity checking signals in accordance with each code group stored at a line sending position and means for comparing the parity checking signal accompanying a code group with the parity checking signal generated in accordance with its respective stored code group.

7. The system as set forth in claim 6 including means enabling a single line sending position to transmit over a plurality of paths simultaneously to a plurality of line sending positions and means for inhibiting transmission to only the line sending positions where the parity checking signals do not compare while continuing transmission to other connected line sending position.

8. The system set forth in claim 6 and including means to inhibit transmission of said code groups when the parity checking signals of a code group do not compare.

9. In a telegraph switching system, a switching office, a plurality of incoming line and a plurality of outgoing line positions at said switching office, each of said positions having individual message signal storage means and transmitting means with each of said messages including at least one routing indicator, switching means controlled by said routing indicators for establishing paths of transmission from said incoming line position transmitting means to said outgoing line position storage means for the transmission of signals representing message code groups, means for controlling said switching means to establish a plurality of paths between an incoming line position and a plurality of outgoing line positions in accordance with said routing indicators, and means operative when the routing indicators of a single message are such as to require more than a predetermined number of paths to establish a path to a predetermined message storage means.

10. In a telegraph switching system for switching messages including at least one routing indicator, a switching office, a plurality of incoming line positions and a plurality of outgoing line positions, a multiple address position having means for transmitting a single message to a plurality of said outgoing line positions each of said positions having individual message signal storage means and transmitting means, switching means controlled by said routing indicators for indicating paths of transmission from said incoming line position transmitting means to the storage means of said outgoing line positions and said multiple address position for the sequential transmission of signals representing message code groups, and means for controlling said switching means to establish a transmission path to said multiple address position when the requirements of the routing indicators of a message are such as to require more than a predetermined number of paths between a line receiving and line sending positions.

11. The switching system recited in claim 10 wherein the routing indicators accompanying a message may also include one or more indicators representing a group of line sending positions and means for controlling said switching means by a routing indicator representing a group of line sending positions to establish a transmission path to said multiple address position.

12. In a telegraph switching system, a plurality of message switching centers, line circuits connecting each of said switching centers with one of more of the others, a plurality of remote offices associated with each of said switching centers, switching means at each of said switching centers for switching received messages in accordance with accompanying routing indicators, and means for controlling the switching means at a center when a message contains a plurality of routing indicators, one or more of which represent a remote office served by the switching center from which the message is received to prevent transmission of the message back to such a switching center.

13. In a telegraph switching system, a plurality of message switching centers, line circuits connecting each of said switching centers with one or more of the others, a plurality of remote offices associated with each of said switching centers, switching means at each of said switching centers for switching received messages, each of said messages having appended thereto one or more groups of characters representing one or more routing indicators with each of said routing indicators representing one or more remote offices to which the accompanying message it to be relayed and means to control said switching means at a center when the routing indicator or indicators include a remote office served by the center from which the message is received to inhibit the retransmission of the message back to the other switching center.

14. In a telegraph switching system, a plurality of message switching centers, a plurality of remote offices, line circuits connecting each switching center to one or more of the other switching centers and each remote office to a respective switching center, switching means at each switching center for switching messages received over any one of said line circuits to one or more of the other line circuits terminating thereat, said switching means being controlled by one or more routine indicators appended to each message with each of said routing indicators representing one or more remote offices to which the message is to be sent, and means for controlling the switching means at each switching center to prevent retransmission of a message back to a switching center from which it is received.

15. In a telegraph switching system, a plurality of message switching centers, a plurality of remote offices, line circuits connecting each switching center to one or more of the other switching centers and each remote office to a respective switching center, switching means at said switching centers enabling a message originating at any one of said remote offices to be switched to any one or more of the other remote offices, said switching means being controlled by one or more routing indicators appended to each message with each routing indicator representing one or more remote offices to which the message is to be sent and means for sending but a single copy of a message to a remote office when it is represented by more than one of the routing indicators of the message.

16. The system as specified in claim 15 and including means for transmitting along with the message to each indicated remote office all the routing indicators appended to the message as received at the first switching center from the originating remote office.

17. In a telegraph switching system, a switching center having means for storing telegraph messages with each stored message including one or more routing indicators designating the destination thereof, said routing indicators normally consisting of a predetermined number of characters, switching mechanism at said swtiching center, switching control means for said switching mechanism operable in accordance with said routing indicators and requiring all the characters of a routing indicator to effect an operation thereof, and means to prevent an operation of said switching means when the number of characters in a routing indicator exceeds said predetermined number.

18. In a telegraph switching system, a switching center having a plurality of outgoing lines, a source of messages, one or more routing indicators appended to each message and identifying respective outgoing lines, said routing indicator normally consisting of a predetermined number of characters, automatic switching means requiring all of the characters of a routing indicator to effect a switching operation for the transmission of a message to an outgoing line, manually operable means and means including said manually operable means to adapt said switching means to operate in response to routing indicators having other than said predetermined number of characters.

19. In a telegraph switching system, a switching center having a plurality of outgoing lines, a source of messages, one or more line identifying routing indicators appended to each message with each indicator normally including a predetermined number of switching control characters, switching means controlled by said routing indicators and requiring said predetermined number to effect a switching operation, and means included in said switching means to ignore predetermined characters occurring in said routing indicators and not include them in the number required for a switching operation.

20. In a telegraph switching system, a switching center having a plurality of outgoing lines, a source of messages, one or more line identifying routing indicators appended to each message with each indicator normally including a predetermined number of switching control characters, switching means controlled by said routing indicators and requiring said predetermined number to effect a switching operation, means included in said switching means to disregard other than switching control characters occurring in a routing indicator and means for changing the number of switching control characters required for an operation of said switching means.

21. In a telegraph signal transmission system, a transmission circuit, a transmitting means for transmitting over said circuit in sequential order permuted character representing signal groups of two different line conditions, means for transmitting an individual check signal of one or the other of said two line conditions to said circuit accompanying each character representing group and means determined by the number of one of said line conditions in each character group for determining the line condition of said check signal.

22. In a telegraph signal transmission system a transmission circuit, a transmitting means for transmitting over said circuit in sequential order permuted character representing signal groups of two different line conditions, means for transmitting an individual check signal of one or the other of said two line conditions to said circuit accompanying each character representing group, means determined by the number of one of said line conditions in each character group for determining the line condition of said check signal, signal storage means at the receiving end of said transmission circuit, operative to store received character representing signal groups and means including the check signals for determining the accuracy of said stored character representing signal groups by said storage means.

23. The system as set forth in claim 22 and including means for transmitting back to said transmitting means indications of the accuracy of stored character representing signal groups with respect to the transmission thereof.

24. The system as set forth in claim 22 and including indicative means at said storage means for indicating the number of one of the line conditions received for each character group, means including said last mentioned means and said received check signal for comparing said stored character representing signal groups with the representative transmitted signal groups.

25. In a telegraph switching system, a first line receiving position including means for storing and transmitting received telegraph signal code groups, a plurality of line sending positions including means for storing telegraph signal code groups received from said line receiving position, individual signal transmission paths from said line receiving position to each of said line sending positions, means including said paths for transmitting signals stored at said line receiving position to the storage means at a selected one or more of said line sending positions, said transmission occurring simultaneously to all selected line sending positions when more than one is selected, parity code group checking means at said line sending positions, means including said checking means for checking the parity of each stored code group with the parity of its representative transmitted code group, and means including said parity code group checking means for determining in part the operation of the transmitting means at said line receiving position.

References Cited in the file of this patent

UNITED STATES PATENTS 2,918,526 Wright ---------------- Dec. 22, 1959